United States Patent
Stubbe et al.

(10) Patent No.: US 12,442,825 B2
(45) Date of Patent: Oct. 14, 2025

(54) PRESCRIPTION OF REMOTE PATIENT MANAGEMENT BASED ON BIOMARKERS

(71) Applicant: B.R.A.H.M.S GmbH, Hennigsdorf (DE)

(72) Inventors: Tobias Stubbe, Hennigsdorf (DE); Jan Wiemer, Hennigsdorf (DE); Jan Kunde, Hennigsdorf (DE); Stefan Gehrig, Hennigsdorf (DE); Friedrich Köhler, Berlin (DE)

(73) Assignee: B.R.A.H.M.S GmbH, Hennigsdorf (DE)

( * ) Notice: Subject to any disclaimer, the term of this patent is extended or adjusted under 35 U.S.C. 154(b) by 1052 days.

(21) Appl. No.: 17/599,157

(22) PCT Filed: Mar. 27, 2020

(86) PCT No.: PCT/EP2020/058700
§ 371 (c)(1),
(2) Date: Sep. 28, 2021

(87) PCT Pub. No.: WO2020/201078
PCT Pub. Date: Oct. 8, 2020

(65) Prior Publication Data
US 2022/0260589 A1 Aug. 18, 2022

(30) Foreign Application Priority Data

Mar. 29, 2019 (EP) .................................... 19166382
Mar. 29, 2019 (EP) .................................... 19166425
May 21, 2019 (EP) .................................... 19175720

(51) Int. Cl.
*G01N 33/68* (2006.01)
*G01N 33/70* (2006.01)
*G01N 33/74* (2006.01)

(52) U.S. Cl.
CPC ......... *G01N 33/6893* (2013.01); *G01N 33/70* (2013.01); *G01N 33/74* (2013.01);
(Continued)

(58) Field of Classification Search
None
See application file for complete search history.

(56) References Cited

PUBLICATIONS

Koehler et al. "Telemedicine in heart failure: pre-specified and exploratory subgroup analyses from the TIM-HF trial." Int J Cardiol. Nov. 29, 2012;161(3):143-50. (Year: 2012).*

(Continued)

*Primary Examiner* — Rebecca M Giere
*Assistant Examiner* — Alexander Alexandrovic Volkov
(74) *Attorney, Agent, or Firm* — Klarquist Sparkman, LLP

(57) ABSTRACT

The invention relates to a method for determining whether a subject diagnosed with a cardiovascular disease should be prescribed a remote patient management, the method comprising measuring particular biomarkers in a sample from said patient. The invention therefore relates to a method for therapy guidance, stratification and/or monitoring of a remote patient management for a patient diagnosed with a cardiovascular disease, comprising providing at least one sample of a patient, determining a level of at least one biomarker selected from the group consisting of proADM, proBNP and proANP or fragment(s) and comparing said level of the at least one biomarker to one or more reference values, wherein said level is indicative of prescribing or not prescribing a remote patient management for said patient. In some embodiments a low benefit level of the at least one biomarker is indicative of not prescribing a remote patient management, whereas in some embodiments a high benefit level of the at least one biomarker is indicative of prescribing a remote patient management. In some embodiments the (Continued)

cardiovascular disease is heart failure, in particular a chronic heart failure that has led to a hospitalization within the last 12 months.

20 Claims, 21 Drawing Sheets

Specification includes a Sequence Listing.

(52) U.S. Cl.
    CPC ... *G01N 2333/58* (2013.01); *G01N 2800/325* (2013.01); *G01N 2800/52* (2013.01)

(56) References Cited

PUBLICATIONS

Kollerits et al. "Comparison and Evaluation of Cardiac Biomarkers in Patients with Intermittent Claudication: Results from the CAVASIC Study", 2013, Clinical Chemistry 59:4, pp. 692-702. (Year: 2013).*
Veenstra et al. "Clinical effects of an optimised care program with telehealth in heart failure patients in a community hospital in the Netherlands". Neth Heart J. Jun. 2015;23(6):334-40. (Year: 2015).*
Koehler et al. "Efficacy of telemedical interventional management in patients with heart failure (TIM-HF2): a randomised, controlled, parallel-group, unmasked trial". Lancet. Sep. 22, 2018;392(10152):1047-1057. (Year: 2018).*
Conway et al., "Not all systematic reviews are systematic: a meta-review of the quality of systematic reviews for non-invasive remote monitoring in heart failure," *Journal of Telemedicine and Telecare*, vol. 19, No. 6, pp. 326-337, 2013.
Melillo and Pecchia, "A Preliminary Model to Choose the Most Appropriate Target Population for Home Monitoring Telemedicine Interventions Basing on the Best Available Evidence," *Lecture Notes in Computer Science*, vol. 8868, pp. 406-408, 2014.
Gensini et al., "Value of Telemonitoring and Telemedicine in Heart Failure Medicine," *Cardiac Failure Review*, vol. 3, No. 2, pp. 116-121, 2017.
Koehler et al., "Efficacy of telemedical interventional management in patients with heart failure (TIM-HF2): a randomised, controlled, parallel-group, unmasked trial," *The Lancet*, vol. 392, pp. 1047-1057, 2018.
Koehler et al., "Impact of Remote Telemedical Management on Mortality and Hospitalizations in Ambulatory Patients With Chronic Heart Failure: The Telemedical Interventional Monitoring in Heart Failure Study," *Circulation*, vol. 123, No. 17, pp. 1873-1880, 2011.
Koehler et al., Telemedical Interventional Management in Heart Failure II (TIM-HF2), a randomised, controlled trial investigating the impact of telemedicine on unplanned cardiovascular hospitalisations and mortality in heart failure patients: study design and description of the intervention, *European Journal of Heart Failure*, vol. 20, pp. 1485-1493, 2018.
Koehler et al., "Telemedicine in heart failure: Pre-specified and exploratory subgroup analyses from the TIM-HF trial," *International Journal of Cardiology*, vol. 161, No. 3, pp. 143-150, 2012.
Maisel et al., "Primary Results of the HABIT Trial (Heart Failure Assessment With BNP in the Home)," *Journal of the American College of Cardiology*, vol. 61, No. 16, pp. 1726-1735, 2013.
Möckel et al., "Biomarker guidance allow a more personalized allocation of patients for remote patient management in heart failure: results from the TIM-HF2 trial," *European Journal of Heart Failure*, vol. 21, No. 11, pp. 1-14, 2019.
Veenstra et al., "Clinical effects of an optimised care program with telehealth in heart failure patients in a community hospital in the Netherlands," *Netherlands Heart Journal*, vol. 23, No. 6, pp. 334-340, 2015.
Xiang et al., "Meta-analysis and meta-regression of telehealth programmes for patients with chronic heart failure," *Journal of Telemedicine and Telecare*, vol. 19, No. 5, pp. 249-259, 2013.

* cited by examiner

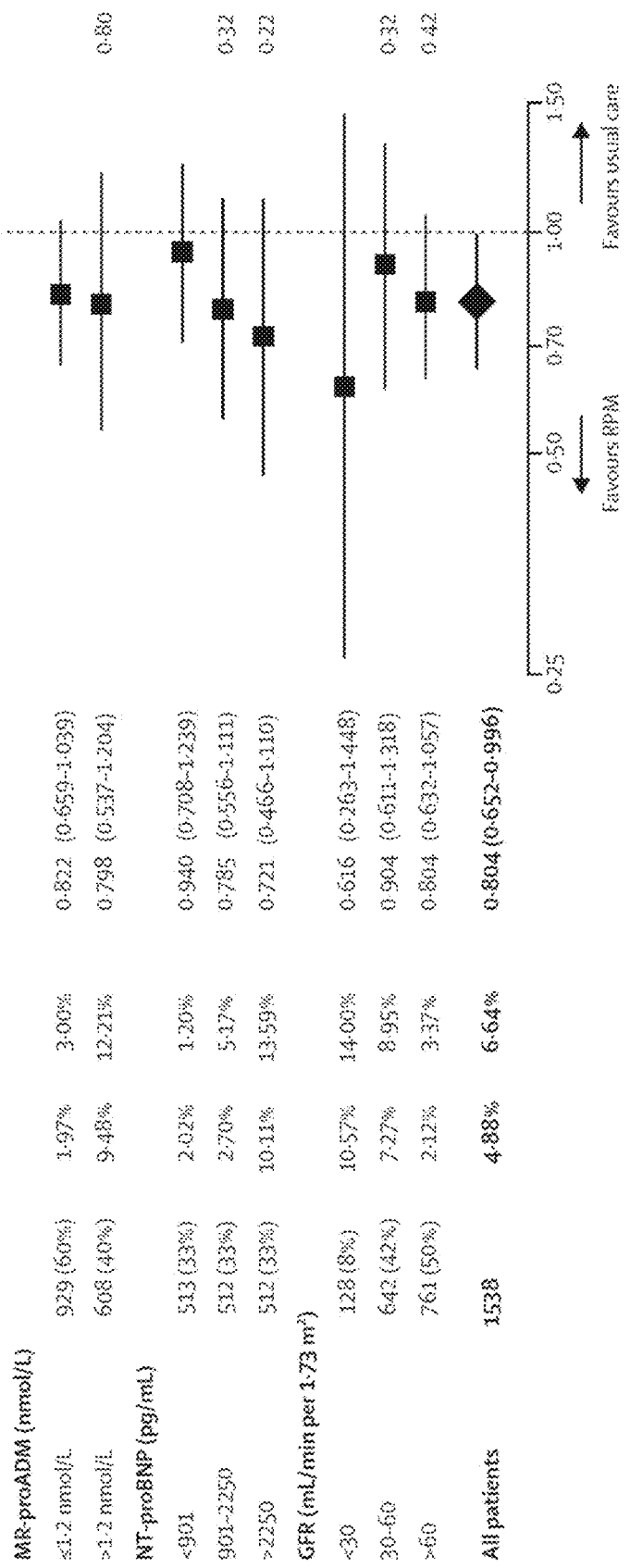
Continued Fig. 4

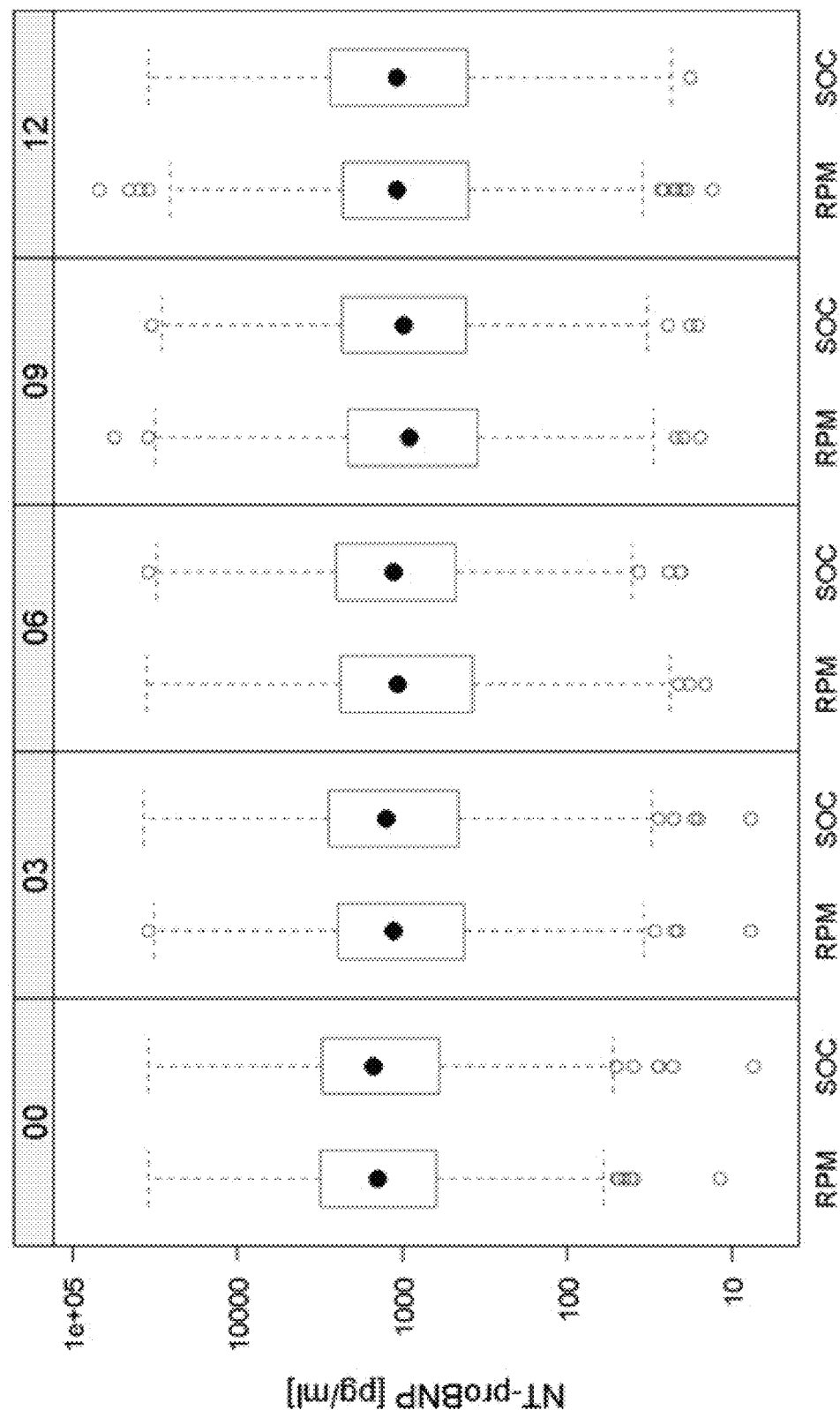

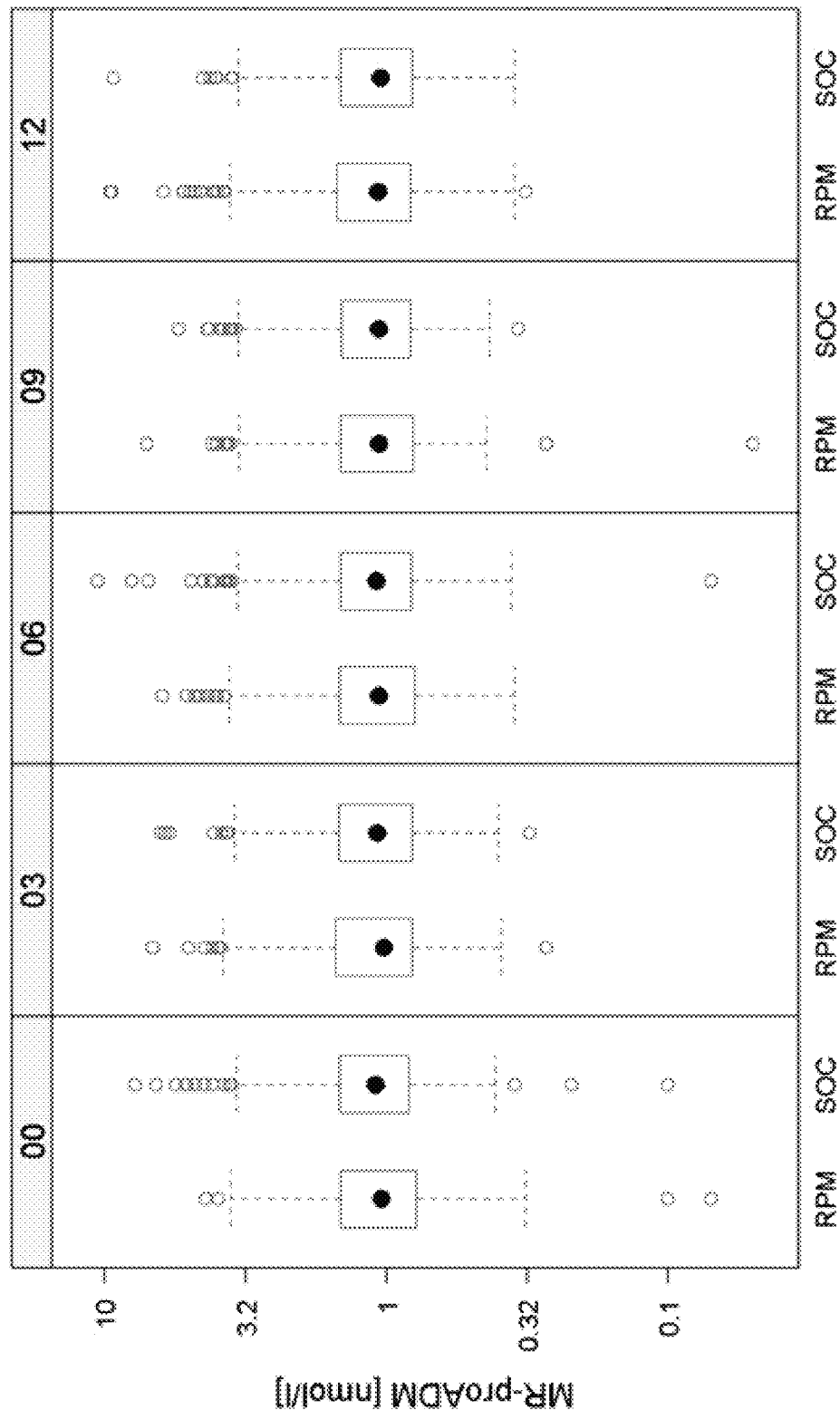

PRESCRIPTION OF REMOTE PATIENT MANAGEMENT BASED ON BIOMARKERS

CROSS REFERENCE TO RELATED APPLICATIONS

This is the § 371 U.S. National Stage of International Application No. PCT/EP2020/058700, filed Mar. 27, 2020, which was published in English under PCT Article 21(2), which in turn claims the benefit of European Patent Application No. 19166382.2, filed Mar. 29, 2019, European Patent Application No. 19166425.9, filed Mar. 29, 2019, and European Patent Application No. 19175720.2, filed May 21, 2019, each of which is incorporated herein in their entirety.

DESCRIPTION

The invention relates to the field of medical diagnostics, in particular prognostics and therapy guidance based on molecular biomarkers.

The invention relates to a method for determining whether a subject diagnosed with a cardiovascular disease should be prescribed a remote patient management, the method comprising measuring particular biomarkers in a sample from said patient. The invention therefore relates to a method for therapy guidance, stratification and/or monitoring of a remote patient management for a patient diagnosed with a cardiovascular disease, comprising providing at least one sample of a patient, determining a level of at least one biomarker selected from the group consisting of proADM, proBNP and proANP or fragment(s) thereof and comparing said level of the at least one biomarker to one or more reference values, wherein said level is indicative of prescribing or not prescribing a remote patient management for said patient. In some embodiments a low benefit level of the at least one biomarker is indicative of not prescribing a remote patient management, whereas in some embodiments a high benefit level of the at least one biomarker is indicative of prescribing a remote patient management. In some embodiments the cardiovascular disease is heart failure, in particular a chronic heart failure that has led to a hospitalization within the last 12 months.

BACKGROUND OF THE INVENTION

Remote patient management, also known as telemedicine allows health-care providers to remotely diagnose and treat patients using telecommunications as either an alternative to or alongside in-person visits (Cowie et al. 2016) and therefore increases the access to patient care because of the distance-independent application. This closes the gap of the lack of access to healthcare in out-patients with a disease or being at risk of getting complication related to the prevalent disease. Telemedicine has the potential to streamline and enable real-time consultation between caregivers through the same technology, to boost the provision of both timely and better-quality, personalized care for patients with chronic diagnoses. Remote patient management includes a broad range of interventions, including up titration of drugs in the outpatient setting, patient education, and management of the prevalent disease or comorbidities as well as an early identification of critical events. This approach may typically encompass further intervention than a telemonitoring approach, which traditionally focuses on the early detection of clinical deterioration. The tight possibility of interaction and real-time data exchange can improve the overall patient outcome and can avoid critical health states which leads to reduced (re-)hospitalizations, mortality rates and cost for the healthcare system (Andrès et al. 2018).

Heart failure is a chronic disorder, the management of which could potentially benefit from a remote patient management approach (Cowie et al 2014, van Riet E E et al 2016, Chioncel et al. 2017, Ponikowski et al. 2016). In particular remote patient management might help to detect early signs and symptoms of cardiac decompensation, thus enabling a prompt initiation of the appropriate treatment and care before a full manifestation of a heart failure decompensation.

Heart failure is a prevalent disease common in adults and accounting for substantial morbidity and mortality worldwide. One to two percent of the population of developed countries are estimated to have heart failure, and this prevalence increases to 10% in the population 70 years of age or older. In Europe, 10 million people are estimated to have heart failure with associated ventricular dysfunction, and another 10 million, to have heart failure with preserved ejection fraction (HFPEF) (Hunt et al. 2009, McMurray et al. 2012)

The prevalence of heart failure is increasing because of ageing of the population and improved treatment of acute cardiovascular events, despite the efficacy of many therapies for patients with heart failure with reduced ejection fraction, such as angiotensin converting enzyme (ACE) inhibitors, angiotensin receptor blockers (ARBs), β blockers, and mineralocorticoid receptor antagonists, and advanced device therapies (Marco et al. 2017).

Chronic heart failure results in poor life expectancy, impaired quality of life, repeated hospitalizations and represents a considerable economic burden to society. Over the past years, the combination of an aging population and an escalation in healthcare costs has amplified the need for alternative care strategies for these patients.

Given the prevalence of the disease and the complexity of therapeutic approaches one of the most challenging issues in the management of heart failure patients is to reduce hospital admission and readmission rates for worsening heart failure (Cowie et al 2014).

Modern heart failure care programs focus on the improvement of ambulatory heart failure care to reduce the risk of recurrent heart failure hospitalizations. In the year following a heart failure hospitalization, the rate of hospital readmission is approximately 50% and the 1-year mortality rate is 15-20% (Cowie et al 2014, van Riet et al. 2016). Costs with hospitalizations for decompensation of heart failure reach approximately 60% of the total expenditures with the treatment of heart failure (Gheorghiade et al. 2005). Current telemedicine heart failure concepts are holistic programs which include telemonitoring and telemedical interventions, guideline-based ambulatory care and structured patient education grouped together and known as remote patient management (Anker et al. 2011, Andres et al. 2018).

Many randomized controlled trials have investigated the impact of remote patient management in heart failure patients on different clinical outcomes—including BEAT-HF (Ong et al. 2016) CardioBBEAT (Hofmann et al. 2015), TIM-HF (Koehler et al. 2011, Koehler et al. 2012a), REM-HF (Morgan et al. 2017), OptiLink HF (Böhm et al. 2016) IN-TIME (Hindricks et al. 2014) and CHAMPION (Abraham et al. 2011).

The results from these studies are not entirely consistent with respect to morbidity and mortality. This may be explained by the differences in remote interventions used and the nature of the heterogeneous patient populations included in the studies. Despite the differences in the study designs and the remote patient management interventions used (including invasive or noninvasive telemonitoring), one common indication is that unstable heart failure patients with a recent (i.e. ≤12 months) hospitalization for heart failure before starting remote patient management appear to have a subsequent lower heart failure readmission rate, have reduced mortality and an improvement in quality of life.

A recent meta-analysis suggests that nurse home visits and disease management clinics can decrease all-cause mortality and readmissions after a recent hospitalisation for heart failure (Van Spall et al. 2017).

In 2016, the European Society of Cardiology (ESC) recommended class IIb for telemonitoring with invasive telemedical devices in the guidelines for the treatment of acute and chronic heart failure (Ponikowski et al. 2016). A meta-analysis of data from completed clinical trials evaluating haemodynamic-guided care for heart failure patients concluded that haemodynamic-guided heart failure management using permanently implanted sensors and frequent evaluation of filling pressures was superior to traditional clinical management strategies in reducing the risk of hospitalisations in patients who remain symptomatic (Adamson et al. 2017).

Recently, a prospective randomized, controlled, unmasked multicenter trial, the Telemedical Interventional Management in Heart Failure II (TIM-HF2) was completed and demonstrated that a structured remote patient management intervention, when used in a well-defined heart failure population, can reduce the percentage of days lost due to unplanned cardiovascular hospital admissions and all-cause mortality (Koehler et al. 2018a, Koehler et al. 2018b)

The prior art thus demonstrates that remote patient management is valuable in improving the life quality and life span of patients suffering of heart failure.

However, an effective remote patient management is associated with substantial technical equipment, personal efforts and thus financial burden and combines telemonitoring with teleexpertise and teleconsultation. Given the prevalence of cardiovascular diseases such as heart failure in modern societies, a mere assignment of remote patient management to any and all of the patients suffering from cardiovascular diseases may impose a considerable economic burden and technical challenge to health care providers.

Only few prior art documents discuss criteria for deciding for which patients a remote patient management may be beneficial.

Koehler et al 2012b suggest that subpopulations of patients suffering of heart failure may benefit differently from a remote patient management. In particular, the median left ventricular ejection fraction (LVEF), a PHQ-9 depression score and previous HF-decompensation are proposed as clinical scores useful in guiding the prescription of a remote patient management.

Xiang et al. 2013 is a meta study on the benefits of remote patient management for heart failure patients and suggests a higher efficacy in patients with a high NYHA scores and a low age.

Melilo et al. 2014 proposes a model for selecting target groups of heart failure patients who would benefit from a remote patient management. A benefit is reported for an NYHA of 2 or 3, an ejection fraction (EF)<40 and an age >68.

Currently only few criteria are thus known, which may help in guiding the prescription of a remote patient management.

In light of the prior art, a need exists to provide additional robust guidance for deciding for which subjects suffering from cardiovascular disease a remote patient management would be beneficial, and should be prescribed, and in which cases the remote patient management does not lead to significant improvement and may be safely omitted.

SUMMARY OF THE INVENTION

In light of the difficulties in the prior art, the technical problem underlying the present invention is to provide improved or alternative means for therapy guidance, stratification and/or monitoring of a remote patient management for a patient with cardiovascular disease. Other objectives of the invention may relate to providing means for providing guidance towards whether a patient would benefit from remote patient management, and/or providing guidance towards prescribing or not prescribing a remote patient management for such a patient.

The present invention therefore seeks to provide a method, kit and further means for the therapy guidance, stratification and/or monitoring of a remote patient management, including an indication as to whether or not prescribing a remote patient management would be beneficial for patients suffering from heart failure.

One object of the invention is the use of a biomarker or combination of biomarkers to guide the decision as to whether or not a patient with cardiovascular disease should receive remote patient management.

The solution to the technical problem of the invention is provided in the independent claims. Preferred embodiments of the invention are provided in the dependent claims.

The invention relates to a method for therapy guidance, stratification and/or monitoring of a remote patient management for a patient diagnosed with a cardiovascular disease, the method comprising:
  providing at least one sample of said patient,
  determining a level of at least one biomarker selected from the group consisting of pro adrenomedullin (proADM), pro brain natriuretic peptide (proBNP) and/or pro atrial natriuretic peptide (proANP) or fragment(s) thereof in said at least one sample,
  comparing said level of the at least one biomarker or fragment(s) thereof to one or more reference values, wherein said level of the at least one biomarker or fragment(s) thereof is indicative of prescribing or not prescribing a remote patient management for said patient.

The patients of the method of the present invention have been diagnosed with a cardiovascular disease, such as heart failure, at the time of taking the sample. In principle, this patient group may profit from remote patient management. Upon determining the level of the biomarkers proADM, proBNP and/or proANP the therapeutic benefit of a remote patient management can be assessed and thereby guide the decision as to whether or not it is appropriate to prescribe a remote patient management.

The method can be very useful and valuable for large scale therapy guidance, stratification and/or monitoring of patients suffering of cardiovascular diseases. By determining the level of the biomarkers, robust means are provided to allow for a reliable therapy decision.

As the data show below, any of the biomarkers proADM, proBNP and/or proANP may with high statistical confidence indicate whether a remote patient management is therapeutically advisable or whether it can be safely omitted, without risking withholding a needed and beneficial therapeutic approach from the patient.

It was a surprising finding that by means of a single measurement determining at least one biomarker selected from the group of proADM, proBNP and proANP or fragment(s) thereof an accurate and reliable conclusion can be made as to whether the patient will likely benefit from a remote patient management, or whether the remote patient management only incurs additional costs, without leading to significant therapeutic benefits. This prognostic ability of proADM, proBNP and/or proANP is, in the context of determining whether or not to prescribe a remote patient management, to the knowledge of the inventors, novel and surprising.

The advantageous effect on reducing the burden on the health care system and ensuring that medical resources are allocated to those truly in need may be illustrated by an example stemming from the data detailed below.

Using appropriate reference values for the biomarkers proADM, proBNP and/or proANP roughly one third of the patients suffering of a heart failure could be safely ruled out from receiving a remote patient management. For these patients, the level of the biomarkers proADM, proBNP and/or proANP predicts reliably that a remote patient management does not yield significant therapeutic benefits. Irrespective of whether prescribing a remote patient management or employing usual care without a remote patient management, the patients have statistically the same number of adverse events including acute decompensation in chronic heart failure or death for any cause. Also, the days spent in hospital are not reduced for patients that are identified early on by levels of the biomarkers as to not benefit from a remote patient management. This one third of patients thus does not profit either in terms of disease progression or quality of life. Costs and efforts associated with the additional employed remote patient management may thus be safely omitted without risking disadvantages for the patients.

For instance, in the TIM-HF2 trial, on average a patient receiving a remote patient management has a telephone contact to a medical professional for 143 minutes per year. For a thousand patients, a safe exclusion of roughly 30% of the patients from an unnecessary remote patient management, results thus in over 700 hours of saved telephone effort per year. This represents time that can be used to efficiently assist and care for patients in actual need. Furthermore, the costs associated with providing devices for remote patient management, maintaining said devices as well as infrastructure to transmit and analyse the data can be significantly reduced, streamlining the resources to those individuals that benefit the most.

To the knowledge of the inventors, the use the biomarkers selected from the group of proADM, proBNP and proANP for making a decision regarding whether or not to prescribe a remote patient management has neither been disclosed nor suggested by studies and approaches of the prior art.

In this regard, it is a further surprising finding that the biomarkers proADM, proBNP and proANP show a similar potential as markers for therapy guidance, stratification or monitoring of a remote patient management for a patient having been diagnosed with a cardiovascular disease, such as a heart failure.

The peptide adrenomedullin (ADM), comprising 52 amino acids, was originally isolated from a human phenochromocytome (Kitamura K et al. 1993). ADM has been shown to have hypotensive, immune modulating, metabolic and vascular actions. It is a potent vasodilator, and its widespread production in tissues helps to maintain blood supply to individual organs. ADM stabilises the microcirculation and protect against endothelial permeability and consequent organ failure and has shown considerable promise, especially in the fields of sepsis (Andaluz-Ojeda et al. 2015) or other diseases such as lower respiratory tract infections (Hartmann et al. 2012, Albrich et al. 2013), hypertension, chronic renal disease (Jougasaki et al. 2000), cirrhosis (Kojima et al. 1998), cancer and notably heart failure (Pousset et al. 2000, Albrecht et al. 2009).

Brain Natriuretic Peptide (BNP) is a polypeptide originally isolated from porcine brain by T. Sudoh and coworkers (Nature 1988; 332: 78-81). After cloning and sequence analysis of CDNA coding for the peptide (T. Sudoh et al. 1989) human BNP was shown to be produced in the human heart. Heart ventricles produce B-type natriuretic peptide (BNP) in response to increased mechanical load and wall stretch. BNP protects the heart from adverse consequences of overload by increasing natriuresis and diuresis, relaxing vascular smooth muscle, inhibiting the renin-angiotensin-aldosterone system, and by counteracting cardiac hypertrophy and fibrosis. BNP is synthesized by human cardiac myocytes as a 108-amino acid prohormone (proBNP), which is cleaved to the 32-residue BNP and the 76-residue N-terminal fragment of proBNP (NT-proBNP). BNP plasma concentration is increased in patients suffering from heart disease leading to heart failure. The cardiac monocytes secrete another factor, namely atrial natriuretic factor (ANF) but the secretory response to heart failure or incipient heart failure seems to be much larger in the BNP system compared to the ANF system (Mukoyama et al, J Clin Invest 1991; 87: 1402-12). Nowadays, BNP is acknowledge as a versatile biomarker for cardiac dysfunctions, in particular regarding left ventricular dysfunction and a predictor of myocardial infarction or heart failure (Vuolteenaho et al. 2005)

Atrial natriuretic polypeptide (ANP) is mainly secreted from the atria of healthy adult humans and from the left ventricle of patients with left ventricular dysfunction. Clinical application of ANP is limited by a short half-life; however, its precursor NT-proANP is more stable in plasma and has a longer half-life. Recently, a midregional sequence of pro-A-type natriuretic peptide (MR-proANP), which is an intermediate of the natriuretic peptides and more stable, was successfully used in the clinic as a biomarker of the prognosis and diagnosis of cardiovascular diseases such as acute heart failure or coronary artery disease (Wild et al. 2011, Tzikas et al. 2013, Francis et al. 2016).

The biomarkers proADM, proBNP and proANP exhibit therefore common biological functions in regard to the cardiovascular system and are upregulated during heart failure. Without intending to be bound by theory, the surprising finding of a common potential of proADM, proBNP and proANP for therapy guidance, stratification and/or monitoring of remote patient management for patients demonstrated in the data may relate to their common functions as biomarkers associated with cardiovascular disease, in particular heart failure.

Also, the method can be valuable as predictor for the risk of an adverse event and in guiding the remote patient management of patients having been diagnosed with a cardiovascular disease, preferably heart failure. When the level of the biomarkers proADM, proBNP and proANP indicates an elevated likelihood of an adverse event, a remote patient management may be prescribed, and preferably the kind and/or intensity of the remote patient management may be adjusted. Depending on the prognosis of the adverse events, specialized diagnostic tools may be employed in the remote patient management, and reviewing of data on the health status of the patient may be conducted at more frequent intervals.

In this regard, the method is particularly valuable for risk assessment or stratification and allows for a grouping or classifying of patients into different groups, such as risk groups, requiring more frequent monitoring or additional diagnosis, or therapy groups that receive certain differential therapeutic measures depending on their classification.

The potential of the biomarkers described herein thus not only allows for appropriate therapy guidance for an improved patient outcome, but also aids in employing resource-efficient strategies.

In one embodiment, the method comprises: comparing said level of the at least one biomarker or fragment(s) thereof to one or more reference values, in order to determine whether said level of the at least one biomarker or fragment(s) thereof is indicative of prescribing or not prescribing a remote patient management for said patient.

In one embodiment a low benefit level of the at least one biomarker or fragment(s) thereof is indicative of not prescribing a remote patient management.

As used herein, a "low benefit level" preferably refers to a level of the at least one biomarker selected from a group consisting of proADM, proBNP and proANP or fragment(s) thereof, which indicates that a remote patient management is not therapeutically effective and does not yield significant improvement for the patient.

As detailed in the data below, for the biomarkers described herein, low benefit levels can be reliably established, which indicate that neither the number of adverse events, such as a decompensation due to heart failure or death for any cause, are significantly reduced, when prescribing a remote patient management. Likewise, the numbers of days spend in the hospital and thus the hospitalization rate is not significantly reduced, for patients in which low benefit levels of the biomarkers are determined.

A low benefit level of the biomarkers described herein thus allows for a safe rule out of patients from a prescription of a remote patient management, that do not profit from such a therapeutic approach. Time and efforts associated with a remote patient management for patients for which a low benefit level is determined may thus be more efficiently distributed to those in actual need.

In one embodiment a high benefit level of the at least one biomarker or fragment(s) thereof is indicative of prescribing a remote patient management.

As used herein, a "high benefit level" preferably refers to a level of the at least one biomarker selected from a group consisting of proADM, proBNP and proANP or fragment(s) thereof, which indicates that a remote patient management is therapeutically effective and indeed results in improved patient outcome.

As detailed in the data below, for the biomarkers described herein, high benefit levels can be reliably established which indicate that the number of adverse events, such as a decompensation due to heart failure or death for any cause, are significantly reduced, when prescribing a remote patient management. Likewise, the numbers of days spend in the hospital and thus the hospitalization rate are reduced for patients in which a high benefit level of the biomarkers is determined.

A high benefit level of the biomarkers described herein thus allows for prescribing a remote patient management to those patients for which the therapeutic approach is effective and ensures the best therapy outcome for the patients.

In one embodiment the low benefit level of the at least one biomarker or fragment(s) thereof is indicative of not prescribing a remote patient management for a time period of at least 10 days, preferably at least 30 days, 60 days, 90 days, 150 days, 180 days, 270 days or 365 days.

In one embodiment the high benefit level of the at least one biomarker or fragment(s) thereof is indicative of not prescribing a remote patient management for a time period of at least 10 days, preferably at least 30 days, 60 days, 90 days, 150 days, 180 days, 270 days or 365 days.

It is entirely surprising that based upon the measurement of the biomarkers described herein an accurate and reliable conclusion can be made as to whether a patient suffering from a cardiovascular disease may profit or not from a remote patient management, thereby allowing for a well-founded decision on whether or not prescribing a remote patient management. This prognostic ability of proADM, proBNP and/or proANP in the particular settings—in particular over the preferred time period of at least 10 days, preferably at least 30 days, 60 days, 90 days, 150 days, 180 days, 270 days or 365 days described herein—is novel and surprising, and enables resource-efficient therapy guidance of remote patient management, as an emerging therapeutic approach for ameliorating clinical outcome of patient suffering from cardiovascular diseases.

In some embodiments, wherein a low and/or high benefit level of the at least one biomarker or fragment(s) thereof is indicative of not prescribing a remote patient management for a time period of at least 10 days, preferably at least 30 days, 60 days, 90 days, 150 days, 180 days, 270 days or 365 days, it is preferred that a second sample of the level of the biomarkers as described herein is determined after a time period of 10 days, preferably 30 days, 60 days, 90 days, 150 days, 180 days, 270 days or 365 after first determining the level of biomarker in order to reevaluate whether it is appropriate to assign a remote patient management.

In some embodiments it is preferred that the patient will consult medical personnel for reevaluating the decision on whether or not prescribing a remote patient management, if the patient notices that his or her well-being is deteriorating.

According to the present invention, the term "indicate" in the context of "indicative of prescribing a remote patient management" and "indicative of not prescribing a remote patient management" is intended as a measure of likelihood. Preferably, the "indication" relates to a likelihood of the presence of absence of a therapeutic effect, for instance in relation to avoiding adverse events, and is typically not to be construed in a limiting fashion as to point definitively to the absolute presence or absence of therapeutic effect, as e.g. in definitely avoiding adverse events in case of prescribing or not prescribing the remote patient management.

Keeping the above in mind, using the reference values disclosed herein allows for reliable therapy guidance, stratification and/or monitoring of a remote patient management as well as estimation of risks regarding the occurrence of adverse events, depending on whether or not prescribing a remote patient management and enables appropriate action by a medical professional.

It is further to be understood that in embodiments of the invention, deviations from the disclosed possible reference values below are also disclosed and claimed, such as deviations of ±20%, 19%, 18%, 17%, 16%, 15%, 14%, 13%, 12%, 11%, 10%, 9%, 8%, 7%, 6%, 5%, 4%, 3%, 2% or 1% as well as the exact reference value.

The reference values disclosed herein refer preferably to measurements of the protein level of proADM, proBNP and/or proANP or fragments thereof in a plasma sample obtained from a patient by means of the Thermoscientific B.R.A.H.M.S KRYPTOR assay or an assay suitable for an automated system. Accordingly, the values disclosed herein may vary to some extent depending on the detection/measurement method employed, and the specific values disclosed herein are intended to also read on the corresponding values determined by other methods.

All reference values disclosed herein relating to the level of a marker or biomarker, such as proADM, proBNP or proANP, are to be understood as "equal or above" a certain reference or "equal or below" a certain reference value. For example, an embodiment relating to a level of proADM or fragment(s) thereof above 0.75 nmol/L is to be understood as relating to a level of proADM or fragment(s) thereof equal or above 0.75 nmol/L.

Embodiments Relating to the Determination of ProADM

In one embodiment the low benefit level of proADM or fragment(s) thereof is below a reference value ±20% or less, wherein the reference value is selected from a range of values from 0.75 nmol/L to 1.07 nmol/L. Any value within this range may be considered as an appropriate threshold value. For example, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04, 1.05, 1.06 or 1.07 nmol/L. Particularly preferred reference values are 0.86 nmol/L±20%, preferably 0.75 nmol/L±20%.

In a preferred embodiment the low benefit level of proADM or fragment(s) thereof is below 1.07 nmol/L±20% or less, preferably 0.98 nmol/L±20% or less, below 0.91 nmol/L±20% or less, below 0.86 nmol/L±20% or less or below 0.75 nmol/L±20% or less.

In one embodiment the high benefit level of proADM or fragment(s) thereof is above a reference value ±20% or more, wherein the reference value is selected from a range of values from 0.75 nmol/L to 1.07 nmol/L. Any value within this range may be considered as an appropriate threshold value. For example, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04, 1.05, 1.06 or 1.07 nmol/L. Particularly preferred reference values are 0.86 nmol/L+20%, preferably 0.75 nmol/L±20%.

In a preferred embodiment the high benefit level of proADM or fragment(s) thereof is above 1.07 nmol/L±20% or more, 0.98±20% or more, preferably above 0.91 nmol/L±20% or more, above 0.86 nmol/L±20% or more, or above 0.75 nmol/L±20% or more.

As detailed in the data below low and high benefit levels of proADM allow for an accurate determination of whether a remote patient management is appropriate, i.e. therapeutically effective, and should thus be prescribed or whether a remote patient management can be safely omitted and not prescribed. In regards to adverse advents or risks such as an acute decompensation due to heart failure or death for any cause, preferably for a time period of least 10 days, 30 day, most preferably at least 90 days after sample provision, the above-mentioned range of reference values from 0.75 nmol/1 to 1.07 nmol/L ensure maximal sensitivity ranging from 100% to 80%, wherein a preferred reference value of 0.75 nmol/L for proADM or fragment(s) exhibits a sensitivity of 100%, whereas the preferred reference value of 0.86 nmol/L for proADM or fragment(s) thereof exhibits a sensitivity of at least 95%, whereas the reference value of 0.91 nmol/L for proADM or fragment(s) thereof exhibits a sensitivity of at least 91%, whereas the reference value of 0.98 nmol/L for proADM or fragment(s) thereof exhibits a sensitivity of at least 86%. For a reference value of 1.07 nmol/l a sensitivity of at least 80% is established.

Patients below these cut-offs with a sensitivity of 100-80% are recommended to a non-prescription of a remote patient management (rule out). Within the usual care situation at another time point in the future, the assessment by using proADM shall be repeated. Depending on the assessed risk the patient can be newly graded into the non-remote patient management group or into the remote patient management group.

Patients above these cut-offs with a sensitivity of less than 80% are recommended to prescribe a remote patient management (rule in). Within the usual care situation at another time point in the future, the assessment by using proADM shall be repeated. Depending on the assessed risk the patient can be newly graded into the remote patient management group or into the non-remote patient management group.

It is noted that preferred reference values and associated high and low benefit levels may depend on the time period for which a level proADM shall be indicative of prescribing or not prescribing a remote patient management. In general, a save exclusion of a patient from receiving a remote patient management will require a lower reference value as an upper boundary for a low benefit level. In some embodiments upper boundaries for preferred low benefit level may be as low as known thresholds for diagnosing a cardiovascular disease, preferably heart failure.

The above-mentioned reference values as well as high benefit and low benefit levels may be particular preferred as being indicative of prescribing or not prescribing a remote patient management for a time period of at least 10 days, preferably at least 30 days, 60 days or at least 90 days. For considerable, longer periods of time for instance for at least 150 days, 180 days, 270 days or 365 days lower reference values may be preferred.

In some embodiments the low benefit level of proADM or fragment(s) thereof is below a reference value ±20% or less, wherein the reference value is selected from a range of values from 0.60 nmol/L to 0.75 nmol/L, preferably from 0.63 nmol/L to 0.75 nmol/L or 0.69 nmol/L to 0.75 nmol/L. Any value within this range may be considered as an appropriate threshold value. For example, 0.6, 0.61, 0.62, 0.63, 0.64, 0.65, 0.66, 0.67, 0.68, 0.69, 0.7, 0.71, 0.72, 0.73, 0.74 or 0.75 nmol/L. Particularly preferred reference values are 0.75 nmol/L±20%, preferably 0.72 nmol/L±20%, 0.69 nmol/L or 0.63 nmol/L±20%.

In a preferred embodiment the low benefit level of proADM or fragment(s) thereof is below 0.75 nmol/L±20% or less, preferably below 0.72 nmol/L±20% or less, below 0.69 nmol/L±20% or less or below 0.63 nmol/L±20%.

In some embodiments the high benefit level of proADM or fragment(s) thereof is above a reference value ±20% or more, wherein the reference value is selected from a range of values from 0.60 nmol/L to 0.75 nmol/L, preferably from 0.63 nmol/L to 0.75 nmol/L or 0.69 nmol/L to 0.75 nmol/L. Any value within this range may be considered as an appropriate threshold value. For example, 0.6, 0.61, 0.62, 0.63, 0.64, 0.65, 0.66, 0.67, 0.68, 0.69, 0.7, 0.71, 0.72, 0.73, 0.74 or 0.75 nmol/L. Particularly preferred reference values are 0.75 nmol/L±20%, preferably 0.72 nmol/L±20%, 0.69 nmol/L±20% or 0.63 nmol/L±20%.

In a preferred embodiment the high benefit level of proADM or fragment(s) thereof is above 0.75 nmol/L±20% or more, preferably above 0.72 nmol/L±20% or more, above 0.69 nmol/L±20% or more or above 0.63 nmol/L±20% or more.

Said reference values may be particularly preferred as being indicative of prescribing or not prescribing a remote patient management for a time period of least 150 days, 180 days, 270 days, most preferably at least 365 days.

In regards to adverse advents or risks such as an acute decompensation due to heart failure or death for any cause, preferably for a time period of least 150 days, 180 days, 270 days, most preferably at least 365 days after sample provision, the above-mentioned range of reference values from 0.69 nmol/1 to 0.75 nmol/L ensure maximal sensitivity ranging from 100% to 95%, wherein a preferred reference value of 0.63 nmol/L or 0.69 nmol/L for proADM or fragment(s) exhibits a sensitivity of 100%, whereas a preferred reference value of 0.72 nmol/L for proADM or fragment(s) thereof exhibits a sensitivity of at least 98% and whereas a reference value of 0.75 nmol/L for proADM or fragment(s) thereof exhibits a sensitivity of at least 95%.

As detailed in the examples, the relation between sensitivity and reference values may also depend on the consideration of adverse events, i.e. endpoints for a selection scenario in terms of e.g. lost days per year or death for any cause (see Table 15).

Embodiments Relating to the Determination of ProBNP

In one embodiment the low benefit level of proBNP or fragment(s) thereof is below a reference value ±20% or less selected from a range of values from 237.6 pg/ml to 1595.8 pg/ml. Any value within this range may be considered as an appropriate threshold value. For example, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1107.9, 1110, 1125, 1150, 1175, 1200, 1225, 1250, 1275, 1300, 1325, 1350, 1375, 1400, 1402, 95, 1403, 1425, 1450, 1475, 1500, 1525, 1550 or 1575 pg/ml. Particularly preferred reference values are 1595.8 pg/ml, preferably 1402.95 pg/mol, 1107.9 pg/mol, 609.4 pg/ml, 237.6 pg/ml.

In a preferred embodiment the low benefit level of proBNPor fragment(s) thereof is below 1595.8 pg/ml±20% or less, 1402.95 pg/mol±20% or less, 1107.9 pg/mol±20% or less, below 609.4 pg/ml±20% or less, below 237.6 pg/ml±20% or less.

In one embodiment the high benefit level of proBNP or fragment(s) thereof is above a reference value ±20% or more selected from a range of values from 237.6 pg/ml to 1595.8 pg/ml. Any value within this range may be considered as an appropriate threshold value. For example, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1107.9, 1110, 1125, 1150, 1175, 1200, 1225, 1250, 1275, 1300, 1325, 1350, 1375, 1400, 1402, 95, 1403, 1425, 1450, 1475, 1500, 1525, 1550 or 1575 pg/ml. Particularly preferred reference values are 1595.8 pg/ml, preferably 1402.95 pg/mol, 1107.9 pg/mol, 609.4 pg/ml, 237.6 pg/ml.

In a preferred embodiment the high benefit level of proBNPor fragment(s) thereof is above 1595.8 pg/ml±20% or more, preferably 1402.95 pg/mol±20% or more, 1107.9 pg/mol±20% or more, above 609.4 pg/ml±20% or more, above 237.6 pg/ml±20% or more.

As detailed in the data below low and high benefit levels of proBNP allow for an accurate determination of whether a remote patient management is appropriate, i.e. therapeutically effective, and should be prescribed or whether a remote patient management can be safely omitted and not prescribed. In regards to adverse advents or risks such as an acute decompensation due to heart failure or death for any cause, preferably for a time period of least 10 days, 30 day, most preferably at least 90 days after sample provision, the above-mentioned range of reference values from 237.6 pg/ml to 1595.8 pg/ml ensure maximal sensitivity ranging from 100% to 80%, wherein a preferred reference value of 237.6 pg/ml for proBNP exhibits a sensitivity of 100%, whereas the preferred reference value of 609.4 pg/ml for proBNP exhibits a sensitivity of 95%. For a reference value of 1595.8 pg/ml a sensitivity of 80% is established.

Patients below these cut-offs with a sensitivity of 100-80% are recommended to a non-prescription of a remote patient management (rule out). Within the usual care situation at another time point in the future, the assessment by using proBNP shall be repeated. Depending on the assessed risk the patient can be newly graded into the non-remote patient management group or into the remote patient management group.

Patients above these cut-offs with a sensitivity of less than 80% are recommended to prescribe a remote patient management (rule in). Within the usual care situation at another time point in the future, the assessment by using proBNP shall be repeated. Depending on the assessed risk the patient can be newly graded into the remote patient management group or into the non-remote patient management group.

It is noted that preferred reference values and associated high and low benefit levels may depend on the time period for which a level proBNP shall be indicative of prescribing or not prescribing a remote patient management. In general, a save exclusion of a patient from receiving a remote patient management will require a lower reference value as an upper boundary for a low benefit level. In some embodiments upper boundaries for preferred low benefit level may be as low as known thresholds for diagnosing a cardiovascular disease, preferably heart failure (for BNP e.g. 125 pg/mol according to the 2016 ESC Guidelines, Ponikowski et al. 2016).

The above-mentioned reference values as well as high benefit and low benefit levels may be particular preferred as being indicative of prescribing or not prescribing a remote patient management for a time period of at least 10 days, preferably at least 30 days, 60 days or at least 90 days. For considerable, longer periods of time for instance for at least 150 days, 180 days, 270 days or 365 days lower reference values may be preferred.

In some embodiments the low benefit level of proBNP or fragment(s) thereof is below a reference value ±20% or less, wherein the reference value is selected from a range of values from 125 pg/ml to 383.3 pg/ml or from 125 pg/ml to 413.7 pg/ml. Any value within this range may be considered as an appropriate threshold value. For example, 125, 125.1 135, 145, 155, 165, 175, 185,195, 205, 215, 225, 235, 245, 255, 265, 275, 285, 295, 305, 315, 325, 335, 345, 355, 365, 375, 380, 383.3, 385, 390, 395, 400, 405, 410 or 413.7 pg/ml. Particularly preferred reference values are 413.7 pg/ml±20%, preferably 383.3 pg/ml±20%, 145.4 pg/ml±20% or 125.1 pg/mL±20%.

In a preferred embodiment the low benefit level of proBNP or fragment(s) thereof is below 413.7 pg/ml±20% or less, preferably 383.3 pg/ml±20% or less, below 145.4 pg/ml±20% or less or below 125.1 pg/ml±20% or less.

In some embodiments the high benefit level of proBNP or fragment(s) thereof is above a reference value ±20% or more, wherein the reference value is selected from a range of values from 125 pg/ml to 237.6 pg/ml, from 125.1 pg/ml to 383.3 pg/mL or from 125.1 pg/ml to 413.7 pg/ml. Any value within this range may be considered as an appropriate threshold value. For example, 125, 125.1 135, 145, 155, 165, 175, 185, 195, 205, 215, 225, 235, 245, 255, 265, 275, 285, 295, 305, 315, 325, 335, 345, 355, 365, 375, 380, 383.3, 385, 390, 395, 400, 405, 410 or 413.7 pg/ml pg/ml. Particularly preferred reference values are 413.7 pg/ml±20%, 383.3 pg/ml±20%, preferably 145.4 pg/ml±20% or 125.1 pg/mL±20%.

In a preferred embodiment the high benefit level of proBNP or fragment(s) thereof is above 413.7 pg/ml±20% or more, 383.3 pg/ml±20% or more, preferably above 145.4 pg/ml±20% or more or above 125.1 pg/ml±20% or more.

Said reference values may be particularly preferred as being indicative of prescribing or not prescribing a remote patient management for a time period of least 150 days, 180 days, 270 days, most preferably at least 365 days.

In regards to adverse advents or risks such as an acute decompensation due to heart failure or death for any cause, preferably for a time period of least 150 days, 180 days, 270 days, most preferably at least 365 days after sample provision, the above-mentioned range of reference values from 125.1 pg/ml to 383.3 pg/mL or from 125.1 pg/ml to 413.7 pg/ml ensure maximal sensitivity ranging from 100% to 95%, wherein a preferred reference value of 125.1 pg/mL for proBNP or fragment(s) exhibits a sensitivity of 100%, whereas a preferred reference value of 145.4 pg/ml for proBNP or fragment(s) thereof exhibits a sensitivity of at least 98% and whereas a reference value of 383.3 pg/ml or 413.7 pg/ml for proBNP or fragment(s) thereof exhibits a sensitivity of at least 95%.

As detailed in the examples, the relation between sensitivity and reference value may also depend on the consideration of adverse events, i.e. endpoints for a selection scenario in terms of e.g. lost days per year or death for any cause (see Table 15).

Embodiments Relating to the Determination of ProANP

In one embodiment the low benefit level of proANP or fragment(s) thereof is below a reference value ±20% or less selected from a range of values from 106.9 pmol/L to 248.3 pmol/L. Any value within this range may be considered as an appropriate threshold value. For example, 110, 115, 120, 125, 130, 135, 140, 145, 150, 155, 160, 165, 170, 175, 180, 185, 186.2, 190, 195, 200, 205, 210, 215, 220, 225, 230, 235, 235.6, 240, 245, 250 pmol/L. Particularly preferred reference values are 158.5 pmol/L, preferably 106.9 pmol/L.

In a preferred embodiment the low benefit level of proANP or fragment(s) thereof is below 158.5 pmol/L±20% or less, preferably below 106.9 pmol/L±20% or less.

In one embodiment the high benefit level of proANP or fragment(s) thereof is above a reference value ±20% or more selected from a range of values from 106.9 pmol/L to 248.3 pmol/L. Any value within this range may be considered as an appropriate threshold value. For example, 110, 115, 120, 125, 130, 135, 140, 145, 150, 155, 160, 165, 170, 175, 180, 185, 190, 195, 200, 205, 210, 215, 220, 225, 230, 235, 240, 245, 250 pmol/L. Particularly preferred reference values are 248.3 pmol/L, preferably 235.6 pmol/L, 186.2 pmol/L, 158.5 pmol/L or 106.9 pmol/L.

In a preferred embodiment the high benefit level of proANPor fragment(s) thereof is above 248.3 pmol/L±20% or more, preferably above 235.6 pmol/L±20% or more, 186.2 pmol/L±20% or more, above 158.5 pmol/L or more, 106.9 pmol/L±20% or more.

As detailed in the data below, low and high benefit levels of proANP allow for an accurate determination of whether a remote patient management is appropriate, i.e. therapeutically effective, and should thus be prescribed or whether a remote patient management can be safely omitted and not prescribed. In regards to adverse advents or risks such as an acute decompensation due to heart failure or death for any cause, preferably for a time period of least 10 days, 30 day, most preferably at least 90 days after sample provision, the above-mentioned range of reference values from 106.9 pmol/L to 248.3 pmol/L ensure maximal sensitivity ranging from 100% to 80%, wherein a preferred reference value of 106.9 pmol/L for proANP exhibits a sensitivity of 100%, whereas the preferred reference value of 158.5 pmol/L for proANP exhibits a sensitivity of 95%, a reference value of 186.2 pmol/L exhibits a sensitivity of 90%, a reference value of 235.6 pmol/L exhibits a sensitivity of 85%. For a reference value of 248.3 pmol/L a sensitivity of 80% is established.

Patients below these cut-offs with a sensitivity of 100-80% are recommended to a non-prescription of a remote patient management (rule out). Within the usual care situation at another time point in the future, the assessment by using proANP shall be repeated. Depending on the assessed risk the patient can be newly graded into the non-remote patient management group or into the remote patient management group.

Patients above these cut-offs with a sensitivity of less than 80% are recommended to prescribe a remote patient management (rule in). Within the usual care situation at another time point in the future, the assessment by using proANP shall be repeated. Depending on the assessed risk the patient can be newly graded into the remote patient management group or into the non-remote patient management group.

It is noted that preferred reference values and associated high and low benefit levels may depend on the time period for which a level proANP shall be indicative of prescribing or not prescribing a remote patient management. In general, a save exclusion of a patient from receiving a remote patient management will require a lower reference value as an upper boundary for a low benefit level. In some embodiments upper boundaries for preferred low benefit level may be as low as known thresholds for diagnosing a cardiovascular disease, preferably heart failure.

The above-mentioned reference values as well as high benefit and low benefit levels may be particular preferred as being indicative of prescribing or not prescribing a remote patient management for a time period of at least 10 days, preferably at least 30 days, 60 days or at least 90 days. For considerable, longer periods of time for instance for at least 150 days, 180 days, 270 days or 365 days lower reference values may be preferred.

In some embodiments the low benefit level of proANP or fragment(s) thereof is below a reference value ±20% or less, wherein the reference value is selected from a range of values from 80 pmol/L to 106.9 pmol/L. Any value within this range may be considered as an appropriate threshold value. For example, 80, 85, 90, 95, 100, 105 or 106.9 pmol/L.

In some embodiments the high benefit level of proANP or fragment(s) thereof is above a reference value ±20% or more, wherein the reference value is selected from a range of values from 80 pmol/L to 106.9 pmol/L. Any value within this range may be considered as an appropriate threshold value. For example, 80, 85, 90, 95, 100, 105 or 106.9 pmol/L.

It is an additional surprising finding that the same reference values can be used to define low and high benefit levels for proADM, proBNP and/or proANP. Herein, a low benefit level corresponds to a level below the identified reference value, whereas a high benefit level corresponds to a level above the same identified reference value. The use of identical reference values as thresholds for defining low and high benefit levels simplifies the decision process and eliminates ambiguous grey zones.

In some embodiments a high benefit level for the at least one biomarker selected from the group consisting of proADM, proBNP and proANP is above the disclosed preferred reference values, but below an upper threshold, wherein the upper threshold indicates a transition to a high-risk status of the patient, for which a hospitalization may be appropriate.

In one embodiment the cardiovascular disease is a heart failure.

In one embodiment the cardiovascular disease is a heart failure and the patient has been hospitalized within the last 12 months as a result of suffering from heart failure.

The term hospitalization refers preferably to a maintained control and/or assessment of the medical condition of a patient in a hospital, whether it be in an emergency room, ward, intensive care station, or other area of a hospital or clinic.

In one embodiment the cardiovascular disease is a chronic heart failure.

In one embodiment the patient has been diagnosed with a cardiovascular disease and has been hospitalized with a cardiovascular adverse outcome at least 3 months, preferably at least 6 months, 9 months or 12 months prior to providing the sample.

In one embodiment the cardiovascular disease is congestive heart failure.

In one embodiment the cardiovascular disease is a class II or class III heart failure according to the heart failure classification system of the New York Heart Association (NYHA).

In one embodiment the cardiovascular disease is heart failure with reduced ejection fraction (HFrEF) and/or a heart failure with preserved ejection fraction (HFpEF).

In one embodiment the cardiovascular disease is heart failure with an elevated risk of an adverse outcome, preferably selected from the group consisting of acute decompensation and/or death.

In one embodiment the cardiovascular disease is a heart failure with an elevated risk of an adverse outcome including unplanned hospitalization due to a cardiovascular event, preferably an unplanned hospitalization due to a decompensated heart failure, a coronary artery disease, a stroke or transient ischemic attack (TIA), arrhythmia, pulmonary embolism, endocarditis or other cardiovascular events.

In preferred embodiments of the invention, the sample is selected from the group consisting of a blood sample, such as a whole blood sample, a serum sample or a plasma sample, a saliva sample and a urine sample.

In one embodiment, determining a level of proADM or fragment(s) thereof comprises determining a level of MR-proADM in the sample. As demonstrated in the examples below, MR-proADM, preferably determined using established immunoassay products of the B.R.A.H.M.S GmbH (Hennigsdorf, Germany), shows a reliable and effective prognosis according to the methods described herein. Alternative ADM molecules such as the PAMP or mature adrenomedullin (including the biologically active form, also known as bio-ADM) including precursors or fragments, may also be employed.

In one embodiment, determining a level of proBNP or fragment(s) thereof comprises determining a level of NT-proBNP in the sample. As demonstrated in the examples below, NT-proBNP, preferably determined using established immunoassay products of the B.R.A.H.M.S GmbH (Hennigsdorf, Germany), shows a reliable and effective prognosis according to the methods described herein. Alternative BNP molecules such as the mature BNP including precursors or fragments, may also be employed.

In one embodiment, determining a level of proANP or fragment(s) thereof comprises determining a level of MR-proANP in the sample. As demonstrated in the examples below, MR-proANP, preferably determined using established immunoassay products of the B.R.A.H.M.S GmbH (Hennigsdorf, Germany), shows a reliable and effective prognosis according to the methods described herein. Alternative ANP molecules such as NT-proANP including precursors or fragments, may also be employed.

In one embodiment a first sample is isolated from the patient at a first time point and a second sample is isolated from the patient at a second time point.

In the context of the present invention, determining a lower level of a marker in a second sample as compared to a first sample can be indicative of decreasing levels of the respective marker in the patient over the time of observation. Conversely, elevated levels in a second sample as compared to a first sample can be indicative increasing levels of the marker over the time of observation.

It may be preferred that in between the first and second time point at least 1 day, 1 week, 2 weeks, one month, or three months have passed. It may also be preferred that less than 12 months or less, 6 months, 3 months have passed such that the preferred time span in between the two sample isolations may be for instance in between 1 week and 3 months, one month and 3 months, 1 week and one months or any other combination of the above mentioned preferred time spans.

In one embodiment a first sample is isolated from the patient at a first time point and a second sample is isolated from the patient at a second time point and wherein the absolute difference, the ratio and/or the rate of change of the level of the at least one biomarker selected from the group consisting of proADM, proBNP and proANP or fragment(s) thereof in regards to the first and second time point is indicative of prescribing or not prescribing a remote patient management for said patient.

The rate of change of the level of the biomarker(s) in regard to said first and second time point preferably refers to the absolute difference in the level of the biomarker(s) over the temporal difference between said first and second time point. However the rate of change may also relate to relative difference in the level of the biomarker(s), e.g. as a percentage increase and/or decrease, over the temporal difference between said first and second time point.

It is to be understood that in regards to first and second time point any combination of the herein disclosed time points for isolating a sample may be preferred.

Furthermore in some embodiments it may be preferred to isolate further samples, such as a third sample, a fourth sample etc. at corresponding third, fourth etc. time points in order to use the absolute difference, the ratio and/or the rate of change of the level the biomarkers in regards to different time points for prescribing or not prescribing a remote patient management.

In one embodiment the level the at least one biomarker selected from the group consisting of proADM, proBNP and proANP thereof is indicative of prescribing the kind of remote patient management, preferably indicating a scope or type of data on the health status of the patient that is repeatedly collected, the frequency of reviewing the data by medical personnel or an automated medical system, the frequency of medication dose revision and/or the frequency of remote patient consultation.

As disclosed herein, high benefit levels for the biomarkers are indicative of a therapeutic effect, justifying a prescription of a remote patient management. In some embodiments, the level of the biomarker is not only indicative of prescribing the remote patient management, but allows further to specify the kind and/or type of remote patient management.

Levels of biomarkers that are at the lower end of the high benefit level are preferably indicative of a less intense remote patient management, which may be characterized by collection of less data on the health status of the patient, a reduced frequency of reviewing the data by medical personnel or an automated medical system, as well as a reduced frequency of medication dose revision or remote patient consultations compared to levels of biomarkers that are at the higher end of a high benefit level.

Such an embodiment thus allows for further streamlining the remote patient management to provide optimal support for each patient at an appropriate effort, that reflect the likely benefit of the patients from the telemonitoring and/or telemedical interventions of a prescribed remote patient management.

In one embodiment the levels of two or three of the biomarkers or fragment(s) thereof selected from the group consisting of proADM, proBNP and proANP are determined and compared to one or more reference values in order to determine whether said levels are indicative of prescribing or not prescribing a remote patient management for said patient.

In one embodiment the levels of proADM and proBNP are determined and compared to one or more reference values in order to determine whether said levels are indicative of prescribing or not prescribing a remote patient management for said patient.

In one embodiment the levels of proADM and proANP are determined and compared to one or more reference values in order to determine whether said levels are indicative of prescribing or not prescribing a remote patient management for said patient.

In one embodiment the levels of proBNP and proANP are determined and compared to one or more reference values in order to determine whether said levels are indicative of prescribing or not prescribing a remote patient management for said patient.

In one embodiment the levels of proADM, proBNP and proANP are determined and compared to one or more reference values in order to determine whether said levels are indicative of prescribing or not prescribing a remote patient management for said patient.

In some embodiments the levels of two of the biomarkers or fragment(s) thereof selected from the group consisting of proADM, proBNP and proANP are determined and a low benefit level for both of the determined biomarkers is indicative of not prescribing a remote patient management for said patient.

In some embodiments the levels of two of the biomarkers or fragment(s) thereof selected from the group consisting of proADM, proBNP and proANP are determined and a high benefit level for both of the determined biomarkers is indicative of prescribing a remote patient management for said patient.

In some embodiments the levels of two or three of the biomarkers or fragment(s) thereof selected from the group consisting of proADM, proBNP and proANP are determined and a low benefit level for at least one of the determined biomarkers is indicative of prescribing a remote patient management for said patient.

Determining two or three of the biomarkers selected from the group consisting of proADM, proBNP and proANP or fragment(s) thereof allows for a statistically particular confident therapy guidance, stratification and monitoring of a remote patient management, which ensures that a maximal number of patients possibly profiting of the remote patient management, receive the treatment, while a maximal number of patients that would not profit may be safely excluded in order to save on recourses.

A particular confident therapy guidance of a remote patient management can be achieved when determining the levels of proADM and proBNP or fragment(s) thereof.

Embodiments Relating to the Determination of ProADM and ProBNP

In one embodiment the levels of proADM and proBNP are determined in the patient and compared to one or more reference values in order to determine whether said levels are indicative of prescribing or not prescribing a remote patient management for said patient.

In one embodiment a level of proADM or fragment(s) thereof below a reference value ±20% or less, wherein the reference value is selected from a range of values from 0.63 nmol/L to 0.75 nmol/L and a level of proBNP or fragment(s) thereof below a reference value ±20% or less, wherein the reference value is selected from a range of values from 125 pg/ml to 413.7 pg/ml is indicative of not prescribing a remote patient management.

For the level of proADM or fragment(s) any value within this range may be considered as an appropriate threshold value. For example, 0.63, 0.64, 0.65, 0.66, 0.67, 0.68, 0.69, 0.7, 0.71, 0.72, 0.73, 0.74 or 0.75 nmol/L. Particularly preferred reference values are 0.63 nmol/L+20%, preferably 0.69±20%, 0.72 nmol/L±20% or 0.75 nmol/L±20%.

For the level of proBNP or fragment(s) any value within this range may be considered as an appropriate threshold value. For example, 125, 125.1 135, 145, 145.4, 155, 165, 175, 185, 195, 205, 215, 225, 235, 245, 255, 265, 275, 285, 295, 305, 315, 325, 335, 345, 355, 365, 375, 380, 383.3, 385, 390, 395, 400, 405, 410 or 413.7 pg/ml. Particularly preferred reference values are 413.7 pg/ml±20%, 383.3 pg/ml±20%, preferably 145.4 pg/ml±20% or 125.1 pg/mL±20%.

The cutoffs for selection which patients should not be recommended for a remote patient management based upon the determination of proADM and proBNP may thus exhibit levels of 125.1 and 413.7 pg/ml for NT-proBNP and 0.63 and 0.75 nmol/L for MR-proADM, depending on the desired safety (sensitivities 100%; 98%; 95%) and patient selection criterion (at least 30 lost days/year due to unplanned CV hospitalization or all-cause death; all-cause death). In general, the lower the desired sensitivity, the higher are the critical biomarker cutoffs should be and the higher the proportion of patients that are not recommended for a remote patient management (see table 15).

In one embodiment a level of proADM or fragment(s) thereof below a reference value of 0.63 nmol/L±20% or less and a level of proBNP or fragment(s) thereof below a reference value of 125.1±20% or less is indicative of not prescribing a remote patient management.

In one embodiment a level of proADM or fragment(s) thereof below a reference value of 0.69 nmol/L±20% or less and a level of proBNP or fragment(s) thereof below a reference value of 125.1±20% or less is indicative of not prescribing a remote patient management.

In one embodiment a level of proADM or fragment(s) thereof below a reference value of 0.72 nmol/L±20% or less and a level of proBNP or fragment(s) thereof below a reference value of 145.4±20% or less is indicative of not prescribing a remote patient management.

In one embodiment a level of proADM or fragment(s) thereof below a reference value of 0.75 nmol/L±20% or less and a level of proBNP or fragment(s) thereof below a reference value of 383.3±20% or less is indicative of not prescribing a remote patient management.

In one embodiment a level of proADM or fragment(s) thereof below a reference value of 0.75 nmol/L±20% or less and a level of proBNP or fragment(s) thereof below a reference value of 413.7±20% or less is indicative of not prescribing a remote patient management.

In regards to adverse advents or risks such as an acute decompensation due to heart failure, death for any cause or lost days due to unplanned hospitalization or death, the above-mentioned combinations of the levels of proADM and proBNP ensure maximal sensitivity ranging from 100% to 95% (see table 15).

Using the combination of proADM and proBNP, compared to a single biomarker, allows to further safely reduce the number of patients for which a remote patient management is beneficial.

The reduction of the population recommended for RPM by the joint use of proBNP and proADM allows to exclude event-free patients with rather high levels of proBNP, who nevertheless had rather low levels of proADM and vice versa, which would be prescribed based on the sole use of one of the biomarkers for risk stratification.

For instance, for as detailed in the examples below for a maximum sensitivity of 100% a therapy guidance based upon the level of proBNP alone may reduce the population using a remote patient management by 3.4% (regarding all-cause death) Using a combination of proBNP and proADM the population with a RPM recommended can be safely reduced by 13.9% (regarding all-cause death). The combination of the biomarkers in this case allows thus a reduction of resources by one third without comprising on patient safety.

Moreover, the disclosed reference values for a therapy guidance using a combination of proBNP and proADM likewise allow for a safe inclusion of patients that should receive a remote patient management.

In one embodiment a level of proADM or fragment(s) thereof above a reference value ±20% or more, wherein the reference value is selected from a range of values from 0.63 nmol/L to 0.75 nmol/L and a level of proBNP or fragment(s) thereof above a reference value ±20% or more, wherein the reference value is selected from a range of values from 125 pg/ml to 413.7 pg/ml is indicative of prescribing a remote patient management.

For the level of proADM or fragment(s) any value within this range may be considered as an appropriate threshold value. For example, 0.63, 0.64, 0.65, 0.66, 0.67, 0.68, 0.69, 0.7, 0.71, 0.72, 0.73, 0.74 or 0.75 nmol/L. Particularly preferred reference values are 0.63 nmol/L+20%, preferably 0.69±20%, 0.72 nmol/L±20% or 0.75 nmol/L±20%.

For the level of proBNP or fragment(s) any value within this range may be considered as an appropriate threshold value. For example, 125, 125.1 135, 145, 145.4, 155, 165, 175, 185, 195, 205, 215, 225, 235, 245, 255, 265, 275, 285, 295, 305, 315, 325, 335, 345, 355, 365, 375, 380, 383.3, 385, 390, 395, 400, 405, 410 or 413.7 pg/ml. Particularly preferred reference values are 413.7 pg/ml±20%, 383.3 pg/ml±20%, preferably 145.4 pg/ml±20% or 125.1 pg/mL±20%.

In one embodiment a level of proADM or fragment(s) thereof above a reference value of 0.63 nmol/L±20% or more and a level of proBNP or fragment(s) thereof above a reference value of 125.1±20% or more is indicative of prescribing a remote patient management.

In one embodiment a level of proADM or fragment(s) thereof above a reference value of 0.69 nmol/L±20% or more and a level of proBNP or fragment(s) thereof above a reference value of 125.1±20% or more is indicative of prescribing a remote patient management.

In one embodiment a level of proADM or fragment(s) thereof above a reference value of 0.72 nmol/L±20% or more and a level of proBNP or fragment(s) thereof above a reference value of 145.4±20% or more is indicative of prescribing a remote patient management.

In one embodiment a level of proADM or fragment(s) thereof above a reference value of 0.75 nmol/L±20% or more and a level of proBNP or fragment(s) thereof above a reference value of 383.3±20% or more is indicative of prescribing a remote patient management.

In one embodiment a level of proADM or fragment(s) thereof above a reference value of 0.75 nmol/L±20% or more and a level of proBNP or fragment(s) thereof above a reference value of 413.7±20% or more is indicative of prescribing a remote patient management.

In a further embodiment the method for therapy guidance, stratification and/or monitoring of a remote patient management for a patient having been diagnosed with a cardiovascular disease additionally comprises
  determining a level of at least one further biomarker, preferably a cardiovascular biomarker such as a troponin, C-reactive protein (CRP), proEndothelin-1 pro-Vasopressin or fragments thereof and/or a renal function marker, such as creatinine, urea, uric acid, cystatin C, β-Trace Protein (BTB) or Inulin,
  wherein the levels of the at least one further biomarker, preferably a cardiovascular biomarker and/or a renal function marker, and the level of the at least one biomarker selected from the group consisting of proADM, proBNP and proANP or fragment(s) thereof is compared to one or more reference values, wherein said levels are indicative of prescribing or not prescribing a remote patient management for said patient.

In one embodiment the method for therapy guidance, stratification and/or monitoring of a remote patient management for a patient having been diagnosed with a cardiovascular disease additionally comprises
  determining at least one clinical parameter, wherein the at least one clinical parameter is preferably age, weight, body mass index, gender, ethnic background, blood creatinine, left ventricular ejection fraction (LVEF), a right ventricular ejection fraction (LVEF), NYHA class, MAGGIC heart failure risk score, state of medical treatment, blood pressure (systolic/diastolic), heart rate, heart rhythm by electrocardiogram (ECG), peripheral oxygen rate (SpO2), self-rated health status (scale) or a parameter indicating renal function, preferably a creatinine clearance rate and/or a glomerular filtration rate (GFR).

wherein the at least one clinical parameter and the level of the at least one biomarker or fragment thereof is compared to one or more reference values, wherein the at least one clinical parameter and the level of the at least one biomarker or fragment(s) thereof are indicative of prescribing or not prescribing a remote patient management for said patient.

In one embodiment the at least one further biomarker and/or the at least one further clinical parameter is determined not more than 2 weeks, preferably not more than 1 week, 1 day before provision of said sample and not more than 2 weeks, preferably not more than 1 week, 1 day after provision of said sample. Most preferably the at least one further biomarker and/or the at least one further clinical parameter are determined at the same time as the biomarker selected form the group consisting of proADM, proBNP and proANP. For instance, in regard to the further marker the same sample may be used and/or a different sample may be provided at the same time.

Determining the level of further biomarkers and/or further clinical parameters allows for further enhancement of the statistical confidence for therapy guidance, stratification and monitoring of a remote patient management and improving on the benefits described herein, in particular regarding resource efficient allocation of therapeutic measures, while ensuring positive patient outcome.

In one embodiment the method for therapy guidance, stratification and/or monitoring of a remote patient management for a patient having been diagnosed with a cardiovascular disease additionally comprises determining at least one parameter indicating renal function, preferably a creatinine clearance rate and/or a glomerular filtration rate (GFR).

wherein the at least one parameter indicating renal function, preferably a creatinine clearance rate and/or a glomerular filtration rate, and the level of the at least one biomarker or fragment thereof is compared to one or more reference values in order to determine whether the at least one parameter indicating renal function, preferably a creatinine clearance rate and/or a glomerular filtration rate, and the level of the at least one biomarker or fragment(s) thereof are indicative of prescribing or not prescribing a remote patient management for said patient.

The inventors have realized that determining markers or parameters indicating renal function, such as a creatinine clearance rate and/or a glomerular filtration rate, in addition to determining the biomarkers as described herein allows for optimizing the therapy guidance as described herein.

As the data demonstrate below, when renal function is compromised an elevation of the level of the at least one biomarker selected from the group consisting of proADM, proBNP and proANP may partly be attributed to the dysfunction of the kidney, independent of the prognostic potential of the biomarkers in guiding a remote patient management tailored for cardiovascular disease.

Accordingly, when a determined parameter, such as the creatinine clearance rate and/or a glomerular filtration rate, indicates that the kidney is not properly functioning, the reference values and associated low or high benefit levels of the biomarkers for deciding whether or not prescribing a remote patient management are preferably adapted.

It is preferred that when the kidney is not properly functioning, the reference values are raised such that the low benefit level is extended to include larger determined levels of biomarkers. Said adaptation preferably may account for the above discussed finding that the elevated levels of the biomarkers described herein may partially be assigned to renal dysfunction rather than heart failure related processes.

For instance, as detailed in the data below a preferred low benefit level for proADM or fragment(s) thereof display a sensitivity of 95% may be extended to levels of the biomarker of less than 1.06 nmol/L±20% in case renal function is compromised compared to a low benefit level of less than 0.86 nmol/L±20% for patients without a verified reduced renal function.

By extending the low benefit level more patients may be safely excluded from receiving a remote patient management, thereby further optimizing resource allocation to those patients who are indeed in need.

Embodiments Relating to the Determination of ProADM and GFR

In one embodiment the at least one clinical parameter that is additionally determined is a GFR, preferably a GFR based on CKD-EPI, wherein in case the GFR is below 50 a low benefit level of proADM or fragment(s) thereof is below a reference value ±20% or less, wherein the reference value is selected from a range of values from 0.98 nmol/L to 1.06 nmol/L. Any value within this range may be considered as an appropriate threshold value. For example, 0.98, 0.99, 1, 1.01, 1.02, 1.03, 1.04, 1.05 or 1.06 nmol/L. In regards to adverse advents or risks such as an acute decompensation due to heart failure or death for any cause, the above-mentioned range of reference values for proADM from 0.98 nmol/1 to 1.06 nmol/L in case of a GFR based on CKD-EPI below 50 ensure maximal sensitivity ranging from 100% to 95%, wherein a preferred reference value of 0.98 nmol/L exhibits a sensitivity of 100%, whereas a preferred reference value of 1.06 nmol/L yields a sensitivity of at least 95% (see table 10)

In a preferred embodiment a GFR, preferably a GFR based on CKD-EPI, is below 50 and a low benefit level of proADM or fragment(s) thereof is below 0.98 nmol/L±20% or less, preferably below 1.06 nmol/L±20% or less.

In one embodiment the at least one clinical parameter that is additionally determined is a GFR, preferably a GFR based on CKD-EPI, wherein in case the GFR is below 60 a low benefit level of proADM or fragment(s) thereof is below a reference value ±20% or less, wherein the reference value is selected from a range of values from 0.97 nmol/L to 1.05 nmol/L. Any value within this range may be considered as an appropriate threshold value. For example, 0.97 0.98, 0.99, 1, 1.01, 1.02, 1.03, 1.04 or 1.05 nmol/L. In regards to adverse advents or risks such as an acute decompensation due to heart failure or death for any cause, the above-mentioned range of reference values for proADM from 0.97 nmol/L to 1.05 nmol/L in case of a GFR based on CKD-EPI below 60 ensure maximal sensitivity ranging from 100% to 95%, wherein a preferred reference value of 0.97 nmol/L exhibits a sensitivity of 100%, whereas a preferred reference value of 1.05 nmol/L yields a sensitivity of at least 95%

In a preferred embodiment a GFR, preferably a GFR based on CKD-EPI, is below 60 and a low benefit level of proADM or fragment(s) thereof is below 0.97 nmol/L±20% or less, preferably below 1.05 nmol/L±20% or less (see table 10).

In one embodiment the at least one clinical parameter that is additionally determined is a GFR, preferably a GFR based on Cockroft-Gault, wherein in case the GFR is below 50 a low benefit level of proADM or fragment(s) is below a reference value ±20% or less, wherein the reference value is selected from a range of values from 0.84 nmol/L to 1.05 nmol/L. Any value within this range may be considered as an appropriate threshold value. For example, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04 or 1.05 nmol/L. In regards to adverse advents or risks such as an acute decompensation due to heart failure or death for any cause, the above-mentioned range of reference values for proADM from 0.62 nmol/1 to 1.05 nmol/L in case of a GFR based on Cockroft-Gault below 50 ensure maximal sensitivity ranging from 100% to 95%, wherein a preferred reference value of 0.84 nmol/L exhibits a sensitivity of 99%, whereas a preferred reference value of 1.05 nmol/L yields a sensitivity of at least 95%.

In a preferred embodiment a GFR, preferably a GFR based on CKD-EPI, is below 50 and a low benefit level of proADM or fragment(s) thereof is below 0.84 nmol/L±20% or less, preferably below 1.05 nmol/L±20% or less.

In one embodiment the at least one clinical parameter that is additionally determined is a GFR, preferably a GFR based on Cockroft-Gault, wherein in case the GFR is below 60 a low benefit level of proADM or fragment(s) is below a reference value ±20% or less, wherein the reference value is selected from a range of values from 0.75 nmol/L to 0.92 nmol/L. Any value within this range may be considered as an appropriate threshold value. For example, 0.75, 0.76, 0.77, 0.78, 0.79, 0.8, 0.81, 0.82, 0.83, 0.84, 0.85, 0.86, 0.87, 0.88, 0.89, 0.9, 0.91 or 0.92 nmol/L.

In a preferred embodiment a GFR, preferably a GFR based on Cockroft-Gault, is below 60 and a low benefit level of proADM or fragment(s) thereof is below 0.75 nmol/L±20% or less, preferably below 0.92 nmol/L±20% or less. In regards to adverse advents or risks such as an acute decompensation due to heart failure or death for any cause, the above-mentioned range of reference values for proADM from 0.62 nmol/1 to 0.92 nmol/L in case of a GFR based on Cockroft-Gault below 60 ensure maximal sensitivity ranging from 100% to 95%, wherein a preferred reference value of 0.75 nmol/L exhibits a sensitivity of 99%, whereas a preferred reference value of 0.92 nmol/L yields a sensitivity of at least 95% (see table 11).

In a preferred embodiment the GFR, preferably a GFR based on Cockroft-Gault, is below 30 and a low benefit level of proADM or fragment(s) thereof is below 1.14 nmol/L±20% or less In a preferred embodiment a parameter, such as the creatinine clearance rate and/or a glomerular filtration rate, indicates a renal dysfunction and a low benefit level of proADM or fragment(s) thereof is below 0.84 nmol/L±20% or less, preferably 0.98 nmol/L±20% or less, 1.05 nmol/L±20% or less, 1.06 nmol/L±20%, or less or 1.14 nmol/L±20% or less.

It is noted that the disclosed adaptation of preferred low benefit levels of proADM or fragment(s) thereof analogously apply to preferred to high benefit levels of proADM or fragment(s) thereof For instance, in a preferred embodiment a parameter, such as the creatinine clearance rate and/or a glomerular filtration rate, indicates a renal dysfunction and a high benefit level of proADM or fragment(s) thereof is above 0.84 nmol/L±20% or more, preferably 0.98 nmol/L±20% or more, 1.05 nmol/L±20% or more, 1.06 nmol/L+20%, or more or 1.14 nmol/L±20% or more.

Embodiments Relating to the Determination of ProBNP and GFR

In one embodiment the at least one clinical parameter that is additionally determined is a GFR, preferably a GFR based on CKD-EPI, wherein in case the GFR is below 50 a low benefit level of proBNP or fragment(s) is below a reference value ±20% or less, wherein the reference value is selected from a range of values from 237.6 pg/ml to 273.7 pg/ml. Any value within this range may be considered as an appropriate threshold value. For example, 240, 250, 260 or 270 pg/ml.

In a preferred embodiment a GFR, preferably a GFR based on CKD-EPI, is below 50 and a low benefit level of proBNP or fragment(s) thereof is below 237.6 pg/ml±20%, or less, preferably below 273.7 pg/ml±20%, or less.

In one embodiment the at least one clinical parameter that is additionally determined is a GFR, preferably a GFR based on CKD-EPI, wherein in case the GFR is below 60 a low benefit level of proBNP or fragment(s) is below a reference value ±20% or less, wherein the reference value is selected from a range of values from 237.6 pg/ml to 402.6 pg/ml. Any value within this range may be considered as an appropriate threshold value. For example, 240, 250, 260, 270, 280, 290, 300, 310, 320, 330, 340, 350, 360, 370, 380, 390 or 400 pg/ml. In regards to adverse advents or risks such as an acute decompensation due to heart failure or death for any cause, the above-mentioned range of reference values for proBNP from 237.6 pg/ml to 402.6 pg/ml in case of a GFR based on CKD-EPI below 60 ensure maximal sensitivity ranging from 100% to 95%, wherein a preferred reference value of 237.6 pg/ml exhibits a sensitivity of 100%, whereas a preferred reference value of 402.6 pg/ml yields a sensitivity of at least 95%.

In a preferred embodiment a GFR, preferably a GFR based on CKD-EPI, is below 60 and a low benefit level of proBNP or fragment(s) thereof is below 237.6 pg/ml±20%, or less, preferably below 402.6 pg/ml±20% or less.

In one embodiment the at least one clinical parameter that is additionally determined is a GFR, preferably a GFR based on Cockroft-Gault, wherein in case the GFR is below 50 a low benefit level of proBNP or fragment(s) is below a reference value ±20% or less, wherein the reference value is selected from a range of values from 237.6 pg/ml to 454.4 pg/ml. Any value within this range may be considered as an appropriate threshold value. For example, 240, 250, 260, 270, 280, 290, 300, 310, 320, 330, 340, 350, 360, 370, 380, 390, 400, 410, 420, 430, 440, 450 pg/ml. In regards to adverse advents or risks such as an acute decompensation due to heart failure or death for any cause, the above-mentioned range of reference values for proBNP from 237.6 pg/ml to 454.4 pg/ml in case of a GFR based on Cockroft-Gault below 50 ensure maximal sensitivity ranging from 100% to 95%, wherein a preferred reference value of 237.6 pg/ml exhibits a sensitivity of 100%, whereas a preferred reference value of 454.4.6 pg/ml yields a sensitivity of at least 95%.

In a preferred embodiment a GFR, preferably a GFR based on Cockroft-Gault, is below 50 and a low benefit level of proBNP or fragment(s) thereof is below 237.6 pg/ml±20%, or less, preferably below 454.4 pg/ml±20% or less.

In one embodiment the at least one clinical parameter that is additionally determined is a GFR, preferably a GFR based on Cockroft-Gault, wherein in case the GFR is below 60 a low benefit level of proBNP or fragment(s) is below a reference value ±20% or less, wherein the reference value is selected from a range of values from 137.7 pg/ml to 402.6 pg/ml. Any value within this range may be considered as an appropriate threshold value. For example, 140, 150, 160, 170, 180, 190, 200, 210, 220, 230, 240, 250, 260, 270, 280, 290, 300, 310, 320, 330, 340, 350, 360, 370, 380, 390, 400 pg/ml. In regards to adverse advents or risks such as an acute decompensation due to heart failure or death for any cause, the above-mentioned range of reference values for proBNP from 137.7 pg/ml to 402.6 pg/ml in case of a GFR based on Cockroft-Gault below 60 ensure maximal sensitivity ranging from 100% to 95%, wherein a preferred reference value of 137.7 pg/ml exhibits a sensitivity of 100%, whereas a preferred reference value of 402.6 pg/ml yields a sensitivity of at least 95%.

In a preferred embodiment a GFR, preferably a GFR based on Cockroft-Gault, is below 60 and a low benefit level of proBNP or fragment(s) thereof is below 137.7 pg/ml±20%, or less, preferably below 203.9 pg/ml±20% or less, more preferably below 402.6 pg/ml±20% or less.

In a preferred embodiment a GFR, preferably a GFR based on Cockroft-Gault, is below 30 and a low benefit level of proBNP or fragment(s) thereof is below 237.6 pg/ml±20%, or less.

In a preferred embodiment a parameter, such as the creatinine clearance rate and/or a glomerular filtration rate, indicates a renal dysfunction and a low benefit level of proBNP or fragment(s) thereof is below 203.9 pg/ml±20% or less, preferably below 237.6 pg/ml±20% or less, below 273.7 pg/ml±20% or less, below 402.6 pg/ml or less or below 454.4 pg/ml±20% or less.

As detailed in the data below, combining any one of the biomarkers alone with measuring a GFR allows for an enhancement of the predictive power of the method. However, when combining two or more of the biomarkers, e.g. using proBNP and proADM, with a parameter indicating renal function, such as a GFR, a particular high enhancement of the predictive power of the method is achieved. As shown in Tables 10 and 11 (columns 6 and 9) and table 13 by combining proADM and proBNP with a GFR more than double or triple the number of patients may be safely excluded from receiving a remote patient management in comparison to only using proBNP with a GFR. The embodiment allows thus for a particular efficient allocation of recourses to those patients that benefit of a remote patient management.

It is noted that the disclosed adaptation of preferred low benefit levels of proBNP or fragment(s) thereof analogously apply to preferred high benefit levels of proBNP or fragment(s) thereof.

For instance, in a preferred embodiment a parameter, such as the creatinine clearance rate and/or a glomerular filtration rate, indicates a renal dysfunction and a high benefit level of proBNP or fragment(s) thereof is above 203.9 pg/ml±20% or more, preferably above 237.6 pg/ml±20% or more, above 273.7 pg/ml±20% or more, above 402.6 pg/ml or more or above 454.4 pg/ml±20% or more.

In a further embodiment, the present invention relates to a kit for carrying out the method of the present invention, wherein the kit comprises detection reagents for determining of at least one biomarker selected from the group consisting of proADM, proBNP and pro proANP or fragment(s) thereof in a sample from a patient, and reference data, such as reference values for determining whether a level of the at least one biomarker selected from the group consisting of proADM, proBNP and pro proANP is indicative of prescribing or not prescribing a remote patient management, in particular reference data for a low benefit level the at least one biomarker and a high benefit level of the at least one biomarker, wherein said reference data is preferably stored on a computer readable medium and/or employed in the form of computer executable code configured for comparing the determined at least one biomarker with the reference values, optionally, detection reagents for determining the level of at least one additional biomarker or fragment(s) thereof, in a sample from a patient and/or means for determining at least one clinical parameter, preferably age, weight, body mass index, gender, ethnic background, blood creatinine, left ventricular ejection fraction (LVEF), a right ventricular ejection fraction (LVEF), NYHA class, MAGGIC heart failure risk score, state of medical treatment, blood pressure (systolic/diastolic), heart rate, heart rhythm by electrocardiogram (ECG), peripheral oxygen rate (SpO2), self-rated health status (scale), or the glomerular filtration rate (GFR) and reference data, such as reference values for determining whether a level of the at least one additional biomarker or fragment(s) thereof and/or the at least one clinical parameter is indicative of prescribing or not prescribing a remote patient management, wherein said reference data is preferably stored on a computer readable medium and/or employed in the form of computer executable code configured for comparing the determined levels of said at least one biomarker or fragment(s) thereof and/or said at least one clinical parameter with the reference values.

The Sequence Listing is submitted as an ASCII text file in the form of the file named Sequence_Listing.txt, which was created on Sep. 9, 2021, and is 12,103 bytes, which is incorporated by reference herein.

DETAILED DESCRIPTION OF THE INVENTION

The invention relates to a method therapy guidance, stratification and/or monitoring of a remote patient management for a patient having been diagnosed with a cardiovascular disease. As is evident from the data presented herein, the potential benefit of prescribing a remote patient management to a patient suffering of a cardiovascular disease can be predicted based upon the level of proADM, proBNP and/or proANP or fragment(s) thereof, which thus provides valuable information on therapy guidance, stratification and/or monitoring.

The present invention has the following advantages over the conventional methods: the inventive methods and the kits are fast, objective, easy to use, reliable and precise for a therapy guidance, stratification and/or monitoring of a remote patient management. Employing the methods and kits described herein allows for efficient resource allocation in prescribing a remote patient management for those patients, who are likely to benefit. Substantial medical efforts and costs can be saved by not prescribing a remote patient management to individuals that are based on the biomarkers early on identified as likely not to benefit from a remote patient management.

The methods and kits of the invention relate to markers that are easily measurable in routine methods in hospitals or similar clinical settings, because the levels of proADM, proBNP and proANP can be determined in routinely obtained blood samples or further biological fluids or samples obtained from a subject. The methods and kits described herein may thus be employed in routine settings to guide remote patient management of patients having been diagnosed with a cardiovascular disease.

As used herein, the "patient" or "subject" may be a vertebrate. In the context of the present invention, the term "subject" or "patient" includes both humans and animals, particularly mammals, and other organisms.

A "cardiovascular disease" as used herein is characterized by the dysfunction of the heart muscle or the blood vessel system supplying the heart, brain and other vital organs. The term "cardiovascular disease" covers a wide array of disorders including arteriosclerosis, coronary artery disease, heart valve disease, arrhythmia, heart failure, hypertension, orthostatic hypotension, shock, endocarditis, diseases of the aorta and its branches, disorders of the peripheral vascular system, congenital heart disease or stroke.

In the context of the invention the patient has preferably been diagnosed with a cardiovascular preferably prior to determining the levels of the biomarkers. To this end any means known in the art for diagnosing a cardiovascular disease may be employed. Employing the invention does not depend on the type of prior diagnosis of the cardiovascular disease.

For some embodiments diagnosing a cardiovascular disease event may include detecting an abnormal electrocardiogram (ECG) or an electrogram.

The term "electrocardiogram" is defined to be the heart electrical signals from one or more skin surface electrode(s) that are placed in a position to indicate the heart's electrical activity (depolarization and repolarization). An electrocardiogram segment refers to the recording of electrocardiogram data for either a specific length of time, such as 10 seconds, or a specific number of heart beats, such as 10 beats. The PQ segment of a patient's electrocardiogram is the typically a flat segment of a beat of an electrocardiogram that occurs just before the R wave.

The term "electrogram" is defined to be the heart electrical signals from one or more implanted electrode(s) that are placed in a position to indicate the heart's electrical activity (depolarization and repolarization). An electrogram segment refers to the recording of electrogram data for either a specific length of time, such as 10 seconds, or a specific number of heart beats, such as 10 beats. The PQ segment of a patient's electrogram is the typically flat segment of an electrogram that occurs just before the R wave. A beat is preferably a sub-segment of an electrogram or electrocardiogram segment containing exactly one R wave.

Heart signal parameters relate to measured or calculated values created during the processing of one or more beats of electrogram data and may be used determine whether a cardiovascular event has occurred. Heart signal parameters include PQ segment average value, ST segment average value, R wave peak value, ST deviation, ST shift, average signal strength, T wave peak height, T wave average value, T wave deviation, heart rate and R-R interval.

The term "heart failure" as used herein relates to an impaired systolic and/or diastolic function of the heart being accompanied by overt signs of heart failure as known to the person skilled in the art. Preferably, heart failure referred to herein is also "chronic heart failure", which thus refers to a condition that is not suddenly appearing, but manifested over an extended period of time.

Heart failure according to the present invention includes overt and/or advanced heart failure. In overt heart failure, the subject shows symptoms of heart failure as known to the person skilled in the art.

The term heart failure embraces congestive heart failure and/or chronic heart failure as defined by the American College of Cardiology and the American Heart Association as set forth in a report of the American College of Cardiology/American Heart Association Task Force on Practice Guidelines (Yancy et al. 2013: ACCF/AHA guideline for the management of heart failure).

In some embodiments the term heart failure as used herein refers to stages C and D of the ACC/AHA classification; in these stages, the subject shows typical symptoms of heart failure i.e. the subject is not apparently healthy. The subject having heart failure and being classified into stage C or D has undergone permanent, non-reversible structural and/or functional changes to his myocardium, and as a consequence of these changes, full health restoration is not possible. A subject having attained stage C or even D of the ACC/AHA classification typically cannot go back to stage B or even A.

Heart failure can also be classified into a functional classification system according to the New York Heart Association (NYHA). Patients of NYHA Class I have no obvious symptoms of cardiovascular disease but already have objective evidence of functional impairment. Physical activity is not limited, and ordinary physical activity does not cause undue fatigue, palpitation, or dyspnea (shortness of breath). Patients of NYHA class II have slight limitation of physical activity. They are comfortable at rest, but ordinary physical activity results in fatigue, palpitation, or dyspnea. Patients of NYHA class III show a marked limitation of physical activity. They are comfortable at rest, but less than ordinary activity causes fatigue, palpitation, or dyspnea. Patients of NYHA class IV are unable to carry out any physical activity without discomfort. They show symptoms of cardiac insufficiency at rest. For a more detailed reference on the NYHA classification system see "The Criteria Committee of the New York Heart Association. (1994). Nomenclature and Criteria for Diagnosis of Diseases of the Heart and Great Vessels (9th ed.). Boston: Little, Brown & Co. pp. 253-256."

Heart failure, as an impaired systolic and/or diastolic function of the heart, can be determined also by, for example, echocardiography, angiography, scintigraphy or magnetic resonance imaging. This functional impairment can be accompanied by symptoms of heart failure as outlined above (NYHA class II-IV), although some patients may present without significant symptoms (NYHA I). Moreover, heart failure is also apparent by a reduced left ventricular ejection fraction (LVEF).

More preferably, heart failure as used herein is accompanied by a left ventricular ejection fraction (LVEF) of less than 60%, preferably less than 45%.

Permanent structural or functional damages to the myocardium which are typical for heart failure are known to the person skilled in the art and include a variety of molecular cardiac remodelling processes, such as interstitial fibrosis, inflammation, infiltration, scar formation, apoptosis or necrosis.

A stiffer ventricular wall due to interstitial fibrosis causes inadequate filling of the ventricle in diastolic dysfunction. Permanent structural or functional damages to the myocardium are caused by dysfunction or destruction of cardiac myocytes. Myocytes and their components can be damaged by inflammation or by infiltration. Toxins and pharmacological agents (such as ethanol, cocaine, and amphetamines)

cause intracellular damage and oxidative stress. A common mechanism of damage is ischemia causing infarction and scar formation. After myocardial infarction, dead myocytes are replaced by scar tissue, deleteriously affecting the function of the myocardium. On echocardiogram, this is manifest by abnormal or absent wall motion.

Manifestations (symptoms) of heart failure are dyspnea and fatigue and fluid retention, which may lead to pulmonary congestion and peripheral edema, typical signs on the physical examination are edema and rales. There is no single diagnostic test for heart failure because it is largely a clinical diagnosis that is based on a careful history and physical examination. The clinical syndrome of heart failure may result from disorders of the pericardium, myocardium, endocardium, or great vessels, but the majority of patients with heart failure suffer from an impairment of left ventricular (LV) myocardial function.

Heart failure may be associated with a wide spectrum of LV functional abnormalities, ranging from e.g. normal LV size and preserved ejection fraction (EF) to severe dilatation and/or markedly reduced EF. In most patients, abnormalities of systolic and diastolic dysfunction coexist. Patients with normal EF may have a different natural history and may require different treatment strategies than patients with reduced EF.

The various alterations of systolic and diastolic function seen with LVH obviously can progress into congestive heart failure (CHF).

Systolic and diastolic heart failure can be diagnosed by methods known to the person skilled in the art, preferably echocardiography, in particular tissue Doppler echocardiography (TD).

In general, systolic heart failure is apparent by a reduced left ventricular ejection fraction (LVEF). In an embodiment of the present invention, heart failure as used herein is accompanied by a left ventricular ejection fraction (LVEF) of less than 60%, preferably less than 45%.

Diastolic heart failure (DHF) is supposed to account for more than 50% of all heart failure patients and is also referred to as heart failure with normal LVEF ejection fraction (HFNEF). The diagnosis of HFNEF requires the following conditions to be satisfied: (i) signs or symptoms of heart failure; (ii) normal or mildly abnormal systolic LV function; (iii) evidence of diastolic LV dysfunction. Normal or mildly abnormal systolic LV function implies both an LVEF>50% and an LV end-diastolic volume index (LVEDVI)<97 mL/m2. Diastolic LV dysfunction is preferably diagnosed by tissue Doppler (TD), wherein a ration EIE'>15 is regarded as diagnostic evidence for diastolic LV dysfunction (E being early mitral valve flow velocity; an E' being early TD lengthening velocity) If TD yields an EIE' ratio suggestive of diastolic LV dysfunction (15>EIE'>8), additional noninvasive investigations are required for diagnostic evidence of diastolic LV dysfunction (e.g. Doppler of the lateral mitral annulus, Doppler of mitral valve or pulmonary veins, echo measures of LV mass index or left atrial volume index, electrocardiographic evidence of atrial fibrillation).

For more detailed information on diastolic LV dysfunction, reference is made to the Consensus statement on the diagnosis of heart failure with normal left ventricular ejection fraction by the Heart Failure and Echocardiography Associations of the European Society of Cardiology, European Heart Journal 2007, 28, 2359-2550)

"Acute heart failure (AHF)" also termed "acute decompensated heart failure" is defined as the rapid onset of symptoms and signs secondary to abnormal cardiac function. It may occur with or without previous cardiac disease. The cardiac dysfunction can be related to systolic or diastolic dysfunction, abnormalities in cardiac rhythm, or to pre-load and after-load mismatch. AHF can present itself as acute de novo (new onset of AHF in a patient without previously known cardiac dysfunction) or acute decompensation of chronic heart failure (Nieminen et al. 2005. Eur Heart J 26: 384-416; Dickstein et al. 2008. Eur Hear J 29: 2388-442).

The cardiac dysfunction may be related to systolic or diastolic dysfunction, to abnormalities in cardiac rhythm, or to preload and afterload mismatch. It is often life threatening and requires urgent treatment. According to established classification, AHF includes several distinct clinical conditions of presenting patients: (I) acute decompensated congestive heart failure, (II) AHF with hypertension/hypertensive crisis, (III) AHF with pulmonary oedema, (IVa) cardiogenic shock/low output syndrome, (IVb) severe cardiogenic shock, (V) high output failure, and (VI) right-sided acute heart failure. For detailed clinical description, classification and diagnosis of AHF, and for summary of further AHF classification systems including the Killip classification, the Forrester classification and the 'clinical severity' classification, refer inter alia to Nieminen et al. 2005 ("Executive summary of the guidelines on the diagnosis and treatment of acute heart failure: the Task Force on Acute Heart Failure of the European Society of Cardiology". Eur Heart J 26: 384-416) and references therein.

Preferably, said cardiac dysfunction is systolic dysfunction, more preferably characterized by a decreased left ventricular ejection fraction (LVEF), preferably wherein said LVEF is less than 55% or less than 50% or less than 45%, and/or by increased cardiac filling pressure.

The term "systolic dysfunction" as used herein carries its art-established meaning. By means of further guidance, the term "systolic dysfunction" can be used interchangeably with synonymous terms known to the skilled person, such as "systolic ventricular dysfunction or failure" or "systolic heart dysfunction or failure". Essentially, "systolic dysfunction" refers to a failure of the pump function of the heart due to a decreased contractility of the ventricle.

The term "diastolic dysfunction" as used herein carries its art-established meaning. By means of further guidance, the term "diastolic dysfunction" can be used interchangeably with synonymous terms known to the skilled person, such as "diastolic ventricular dysfunction or failure" or "diastolic heart dysfunction or failure". Essentially, "diastolic dysfunction" refers to a failure of the pump function of the heart due to impaired ventricular filling.

As used herein, the term "(left) ventricular ejection fraction" means the output of the (left) ventricle during systole, and represents the fraction of blood pumped out of a (left) ventricle with each heart beat. By definition, the volume of blood within a ventricle immediately before a contraction is known as the end-diastolic volume. Similarly, the volume of blood left in a ventricle at the end of contraction is end-systolic volume. The difference between end-diastolic and end-systolic volumes is the stroke volume, the volume of blood ejected with each beat. Ejection fraction (EF) is the fraction of the end-diastolic volume that is ejected with each beat; that is, it is stroke volume (SV) divided by end-diastolic volume (EDV): EF=SV/EDV=(EDV-ESV)/EDV.

"Heart failure with reduced ejection fraction (HFrEF)" preferably refers to a heart failure an ejection fraction of less than 50%, preferably less than 45% more preferably less than 40%.

"Heart failure with preserved ejection fraction (HFpEF)" preferably refers to a heart failure with an ejection fraction of equal or more than 50%.

Ejection fraction (EF) preferably refers to left ventricular ejection fraction (LVEF).

The methods of the invention may be used for monitoring, therapy monitoring, therapy guidance and/or therapy control. "Monitoring" relates to keeping track of a patient and potentially occurring complications, e.g. to analyze the progression of the healing process or the influence of a particular treatment or therapy on the health state of the patient.

The term "therapy monitoring" or "therapy control" in the context of the present invention refers to the monitoring and/or adjustment of a therapeutic treatment of said patient, for example by obtaining feedback on the efficacy of the therapy. As used herein, the term "therapy guidance" refers to application of certain therapies, therapeutic actions or medical interventions based on the value/level of one or more biomarkers and/or clinical parameter and/or clinical scores. This includes the decision on whether prescribing or not prescribing a therapy, an adjustment of a therapy or the discontinuation of a therapy. In the context of the present invention "therapy monitoring" in patients with heart failure can be realized by using a remote patient management or by usual care without remote patient management, depending on the predetermined risk of the patient of getting adverse outcome by using biomarkers.

In some embodiment the methods described herein may also relate to a diagnosis, prognosis, risk assessment and/or risk stratification of an adverse event in the health of a patient having been diagnoses with a cardiovascular disease.

In the context of the present invention, an "adverse event" relates to an event that indicates complications or worsening of the health state of a patient having been diagnosed with a cardiovascular disease. Such adverse events include, without limitation, a cardiac event, a cardiovascular event, an acute heart failure, an acute decompensation or deterioration of the patient's general clinical signs or symptoms, such as hypotension or hypertension, tachycardia or bradycardia or death of the patient.

Adverse events may further include unplanned hospitalization due to cardiovascular events, that is in particular unplanned hospitalization due to a decompensated heart failure, a coronary artery disease, a stroke or transient ischemic attack (TIA), arrhythmia, pulmonary embolism, endocarditis or other cardiovascular events.

"Cardiovascular event" is used interchangeably herein with the term "cardiac event" and may refer to sudden cardiac death, acute coronary syndromes such as, but not limited to, plaque rupture, myocardial infarction, unstable angina, as well as non-cardiac acute arteriovascular events such as blood clots of the leg, aneurysms, stroke and other arteriovascular ischemic events where arteriovascular blood flow and oxygenation is interrupted. A cardiovascular event may also refer to an elevated heart rate, bradycardia, tachycardia or an arrhythmia such as atrial fibrillation, atrial flutter, ventricular fibrillation, and premature ventricular or atrial contractions (PVCs or PACs). Preferably a cardiovascular event is an acute heart failure (AHF) or an acute acute decompensation of a heart failure (ADHF).

Herein, a "non-fatal cardiac arrest" preferably refers to an absence of cardiac rhythm or presence of chaotic rhythm requiring any component of basic or advanced cardiac life support. An "acute myocardial infarction" preferably refers to an increase and gradual decrease in troponin level or a faster increase and decrease if creatinine kinase isoenzyme as marker of myocardial necrosis in the company of at least one of the following: Ischemic symptoms, abnormal Q-waves on the ECG, ST-segment elevation or depression, coronary artery intervention (e.g. coronary angioplasty) or a an atypical decrease in an elevated troponin level detected at its peak after surgery in a patient. A "congestive heart failure" preferably refers to new in-hospital signs or symptoms of dyspnoea or fatigue, orthopnea, paroxysmal nocturnal dyspnoea, increased jugular venous pressure, pulmonary rales on physical examination, cardiomegaly or pulmonary vascular engorgement. A "new cardiac arrhythmia" preferably refers to atrial flutter, atrial fibrillation, or second- or third-degree atrioventricular conduction block as possible evidenced by an electrocardiogram. An "angina" preferably refers to a dull diffuse substernal chest discomfort precipitated by exertion or emotion and relieved by rest or glyceryl trinitrate.

As used herein, "diagnosis" in the context of the present invention relates to the recognition and (early) detection of a clinical condition. Also, the assessment of the severity may be encompassed by the term "diagnosis".

"Prognosis" relates to the prediction of an outcome or a risk for a subject. This may also include an estimation of the chance of recovery or the chance of an adverse outcome for said subject.

In terms of a diagnosis or prognosis of adverse events the method is particular suited for a risk assessment or stratification. This means, that the method of the invention can discriminate high risk patients, who are more likely to suffer from (further) complications, or whose state will become more critical in the future, from low risk patients, whose health state is stable or even improving, so that it is not expected that they have suffered of an adverse event or will suffer from an adverse event, which might require certain therapeutic measures. Preferably the risk may relate to death or a hospitalization due to an acute decompensation of a heart failure.

In the present invention, the terms "risk assessment" and "risk stratification" relate to the grouping of subjects into different risk groups according to their further prognosis. Risk assessment also relates to stratification for applying preventive and/or therapeutic measures. The term "therapy stratification" in particular relates to grouping or classifying patients into different groups, such as risk groups or therapy groups that receive certain differential therapeutic measures depending on their classification. The term "therapy stratification" also relates to grouping or classifying patients into groups that are or that are not in need to receive certain therapeutic measures.

The method described herein relates to the therapy guidance, stratification and/or monitoring of a remote patient management for a patient having been diagnosed with a cardiovascular disease based upon a determination of the level of at least one biomarker selected from the group consisting of proADM, proBNP and proANP.

In particular, the method comprises comparing levels of the biomarker with one or more reference values (such as a threshold or cut-off value and/or a population average), in order to determine whether the level of biomarker is indicative of prescribing or not prescribing a remote patient management to the patient.

As used herein the term "remote patient management" preferably refers to a therapeutic approach for remotely managing patients with a cardiovascular disease, in which data on the health status of a patient is repeatedly collected at the site of the patient (i.e. out-patients) and transmitted to remote (geographically separated) medical personnel or an automated system, which may or may not act upon said data to contact the patient, give advice to the patient, initiate or change concomitant treatments or take any other medical intervention for ameliorating and/or stabilizing the health state of the patient.

A remote patient management preferably encompasses a telemonitoring on health status of the patient as well as telemedical interventions, guideline-based ambulatory care and/or structured patient education.

Telemonitoring preferably refers to the repeated data collection at the site of the patient and its remote transmission to a monitoring system or device allowing for review by medical personnel or an automated medical system.

"Medical personnel" as used herein may relate to, but is not limited to, a medical professional or a team of medical professionals, including doctors, nurses or paramedics. An "automated medical system" preferably means a computer-based system that allows for automated processing of medical data and generating according output, for instance generating alert messages or advices for the remotely managed patients. An automated medical system may preferably employ computer implemented methods based on artificial intelligence and/or artificial neural networks that may access and/or medical data to generate an output.

In preferred embodiments data collection at the site of the patient occurs in a usual home-setting, thus minimally interfering with the daily routine of the patients.

Remote transmission means that the data is transmitted to distant medical personnel or an automated medical system, which is not at the site of the patient (i.e. a geographically separated personnel or system). For instance, in a typical setting the data is collected from different patients, while these are at home, at work or any other place they attend to (e.g. out-patients) and said data is transmitted to a central medical center equipped to monitor and/or process the remotely transmitted data.

In a preferred embodiment the distance between the site of the patient and the medical personnel or an automated medical system to which the data is remotely transmitted is least 100 m, at least 1 km, at least 5 km, or more.

In some embodiments the patients may also be in ambulant care or hospitalized, when the data is collected. Also, in these cases, the data will be transmitted remotely to medical personnel or an automated medical system. For instance, patients may be in ambulant care or hospitalized in facilities, which are not specialized in treating cardiovascular diseases such as heart failure and the data is transmitted to a medical center, in which specifically trained medical personnel or automated medical personnel may attend to the data and initiate appropriate medical interventions.

The data on the health status preferably refers to any data suitable to monitor the health status of the patient preferably in regard to the status or progression of a cardiovascular disease, most preferably heart failure.

In one embodiment the data on the health status of the patient includes vital signs or parameters selected from the group consisting of body temperature, blood pressure, pulse (heart rate), breathing rate (respiratory rate), oxygen saturation or blood glucose level.

In a preferred embodiment the data on the health status of the patient includes blood pressure.

In a preferred embodiment the data on the health status of the patient includes an electrocardiogram (ECG).

In a preferred embodiment the data on the health status of the patient includes peripheral oxygen saturation (SpO2).

In a preferred embodiment the data on the health status of the patient includes body weight.

In a preferred embodiment the data on the health status of the patient includes a self-rated health status. The self-rated health may for instance relate to a grading system or scale covering a subjective assessment of a good health status to a poor health status, i.e. "very good" to "very bad" with different intermediate grades. Typical number of grades may range in between 3 to 10, preferably 5.

In a preferred embodiment the data on the health status of the patient includes self-rated indication of a typical symptom associated with a cardiovascular disease, preferably heart failure, progression including aching, breathlessness, burning, cramping, discomfort, fullness, heaviness, indigestion, lightheadedness, nausea, numbness, tinging, pain, pressure, shortness of breath, sweating, dizziness, squeezing, tightness, vomiting, irregular heartbeat, palpitations, chest pounding, fatigue, weakness, presence of peripheral edema and/or any other suitable symptoms.

In a preferred embodiment the data on the health status of the patient includes two or more, preferably three, four, five or more data types selected from the group consisting of blood pressure, ECG, SpO2, body weight, self-rated health status and/or a symptom associated with a cardiovascular disease progression.

In one embodiment the data on the health status of the patient are collected and transmitted to remote medical personnel or an automated medical system at regular intervals. The time intervals between data collection may be substantially different for the different types of data collected. For instance, in case of monitoring a heart rate by a mobile pulsometer data collection and transmission could be almost in real time, with status update every second, while for instance the weight may be measured and remotely transmitted only on a daily basis.

For collecting the data any suitable device or system may be employed. Including systems that are standalone units to be placed in the home of the patient or mobile units, which are carried by the patient such as a watch, an electronic probe placed onto the skin of the patient or implanted.

A cardiovascular monitoring device can include one or more of: a cardiac loop recorder (e.g., for recording heart rhythm), heart rate monitor, blood pressure monitor, hemodynamic monitor, biosignal detector device (e.g., electrooculography, electromyography, electrocardiography, galvanic skin response, magnetoencephalogram, etc.), weight scale (e.g., a smart weight scale), and/or other suitable device for monitoring cardiovascular activity. In a variation, a mobile computing device can perform functions of a cardiovascular device (e.g., a smart watch that includes heart rate monitoring capabilities).

In the prior art a variety of monitoring devices as well as data transmission devices for telemonitoring of data on the health status of patients in particular in regards to the cardiovascular disease relevant parameters are known.

For example, early telemetry systems of the type described by Lewis in U.S. Pat. No. 3,943,918 and by Crovella et al. in U.S. Pat. No. 4,121,573 use telemetric techniques to transmit data from a sensor device attached to the patient's chest via RF to a radio telemetry receiver for display and/or recording as desired. S. S. Ng described yet another telemetry system for ECG monitoring in an article entitled "Microprocesor-based Telemetry System for ECG Monitoring," IEEE/Ninth Annual Conference of the Engineering in Medicine and Biology Society, CH2513-0, pages 1492-93 (1987). Ng therein describes a system for providing continuous ECG monitoring and analysis by means of a PC AT via wireless link. In the Ng system, the patient requires a transmitter which is carried by the patient for sensing and transmitting the patient's ECG signal to a central base station via wireless link. At the base station, a receiver recovers the original ECG signal from a few patients simultaneously for display.

Bornn et al. describe a portable physiological data monitoring/alert system in U.S. Pat. Nos. 4,784,162; 4,827,943; 5,214,939; 5,348,008; 5,353,793; and 5,564,429 in which one or more patients wear sensor harnesses including a microprocessor which detects potentially life-threatening events and automatically calls a central base station via radiotelemetry using a radio modem link. In a home or alternate site configuration, communications between the base station and remote unit is by way of commercial telephone lines. Generally, the system automatically calls "911" or a similar emergency response service when an abnormality is detected by the ECG monitor.

Segalowitz discloses a wireless vital sign monitoring system in U.S. Pat. Nos. 4,981,141; 5,168,874; 5,307,818; and 5,511,553 including a precordial strip patch including a multi-layer flexible structure for telemetering data by radio frequency or single wire to hardware recording apparatus and a display monitor. Microsensors and conductive contact elements (CCEs) are mounted on the strip patch so as to permit simultaneous and continuous detection, processing and transmission of 12-lead ECG, cardiac output, respiration rate, peripheral blood oximetry, temperature of the patient, and ECG fetal heart monitoring via a single wavelength of radio frequency transmission.

Platt et al. also disclose a sensor patch for wireless physiological monitoring of patients in U.S. Pat. No. 5,634,468. Platt et al. describe a sensor and system for monitoring ECG signals remotely from patients located in non-hospital sites. In this system, a sensor patch containing sensing electrodes, signal processing circuitry and radio or infra-red transmission circuitry is attached to the patient's body and preferably worn for at least a week before its power supply is exhausted and the sensor patch is thrown away. A receiver at a primary site in the vicinity of the patient receives the data transmitted by the sensor patch and stores the sensed data. When the patient feels discomfort or concern, or if the portable unit sounds an alarm, the patient telephones the monitoring station and downloads the stored data from the portable unit via the standard voice telecommunications network. The downloaded ECG data is then monitored and analyzed at the monitoring station. The receiver in the proximity of the patient may be a portable unit carried around by the patient, where the portable unit includes a receiver, a processor for processing the received data to identify abnormalities, a memory for storing the sensed data, and circuitry for interfacing to a telephone line to send the ECG data signals to the monitoring station. The monitoring station decodes the received ECG signals and performs beat and rhythm analysis for classification of the ECG data. If an abnormal condition is discovered, medical personnel in the vicinity of the patient are contacted.

In U.S. Pat. No. 5,522,396, Langer et al. disclose a telemetry system for monitoring the heart of a patient in which a patient station includes telemetering apparatus for transmitting the outputs of patient electrodes to a tele-link unit connected to a monitoring station by telephone lines. As in the Platt et al. system, Langer et al. transmit ECG data to a central location. However, unlike the Platt et al. system, the Langer et al. system checks the ECO data for predetermined events and automatically calls the monitoring station when such events are detected. A similar telemetry system is described by Davis et al. in U.S. Pat. No. 5,544,661 which initiates a cellular phone link from the patient to the central monitoring location when an event is detected.

U.S. Pat. No. 6,416,471 B1 discloses a system monitoring vital signs and capturing data from a patient remotely using radiotelemetry techniques. The System uses a cordless, disposable sensor band with sensors for measuring full wave form ECG, full waveform respiration, skin temperature, and motion, and a transmission circuitry for the detection and transmission of vital signs data of the patient. A signal transfer unit that can either be worn by the patient, e.g., on his or her belt, or positioned nearby receives data from the sensor band, which it then forwards by e.g., radio transmission to a base station, which is designed to connect to conventional phone lines for transferring the collected data to a remote monitoring station for review of medical personnel. The base station may also capture additional clinical data, such as blood pressure.

In a proof-of-concept study Spethmann et al. demonstrated the feasibility of recording, transferring and analysing an electrocardiogram via a mobile phone (electrocardiogram streaming) in marathon runners for a remote transmission to monitoring station (Spethmann et al 2014).

The above-mentioned telemonitoring systems as well as the reference cited therein shall illustrate exemplary devices and systems that may be employed in remote patient management for the purpose of the method as described herein without intending to be limiting.

A remote patient management as used herein relies on the collection of data as described herein with suitable means known in the prior art and their transmission to a remote medical personnel or an automated medical system. Different technological means to achieve these means are known to the person skilled in the art and shall therefore not be described in detail herein.

In a particular preferred embodiment, a device for the remote patient management is used based on a Bluetooth system with a digital tablet (Physio-Gate® PG 1000, GETEMED Medizin-und Informationstechnik AG) as central structural element to transmit vital measurements from the home of the patient a monitoring station at a medical center. Preferably the system comprising different measuring device, preferably a 3-channel ECG device to collect a certain time span, e.g. 2 min, or streaming ECG measurement (PhysioMem® PM 1000 GETEMED Medizin-und Informationstechnik AG), a device to collect peripheral capillary oxygen saturation (SpO2; Masimo Signal Extraction Technology (SET®) and a system to collect blood pressure (UA767PBT, A&D Ltd.) and a body weighing scales (Seca 861, seca GmbH & Co KG). Each device is preferably equipped with a Bluetooth chip and connected to the digital tablet. As a software on the monitoring station in a telemedical center a 'Fontane' (eHealth Connect 2.0, T-Systems International GmbH), which was specifically developed for use in the TIM-HF2 study and described by Koehler et al. 2018.

In a preferred embodiment the data on the health status of the patient is transmitted to a monitoring station for review of a medical personnel or medical automated system. It is particular preferred that the monitoring station comprises means for processing the transmitted data, preferably for alerting and/or guiding the review of a medical personnel.

In a preferred embodiment for each type of transmitted data an alert zone may be assigned. For instance, the monitoring station may actively process the transmitted data and cause an alert as soon as a given transmitted data type or combination of data type are in an alert zone indicating an elevated risk of disease deterioration or an adverse event. In consequence the monitoring station may display, voice or sent an alert directly to a mobile telecommunications device of a medical personnel.

In preferred embodiments the remote patient management comprises telemedical interventions, which preferably relate to any contact initiated by the remote medical personnel or automated medical system with the patient. In preferred embodiments the contact is initiated via a telephone call, video call, an email, a chat program, an SMS or other by other electronic messaging means.

In some embodiments the remote patient management comprises a telemedical interventions in form of a telephone call or video call, in case the data on the health status enter an alert zone.

In some embodiments the remote patient management comprises structured consultations, preferably via telephone, between the medical personal and the patients on a regular basis. During the structured consultations the medical personnel preferably discusses with the patient based upon the remotely transmitted data the disease status, assess symptoms of depression or any other illness, discuss current treatments such as medical prescriptions, advice on initiating or changing current treatments.

In preferred embodiments the structured consultations are on a regular basis with a time span in between contacts of 1 day to 3 months, preferably 1 week to 1 month, most preferably once per month.

In some embodiment structured consultations are in addition initiated when deemed appropriate by the medical personnel or an automated medical system e.g. when the remotely transmitted data indicate changes in disease status, in case of apparent technical problems, to verify vital sign measurements or other data on the health status of the patient.

In some embodiments the remote patient management uses an algorithm for prioritizing the review of remotely managed patients by medical personnel. To this end for instance cut-off values may be defined for parameters derivable from the transmitted data such as bradycardia heart rate, tachycardia heart rate, $SpO_2$, body weight, blood pressure or a self-rated health status.

Based upon the prioritization the work load of the workload and workflow of the remote patient management may be optimized to ensure that patients in particular need may promptly be attended to.

In preferred embodiments a review of the transmitted data is conducted by medical personnel at a regular interval preferably with a time span in between reviewing of less than 1 week, preferably less than 3 days, less than one day or less than 12 hours. In some embodiments a review of the transmitted data is conducted by medical personnel or a medical automated system in real time. When using an algorithm for prioritizing the review of remotely managed patients by medical personnel these time span may be accordingly selected, such that prioritized patient are reviewed more frequently, e.g. twice per day, while patients with are not prioritizes are reviewed once per day or every other day.

In some embodiments the remote patient management comprises consultation, advice or instruction on medication or medical treatments of the remotely managed patient.

In the context of the present invention, "medication" may comprise various treatments and therapeutic strategies which comprise, without limitation in regards to cardiovascular disease, preferably a heart failure, administration of angiotensin-converting enzyme (ACE) inhibitors, Angiotensin-II-receptor blocker (ARB), aldosteron antagonists, beta blockers, diuretics and/or Calcium antagonists.

The remote patient management may preferably include consultation, initiation of hospitalization, initiation of an increased patient care, advice or instruction on the type, frequency and/or dosage of medication, preferably in regards to treating a cardiovascular disease, such as heart failure.

In some embodiments for each type or combination of transmitted data a safe zone or improvement zone may be assigned. For instance, based upon medical data on patients suffering of a cardiovascular disease a zone may be defined in which the patient is feeling optimally well despite his disease condition and/or a zone where an improvement of the disease condition is to be expected. As opposed to using a remote patient management system only to prevent the acute and adverse events, such a remote patient management allows for the progression of the disease or the symptoms to be modified and yield significant positive impact on clinical outcomes.

For instance for a safe zone or improvement zone for patients suffering of heart failure one or more or all of the following targets may be defined: A Heart rate of <75 b.p.m. for patients in sinus rhythm, a blood pressure control: systolic <140 mmHg and diastolic <90 mmHg, for patients with new-onset atrial fibrillation the use of anticoagulant therapy as a long-term treatment and antiarrhythmic therapy, for patients in NYHA class II-IV instigating the use of mineralocorticoid receptor antagonists where possible.

As demonstrated in Koehler et al. 2018 the implementation of telemedical interventions in addition to mere telemonitoring as described herein, possibly prioritized by appropriate data processing and/or instigation of improvement zone or save zones, yields particular good results in improving the life quality and life span of the patients. The surprising additional insight of the methods described herein relates to the finding that early biomarkers may be used assessing the therapeutic benefit for individual patients and deciding whether or not prescribing a remote patient management.

The method described herein relates to the therapy guidance, stratification and/or monitoring of a remote patient management for a patient based on a determination of the level of at least one biomarker selected from the group consisting of proADM, proBNP and proANP.

The expression "at least one biomarker selected from the group consisting of proADM, proBNP and proANP" as well as the expression "proADM, proBNP and/or proANP" are preferably to be understood to encompass all possible combinations including the determination of exactly one of said three biomarker, i.e. proADM, proBNP or proANP, as well as a determination of exactly two of said biomarkers, i.e. a combination of proADM and proBNP, proADM and proBNP, or proBNP and proANP, or a determination of all three biomarkers proADM, proBNP and proANP.

It is further to be understood that said expressions do not exclude the additional determination of further biomarkers or parameters.

It is understood that in the context of the present invention "determining the level of proADM or fragment(s) thereof" or the like refers to any means of determining proADM or a fragment thereof. The fragment can have any length, e.g. at least about 5, 10, 20, 30, 40, 50 or 100 amino acids, so long as the fragment allows the unambiguous determination of the level of proADM or fragment thereof. In particular preferred aspects of the invention, "determining the level of proADM" refers to determining the level of midregional proadrenomedullin (MR-proADM). MR-proADM is a fragment and/or region of proADM.

"Proadrenomedullin" ("Pro-ADM") refers to pre-proADM without the signal sequence (amino acids 1 to 21), i.e. to amino acid residues 22 to 285 of pre-proADM. "Midregional proadrenomedullin" ("MR-proADM") refers to the amino acids 42 to 95 of pre proADM.

The amino acid sequence of MR-proADM is given in SEQ ID NO:4. It is also envisaged herein that a peptide and fragment thereof of pre proADM or MR-proADM can be used for the herein described methods. For example, a peptide and fragment thereof can comprise amino acids 22-41 of pre-proADM (PAMP peptide) or amino acids 95-146 of pre-proADM (mature adrenomedullin). A C-terminal fragment of proADM (amino acids 153 to 185 of preproADM) is called adrenotensin. Fragments of proADM peptides or MR-proADM comprise for example 5 or more amino acids. Fragments of the proADM peptides or fragments of the MR-proADM can comprise, for example, at least about 5, 10, 20, 30 or more amino acids. Accordingly, the fragment of proADM may, for example, be selected from the group consisting of MR-proADM, PAMP, adrenotensin and mature adrenomedullin, preferably herein the fragment is MR-proADM.

Moreover, mid-regional pro-Adrenomedullin (MR-proADM), is disclosed in EP1488209B1 for diagnostic purposes (Struck J, Tao C, Morgenthaler N G, Bergmann A. Identification of an Adrenomedullin precursor fragment in plasma of sepsis patients. Peptides 2004; 25: 1369-72; Morgenthaler N G, Struck J, Alonso C, Bergmann A. Measurement of mid-regional pro-adrenomedullin in plasma with an immunoluminometric assay. Clin Chem 2005; 51:1823-9; Christ-Crain M, Morgenthaler N G, Stolz D, Muller C, Bingisser R, Harbarth S, et al. Pro-adrenomedullin to predict severity and outcome in community-acquired pneumonia [ISRCTN04176397]. Crit Care 2006; 10:R96; Christ-Crain M, Morgenthaler N G, Struck J, Harbarth S, Bergmann A, Muller B. Mid-regional pro-adrenomedullin as a prognostic marker in sepsis: an observational study. Crit Care 2005; 9: R816-24).

The peptide "Adrenomedullin (ADM)" was first described in 1993 (Kitamura et al. (1993), Biochem. Biophys. Res. Commun. 192:553-560) as a novel hypotensive peptide comprising 52 amino acids, which had been isolated from a human pheochromocytoma. In the same year, cDNA coding for a precursor peptide comprising 185 amino acids and the complete amino acid sequence of this precursor peptide were also described (Kitamura et al. (1993), Biochem. Biophys. Res. Commun. 194:720-725). The precursor peptide, which comprises, inter alia, a signal sequence of 21 amino acids at the N-terminus, is referred to as "pre-pro-Adrenomedullin" (pre-pro-ADM). The ADM peptide comprises amino acids 95 to 146 of pre-pro-ADM, from which it is formed by proteolytic cleavage. Some peptide fragments of those formed in the cleavage of the pre-proADM have been characterized in detail, in particular the physiologically active peptides adrenomedullin (ADM) and "PAMP", a peptide comprising 20 amino acids (22-41) which follow the 21 amino acids of the signal peptide in pre-Pro-ADM. Another fragment of unknown function and high ex vivo stability is midregional proAdrenomedullin (MR-proADM) (Struck et al. (2004), Peptides 25(8):1369-72), for which a reliable quantification method has been developed (Morgenthaler et al. (2005), Clin. Chem. 51(10): 1823-9). ADM is an effective vasodilator. The hypotensive effect has been associated particularly with peptide segments in the C-terminal part of ADM.

Peptide sequences of the N-terminus of ADM on the other hand exhibit hypertensive effects (Kitamura et al. (2001), Peptides 22, 1713-1718). N-terminal fragments of (pre) proAdrenomedullin for diagnosis have also been described in EP0622458B1, such as PAMP (Hashida S, Kitamura K, Nagatomo Y, Shibata Y, Imamura T, Yamada K, et al. Development of an ultra-sensitive enzyme immunoassay for human pro-adrenomedullin Nterminal peptide and direct measurement of two molecular forms of PAMP in plasma from healthy subjects and patients with cardiovascular disease. Clin Biochem 2004; 37:14-21).

A C-terminal fragment of (pre)proAdrenomedulin for diagnosis has also been described in EP2111552B1, namely CT-pro-ADM (Adrenotensin).

Furthermore, prior art describes how to determine proAdrenomedullin (proADM) and Adrenomedullin in diagnosis (EP0622458B1, Lewis L K, Smith M W, Yandle T G, Richards A M, Nicholls M G. Adrenomedullin (1-52) measured in human plasma by radioimmunoassay: plasma concentration, adsorption, and storage. Clin Chem 1998; 44:571-7; Ueda S, Nishio K, Minamino N, Kubo A, Akai Y, Kangawa K, et al. Increased plasma levels of adrenomedullin in patients with systemic inflammatory response syndrome. Am J Respir Crit Care Med 1999; 160:132-6; Kobayashi K, Kitamura K, Etoh T, Nagatomo Y, Takenaga M, Ishikawa T, et al. Increased plasma adrenomedullin levels in chronic congestive heart failure. Am Heart J 1996; 131:994-8; Kobayashi K, Kitamura K, Hirayama N, Date H, Kashiwagi T, Ikushima I, et al. Increased plasma adrenomedullin in acute myocardial infarction. Am Heart J 1996; 131:676-80), in particular for the purpose of diagnosing sepsis (EP1121600B1).

```
SEQ ID NO: 1: amino acid sequence of pre-pro-ADM,
185 AS:
MKLVSVALMY LGSLAFLGAD TARLDVASEF RKKWNKWALS

RGKRELRMSSSYPTGLADVK AGPAQTLIRP QDMKGASRSP

EDSSPDAARI RVKRYRQSMNNFQGLRSFGC RFGTCTVQKL

AHQIYQFTDK DKDNVAPRSK ISPQGYGRRRRRSLPEAGPG

RTLVSSKPQA HGAPAPPSGS APHFL

SEQ ID NO: 2: amino acid sequence of pro-ADM
(AS 22-185 of pre pro-ADM):
ARLDVASEF RKKWNKWALS RGKRELRMSSSYPTGLADVK

AGPAQTLIRP QDMKGASRSP EDSSPDAARI

RVKRYRQSMNNFQGLRSFGC RFGTCTVQKL AHQIYQFTDK

DKDNVAPRSK ISPQGYGRRRRRSLPEAGPG RTLVSSKPQA

HGAPAPPSGS APHFL

SEQ ID NO: 3: amino acid sequence of PAMP
(AS 22-41 of pre-pro-ADM):
ARLDVASEFRKKWNKWALSR SEQ ID NO: 4: amino acid sequence of MR-pro-ADM
(AS 45-92 of pre-pro-ADM):
ELRMSSSYPTGLADVKAGPAQTLIRPQDMKGASRSPEDSSPDAARIRV SEQ ID NO: 5: amino acid sequence of mature ADM
(AS 95-146 of pre-pro-ADM):
YRQSMNNFQGLRSFGCRFGTCTVQKLAHQIYQFTDKDKDNVAPRSKISPQ

GY

SEQ ID NO: 6: amino acid sequence of Adrenotensin
or C-terminal-ADM fragment (AS 148- 185 of
pre-pro-ADM):
RRRRRSLPEAGPGRTLVSSKPQAHGAPAPPSGSAPHFL
(Adrenomedullin Uniprot-Number: P353118)
```

It is also envisaged herein that a peptide and fragment thereof of pre-proADM or MR-proADM can be used for the herein described methods. For example, the peptide or the fragment thereof can comprise the amino acids 22-41 of pre-proADM (PAMP peptide) or amino acids 95-146 of pre-proADM (mature adrenomedullin, including the biologically active form, also known as bio-ADM). A C-terminal fragment of proADM (amino acids 153 to 185 of pre proADM) is called adrenotensin. Fragments of the proADM peptides or fragments of the MR-proADM can comprise, for example, at least about 5, 10, 20, 30 or more amino acids. Accordingly, the fragment of proADM may, for example, be selected from the group consisting of MR-proADM, PAMP, adrenotensin and mature adrenomedullin, preferably herein the fragment is MR-proADM.

The determination of these various forms of ADM or proADM and fragments thereof also encompass measuring and/or detecting specific sub-regions of these molecules, for example by employing antibodies or other affinity reagents directed against a particular portion of the molecules, or by determining the presence and/or quantity of the molecules by measuring a portion of the protein using mass spectrometry. Any one or more of the "ADM peptides or fragments" described herein may be employed in the present invention.

The level of proADM in the sample of the subject can be determined by immunoassays as described herein. As used herein, the level of ribonucleic acid or deoxyribonucleic acids encoding "proAdrenomedullin" or "proADM" can also be determined. Methods for the determination of proADM and fragment(s) thereof are known to a skilled person, for example by using products obtained from Thermo Fisher Scientific/B·R·A·H·M·S GmbH.

It is understood that in the context of the present invention "determining the level of proBNP or fragment(s) thereof" or the like refers to any means of determining proBNP or a fragment thereof. The fragment can have any length, e.g. at least about 5, 10, 20, 30, 40, 50 or 100 amino acids, so long as the fragment allows the unambiguous determination of the level of proBNP or fragment thereof. In particular preferred aspects of the invention, "determining the level of proBNP" refers to determining the level of N-terminal pro-B-type natriuretic peptide (NT-pro-BNP). NT-proBNP is a fragment and/or region of proBNP.

"B-type natriuretic peptides (BNP)" are quantitative markers of heart failure. The use of B-type natriuretic peptide (BNP) and its amino-terminal fragment, N-terminal pro-B-type natriuretic peptide (NT-proBNP) significantly increases the diagnostic accuracy in the ED [Januzzi, J. L., Jr., et al., Am J Cardiol, 2005. 95 (8): p. 948-54; Maisel, A. S., et al., N Engl J Med, 2002. 347 (3): p. 161-7], and thereby improves patient evaluation and treatment [Moe, G. W., et al., Circulation, 2007. 115 (24): p. 3103-10; Mueller, C., et al., N Engl J Med, 2004. 350 (7): p. 647-54.]. The concentration of atrial natriuretic peptide (ANP) in the circulation is approximately 50- to 100-fold higher than BNP [Pandey, K. N., Peptides, 2005. 26 (6): p. 901-32]. Therefore, the biological signal reflected by the increased ANP may be pathophysiologically and therefore diagnostically even more important than the signal of BNP. Despite this, little is known about the diagnostic performance of ANP and its precursors [Cowie, M. R., et al., Lancet, 1997. 350 (9088): p. 1349-53]. Mature ANP is derived from the precursor N-terminal-proANP (NT-proANP), which is significantly more stable in the circulation than the mature peptide and is therefore thought to be a more reliable analyte [Vesely, D. L., IUBMB Life, 2002. 53 (3): p. 153-[Pandey, K. N., Peptides, 2005. 26 (6): p. 901-32]. Nevertheless, due to the fact that NT-proANP might be subject to further fragmentation [Cappellin, E., et al., Clin Chim Acta, 2001. 310 (1): p. 49-52], immunoassays for measurement of mid-regional proANP (MR-proANP) may have an advantage [Morgenthaler, N. G., et al., 2004. 50 (1): p. 234-6].

The sequence of the 134 amino acid precursor peptide of brain natriuretic peptide (pre-pro-BNP) is given in SEQ ID NO:7. Pro-BNP relates to amino acid residues 27 to 134 of pro-pro-BNP. The sequence of pro-BNP is shown in SEQ ID NO:8. Pro-BNP is cleaved into N-terminal pro-BNP (NT-pro-BNP) and mature BNP. NT-pro-BNP comprises the amino acid residues 27 to 102 and its sequence is shown in SEQ ID NO:9. The SEQ ID NO:10 shows the sequence of BNP comprising the amino acid residues 103 to 134 of the pre-pro-BNP peptide.

```
SEQ ID NO: 7: (amino acid sequence of pre-pro-BNP):
MDPQTAPSRA LLLLLFLHLA FLGGRSHPLG SPGSASDLET

SGLQEQRNHL QGKLSELQVE QTSLEPLQES PRPTGVWKSR

EVATEGIRGH RKMVLYTLRA PRSPKMVQGS GCFGRKMDRI

SSSSGLGCKV LRRH

SEQ ID NO: 8: (amino acid sequence of pro-BNP):
HPLGSPGSAS DLETSGLQEQ RNHLQGKLSE LQVEQTSLEP

LQESPRPTGV WKSREVATEG IRGHRKMVLY TLRAPRSPKM

VQGSGCFGRK MDRISSSSGL GCKVLRRH

SEQ ID NO: 9: (amino acid sequence of NT-pro-BNP):
HPLGSPGSAS DLETSGLQEQ RNHLQGKLSE LQVEQTSLEP

LQESPRPTGV WKSREVATEG IRGHRKMVLY TLRAPR

SEQ ID NO: 10: (amino acid sequence of BNP):
SPKMVQGSGC FGRKMDRISS SSGLGCKVLR RH
(BNP Uniprot Number: P16860)
```

In particular preferred embodiment NT-proBNP is measured to determine the level of proBNP The length of proBNP fragments is therefore preferably at least 12 amino acids, preferably more than 20 amino acids, more preferably more than 40 amino acids.

The determination of these various forms of proBNP and fragments thereof also encompass measuring and/or detecting specific sub-regions of these molecules, for example by employing antibodies or other affinity reagents directed against a particular portion of the molecules, or by determining the presence and/or quantity of the molecules by measuring a portion of the protein using mass spectrometry. Any one or more of the "proBNP peptides or fragments" described herein may be employed in the present invention.

The level of proBNP in the sample of the subject can be determined by immunoassays as described herein. As used herein, the level of ribonucleic acid or deoxyribonucleic acids encoding "B-type natriuretic peptides" or "proBNP" can also be determined. Methods for the determination of proBNP and fragment(s) thereof are known to a skilled person, for example by using products obtained from Thermo Fisher Scientific/B·R·A·H·M·S GmbH.

It is understood that in the context of the present invention "determining the level of proANP or fragment(s) thereof" or the like refers to any means of determining proANP or a fragment thereof. The fragment can have any length, e.g. at least about 5, 10, 20, 30, 40, 50 or 100 amino acids, so long as the fragment allows the unambiguous determination of the level of proANP or fragment thereof. In particular preferred aspects of the invention, "determining the level of proANP" refers to determining the level of mid-regional proANP (MR-proANP). MR-proANP is a fragment and/or region of proANP.

The amino acid sequence of the "atrial natriuretic peptide (ANP)" is given in SEQ ID NO:13. The sequence of the 153 amino acid pre-pro-ANP is shown in SEQ ID NO:11. Upon cleavage of an N-terminal signal peptide (25 amino acids) and the two C-terminal amino acids (127/128) proANP (SEQ ID NO:12) is released. ANP comprises residues 99-126 from the C-terminus of the precursor prohormone pro-ANP. This prohormone is cleaved into the mature 28 amino acid peptide ANP, also known as ANP (1-28) or α-ANP, and the amino terminal fragment ANP (1-98) (NT-proANP, SEQ ID NO:14). Mid-regional proANP (MR-proANP) is defined as NT-proANP or any fragments thereof comprising at least amino acid residues 53-90 (SEQ ID NO:15) of proANP. The C-terminal two arginine residues (positions 152 and 153 in pre-pro-ANP, SEQ ID NO:11, are not present in another allele of the gene encoding pre-pro-ANP, thus pre-pro-ANP may comprise only residues 1 to 151. This of course is also true for the respective fragments of pre-pro-ANP, particularly pro-ANP.

"pro-atrial natriuretic peptide" or "proANP" refers to the pro-hormone comprising 128 amino acids. As used herein, a peptide comprising 28 amino acids (99-126) of the C-terminal section of a pro-hormone comprising 128 amino acids (proANP) is referred to as the actual hormone ANP. Upon release of ANP from its pro-hormone proANP, an equimolar amount of the remaining larger partial peptide of proANP, the N-terminal proANP, consisting of 98 amino acids (NT-proANP; proANP (1-98)) is released into circulation. As NT-proANP possesses a significantly greater half life time and stability NT-proANP can be used as laboratory parameter for diagnosis, follow-up and therapy control; see, for example, Lothar Thomas (Editor), Labor und Diagnose, 5th expanded ed., sub-chapter 2.14 of chapter 2, Kardiale Diagnostik, pages 116-118, and WO 2008/135571. The level of proANP is preferably measured in the plasma or serum of a subject.

"Atrial natriuretic peptide (ANP)", a member of the natriuretic peptide family, regulates several physiological parameters including diuresis and natriuresis, and lower arterial blood pressure (BP). It is predominantly produced in the atrium of the heart and comprises 98% of natriuretic peptides in the circulation (Vesely D L. Life 2002; 53:153-159). ANP is derived from the cleavage of its precursor pro-hormone, which is significantly more stable in the circulation than the mature peptide. A midregional fragment of the precursor hormone (amino acids 53-90 of NT-proANP), called midregional-proANP (MR-proANP), may be relatively resistant to degradation by exoproteases, unlike epitopes in the N- or C-terminals of proANP used in previous immunoassays (Morgenthaler N G et al. Clin Chem 2004; 50:234-236; Gerszten R E et al. 2008. Am J Physiol Lung Cell Mol Physiol).

```
SEQ ID NO: 11: (amino acid sequence of
pre-proANP, 153 AS):
MSSFSTTTVS FLLLLAFQLL GQTRANPMYN AVSNADLMDF

KNLLDHLEEK MPLEDEVVPP QVLSEPNEEA GAALSPLPEV

PPWTGEVSPA QRDGGALGRG PWDSSDRSAL LKSKLRALLT

APRSLRRSSC FGGRMDRIGA QSGLGCNSFR YRR

SEQ ID NO: 12: (amino acid sequence of proANP):
NPMYNAVSNA DLMDFKNLLD HLEEKMPLED EVVPPQVLSE

PNEEAGAALS PLPEVPPWTG EVSPAQRDGG ALGRGPWDSS

DRSALLKSKL RALLTAPRSL RRSSCFGGRM DRIGAQSGLG

CNSFRY

SEQ ID NO: 13: (amino acid sequence of ANP,
AS 124-151 of pre-proANP):
SLRRSSCFGG RMDRIGAQSG LGCNSFRY SEQ ID NO: 14: (amino acid sequence of NT-proANP,
AS 26- 123 of pre-proANP):
NPMYNAVSNA DLMDFKNLLD HLEEKMPLED EVVPPQVLSE

PNEEAGAALS PLPEVPPWTG EVSPAQRDGG ALGRGPWDSS

DRSALLKSKL RALLTAPR

SEQ ID NO: 15: (amino acid sequence of MR-proANP,
AS 53-90 of proANP):
PEVPPWT GEVSPAQRDG GALGRGPWDS SDRSALLKSK L
(Atrial natriuretic peptide Uniprot Number: P01160)
```

The determination of these various forms of proANP and fragments thereof also encompass measuring and/or detecting specific sub-regions of these molecules, for example by employing antibodies or other affinity reagents directed against a particular portion of the molecules, or by determining the presence and/or quantity of the molecules by measuring a portion of the protein using mass spectrometry. Any one or more of the "proANP peptides or fragments" described herein may be employed in the present invention.

The level of proANP in the sample of the subject can be determined by immunoassays as described herein. As used herein, the level of ribonucleic acid or deoxyribonucleic acids encoding "Atrial natriuretic peptide" or "proANP" can also be determined. Methods for the determination of proANP and fragment(s) thereof are known to a skilled person, for example by using products obtained from Thermo Fisher Scientific/B·R·A·H·M·S GmbH.

The term "fragment" refers to smaller proteins or peptides derivable from larger proteins or peptides, which hence comprise a partial sequence of the larger protein or peptide. Said fragments are derivable from the larger proteins or peptides by deletion of one or more of amino acids from the larger protein or peptide. "Fragments" of the biomarker described herein preferably relate to fragments of at least 6 amino acids in length, most preferably at least 12 amino acid residues in length. Such fragments are preferably detectable with immunological assays as described herein.

Accordingly, the methods and kits of the present invention can also comprise determining at least one further biomarker, marker, clinical score and/or parameter in addition to proADM, proBNP and/or proANP.

As used herein, a parameter is a characteristic, feature, or measurable factor that can help in defining a particular system. A parameter is an important element for health- and physiology-related assessments, such as a disease/disorder/clinical condition risk, preferably organ dysfunction(s), the risk assessment for adverse events or the need or expandability for a remote patient management. Furthermore, a parameter is defined as a characteristic that is objectively measured and evaluated as an indicator of normal biological processes, pathogenic processes, pharmacologic responses to a therapeutic intervention or disease or health status, in particular the disease or health status of a patient suffering of a cardiovascular disease.

An exemplary parameter can be selected from the group consisting of age, weight, sex, body mass index, gender, quid intake, white blood cell count, sodium, potassium, temperature, ethnic background, blood creatinine, left ventricular ejection fraction (LVEF), right ventricular ejection fraction (LVEF), NYHA class, MAGGIC heart failure risk score, ACC/AHA class, risk scores for heart failure (including e.g. CHARM Risk Score, CORONA Risk Score, I-Preserve Score, ADHERE Classification and Regression Tree (CART) Model, EFFECT Risk Score), type of medical treatment, frequency of medical treatment, blood pressure (systolic/diastolic), heart rate, heart rhythm by ECG, partial pressure of oxygen, peripheral oxygen concentration (SpO2), jugular venous pressure, presence of peripheral edema or orthopnea, presence of right ventricular heave, self-rated health status (scale), self-rated symptoms of cardiovascular disease progression (including aching, breathlessness, burning, cramping, discomfort, fullness, heaviness, indigestion, lightheadedness, nausea, numbness, tinging, pain, pressure, shortness of breath, sweating, dizziness, squeezing, tightness, vomiting, irregular heartbeat, palpitations, chest pounding, fatigue, weakness, presence of peripheral edema), a parameter indicating renal function, preferably creatinine clearance rate, glomerular filtration rate (GFR) or the level of at least one waste substance of creatinine and urea the or a parameter indicating hepatic function.

In preferred embodiments the at least one clinical parameter is preferably age, weight, body mass index, gender, ethnic background, blood creatinine, left ventricular ejection fraction (LVEF), NYHA class, MAGGIC heart failure risk score, state of medical treatment, blood pressure (systolic/diastolic), heart rate, heart rhythm by ECG, SpO$_2$, self-rated health status (scale), self-rated symptoms of cardiovascular disease progression or the glomerular filtration rate (GFR).

As used herein, "age" refers to the length of time that an individual has lived in years.

As used herein, the "body mass index (BMI)" is a value derived from the mass (weight) and height of the subject. The BMI is defined as the body mass of the subject, i.e., weight, divided by the square of the body height of the subject, and is universally expressed in units of kg/m2, resulting from weight in kilograms and height in metre. The BMI may also be determined using a table or chart (reference values), which displays BMI as a function of mass and height using contour lines or colors for different BMI categories, and may use two different units of measurement. The BMI is an attempt to quantify the amount of tissue mass (muscle, fat, and bone) in an individual, and then categorize that person as underweight, normal weight, overweight, or obese based on that value. Commonly accepted BMI ranges are underweight: under 18.5, normal weight: 18.5 to 25, overweight: 25 to 30, obese: over 30.

As used herein, the "weight" refers to the mass of the subject in kg. In the context of the present invention, a normal body weight can be theoretically calculated according to the Devin Formula or the Hamwi method. According to the Hamwi method, the ideal body weight of a man is 48 kg plus 2.7 kg for every 2.54 cm over 1.5 m. For women, it is 45 kg plus 2.3 kg for every 2.54 cm over 1.5 m. Values below or above these normal values increase the risk to be a critical subject and/or indicate disease progression.

As used herein, the term "glomerular filtration rate (GFR)" refers to the rate at which the kidneys filter the blood, removing excess wastes and fluids, and provides a calculation to measure remaining kidney function. Typically GFR is not measured directly in humans, but instead assessed from clearance measurements or serum levels of filtration markers, exogenous or endogenous solutes that are mainly eliminated by glomerular filtration. GFR may be calculated using mathematical formulas, as well known in the art, e.g. by comparing a person's size, age, sex, and/or race to serum creatinine levels.

In some embodiments GFR is calculated using a formula for an estimated creatinine clearance rate (eC$_{Cr}$) as published in Cockroft et al. 1976:

$$C_{cr} = \frac{(140-\text{age}) \times (\text{wt})}{72 \times S_{cr}}$$

Herein wt refers to weight in kilogram (kg) and S$_{cr}$ refers to the serum creatinine level in mg/100 ml. The resulting value is preferably multiplied by a constant of 0.85 if the patient is female.

When serum creatinine is measured in pmol/L the formula is preferably adapted as follows:

$$C_{cr} = \frac{(140-\text{age}) \times (\text{wt})}{S_{cr}}$$

Herein wt refers to weight in kilogram (kg) and S$_{cr}$ refers to the serum creatinine level in pmol/L. The resulting value is preferably multiplied by a constant 1.23 if the patient is male, and 1.04 if the patient is a female. Said embodiment is preferably referred to as GFR based on Cockroft-Gault.

In some embodiments GFR is calculated using a formula termed Chronic Kidney Disease Epidemiology Collaboration (CKD-EPI) equation as published in Levey, A. S., et al. (2009) see: table 2):

| Race and Sex | | Serum Creatinine (S$_{cr}$) μmol/L (mg/dL) | Equation for calculating GFR |
|---|---|---|---|
| Black | Female | ≤62 (≤0.7) | GFR = 166 × (Scr/0.7)$^{-0.329}$ × (0.993)$^{Age}$ |
| | | >62 (>0.7) | GFR = 166 × (Scr/0.7)$^{-1.209}$ × (0.993)$^{Age}$ |
| | Male | ≤80 (≤0.9) | GFR = 163 × (Scr/0.9)$^{-0.411}$ × (0.993)$^{Age}$ |
| | | >80 (>0.9) | GFR = 163 × (Scr/0.9)$^{-1.209}$ × (0.993)$^{Age}$ |
| White or other | Female | ≤62 (≤0.7) | GFR = 144 × (Scr/0.7)$^{-0.329}$ × (0.993)$^{Age}$ |
| | | >62 (>0.7) | GFR = 144 × (Scr/0.7)$^{-1.209}$ × (0.993)$^{Age}$ |
| | Male | ≤80 (≤0.9) | GFR = 141 × (Scr/0.9)$^{-0.411}$ × (0.993)$^{Age}$ |
| | | >80 (>0.9) | GFR = 141 × (Scr/0.9)$^{-1.209}$ × (0.993)$^{Age}$ |

Said embodiment is preferably referred to as GFR based on CKD-EPI.

It is to be understood that as used herein the term glomerular filtration rate (GFR) is not limited to the above mentioned estimations, but may equally employ any estimation or measurement technique as described e.g. in Levey et al. 2017 as well as the reference cited therein.

In certain embodiments, a small volume blood sample is used to monitor renal function. As used herein, the term "renal function" is used to describe the state of health of the patient's kidneys, including their excretory function, as determined by a test or assay described herein or as is well known in the art. The renal function may be monitored, in some embodiments, by determining the glomerular filtration rate, by determining the creatinine clearance rate, or by determining the level of at least one waste substance of creatinine and urea.

In some embodiment, the renal function is monitored by determining the level of creatinine, blood urea nitrogen (BUN), or both in the sample using standard methods (See, e.g., Alfawassermann ACE Clinical Chemistry System Operator's Manual, August 2005 revision). If the kidney function is normal, the blood creatinine levels would fall within about 0.6 and about 1.2 mg/dL or about 53 to about 106 pmol/L for men, within about 0.5 and about 1.1 mg/dL or about 44 to about 97 pmol/L for women, within about 0.5 and about 1.0 mg/dL for teens, within about 0.3 and about 0.7 mg/dL for children, and within about 0.3 and about 1.2 mg/dL for newborns. If the kidney function is normal, the BUN to creatinine ratio is between about 10:1 and about 20:1 for patients over 12 months of age and up to about 30:1 for patients less than 12 months of age.

In some embodiments a GFR of less than 60, preferably less than 50, more preferably less than 30 indicates a renal dysfunction, i.e. that the kidney is not properly functioning.

In some embodiments in addition to determining the level of one or more biomarkers as described herein, a MAGGIC heart failure risk score is used for deciding on whether or not prescribing a remote patient management.

The MAGGIC heart failure risk score has been introduced by Pocock et al. 2013 and takes into account 13 independent clinical parameters (age, gender, diabetes, COPD comorbidity, a diagnosis of heart failure within the last 18 months, smoking status, NYHA class, beta blocker medication, ACEi/ARB medication, BMI, systolic blood pressure, Creatinine and the ejection fraction). The Meta-Analysis Global Group in Chronic (MAGGIC) heart failure risk score has been described to assist in the prognosis of adverse events such as mortality in patients suffering of a heart failure. However, the MAGGIC heart failure may moreover aid in enhancing the confidence of therapeutic descisions in regards to the prescription of a remote patient management, when combined with biomarker measurements as described herein. In general, a lower score of a MAGGIC heart failure risk score may extent the low benefit level of biomarkers for which patients may be safely excluded from a remote patient management.

The term "marker", "surrogate", "prognostic marker", "factor", "biomarker" or "biological marker" are used interchangeably and relates to measurable and quantifiable biological markers (e.g. specific enzyme concentration or a fragment thereof, specific hormone concentration or a fragment thereof, specific gene phenotype distribution in a population, presence of biological substances or a fragment thereof) which serve as indices for health- and physiology-related assessments, such as disease/disorder/clinical condition risk. Furthermore, a biomarker is defined as a characteristic that is objectively measured and evaluated as an indicator of normal biological processes, pathogenic processes, or pharmacologic responses to a therapeutic intervention. A biomarker may be measured on a biosample (as e.g. a blood, urine, or tissue test), it may be a recording obtained from a person (blood pressure, ECG, or Holter), or it may be an imaging test (echocardiogram or CT scan) (Vasan et al. 2006, Circulation 113:2335-2362). Biomarkers can indicate a variety of health or disease characteristics, including the level or type of exposure to an environmental factor, genetic susceptibility, genetic responses to exposures, biomarkers of subclinical or clinical disease, or indicators of response to therapy. Thus, a simplistic way to think of biomarkers is as indicators of disease trait (risk factor or risk biomarker), disease state (preclinical or clinical), or disease rate (progression). Accordingly, biomarkers can be classified as antecedent biomarkers (identifying the risk of developing an illness), screening biomarkers (screening for subclinical disease), diagnostic biomarkers (recognizing overt disease), staging biomarkers (categorizing disease severity), or prognostic biomarkers (predicting future disease course, including recurrence and response to therapy, and monitoring efficacy of therapy). Biomarkers may also serve as surrogate end points. A surrogate end point is one that can be used as an outcome in clinical trials to evaluate safety and effectiveness of therapies in lieu of measurement of the true outcome of interest. The underlying principle is that alterations in the surrogate end point track closely with changes in the outcome of interest. Surrogate end points have the advantage that they may be gathered in a shorter time frame and with less expense than end points such as morbidity and mortality, which require large clinical trials for evaluation. Additional values of surrogate end points include the fact that they are closer to the exposure/intervention of interest and may be easier to relate causally than more distant clinical events. An important disadvantage of surrogate end points is that if clinical outcome of interest is influenced by numerous factors (in addition to the surrogate end point), residual confounding may reduce the validity of the surrogate end point. It has been suggested that the validity of a surrogate end point is greater if it can explain at least 50% of the effect of an exposure or intervention on the outcome of interest. The quantification of the biomarker can be performed by measuring the respective ribonucleic acid, deoxyribonucleic acid, protein, peptide or fragments thereof.

The at least one further biomarker and/or parameter of said subject can be selected from the group consisting of a level of lactate in said sample, a level of creatin, a level of haemoglobin, a level of haematocrit, a level of leucocytes, a level of thrombocytes, a level of sodium, a level of potassium, the soluble fms-like tyrosine kinase-1 (sFlt-1), Histone H2A, Histone H2B, Histone H3, Histone H4, Arginine Vasopressin (AVP), Atrial Natriuretic Peptide (ANP), Myoglobin, Creatin Kinase Neutrophil Gelatinase-Associated Lipocalin (NGAL), Troponin, Cardiac troponin T (cnTNT), C-Reactive Protein (CRP), Pancreatic Stone Protein (PSP), Triggering Receptor Expressed on Myeloid Cells 1 (TREM1), Interleukin-6 (IL-6), Interleukin-1, Interleukin-24 (IL-24), Interleukin-22 (IL-22), Interleukin (IL-20) other ILs, Presepsin (sCD14-ST), Lipopolysaccharide Binding Protein (LBP), Alpha-1-Antitrypsin, Matrix Metalloproteinase 2 (MMP2), Metalloproteinase 2 (MMP8), Matrix Metalloproteinase 9 (MMP9), Matrix Metalloproteinase 7 (MMP7, Placental growth factor (PIGF), Chromogranin A, S100A protein, S100B protein and Tumor Necrosis Factor α (TNFα), Neopterin, Alpha-1-Antitrypsin, pro-arginine vasopressin (AVP, proAVP or Copeptin), Endothelin-1, procalcitonin (PCT), CCL1/TCA3, CCL11, CCL12/MCP-5, CCL13/MCP-4, CCL14, CCL15, CCL16, CCL17/TARC, CCL18, CCL19, CCL2/MCP-1, CCL20, CCL21, CCL22/MDC, CCL23, CCL24, CCL25, CCL26, CCL27, CCL28, CCL3, CCL3L3, CCL4, CCL4L1/LAG-1, CCL5, CCL6, CCL7, CCL8, CCL9, CX3CL1, CXCL1, CXCL10, CXCL11, CXCL12, CXCL13, CXCL14, CXCL15, CXCL16, CXCL17, CXCL2/MIP-2, CXCL3, CXCL4, CXCL5, CXCL6, CXCL7/Ppbp, CXCL9, IL8/CXCL8, XCL1, XCL2, FAM19A1, FAM19A2, FAM19A3, FAM19A4, FAM19A5, CLCF1, CNTF, IL11, IL31, IL6, Leptin, LIF, OSM, IFNA1, IFNA10, IFNA13, IFNA14, IFNA2, IFNA4, IFNA7, IFNB1, IFNE, IFNG, IFNZ, IFNA8, IFNA5/IFNaG, IFNω/IFNW1, BAFF, 4-1 BBL, TNFSF8, CD40LG, CD70, CD95L/CD178, EDA-A1, TNFSF14, LTA/TNFB, LTB, TNFα, TNFSF10, TNFSF11, TNFSF12, TNFSF13, TNFSF15, TNFSF4, IL18, IL18BP, IL1A, IL1 B, IL1F10, IL1F3/IL1RA, IL1F5, IL1F6, IL1F7, ILiF8, IL1RL2, IL1F9, IL33 or a fragment thereof.

In preferred embodiments the further biomarker is an "cardiovascular marker", which is associated with the diagnosis and/or prognosis of cardiovascular diseases such as myoglobin, troponins T (cTnT) and I (cTnI), creatinine kinase MB (CK-MB), FABP, GDF-15, ST-2, procalcitonin (PCT), C-reactive protein (CRP) including proEndothelin-1 and fragments thereof including C-terminal pro-endothelin-1 (CT-proET-1), big-Endothelin-1, Endothelin-1, NT-proEndothelin-1, proANP and fragments thereof including midregional pro-atrial natriuretic peptide (MR-proANP), N-terminal proANP (NT-proANP), ANP, proVasopressin and fragments thereof including C-terminal pro-arginine vasopressin peptide (CT-proAVP), Vasopressin, Neurophysin II, proBNP and fragments thereof including BNP and N-terminal proBNP (NT-proBNP).

In preferred embodiments the additional biomarker is "renal function marker", which is associated with the renal function or the diagnosis and/or prognosis of renal diseases, including actute kidney injury (AKI) or chronic kidney disease (CKD), such as Creatinine, Serum creatinine, urea, uric acid, cystatin C, 3-Trace Protein (BTB), Inulin, Iohexol, radioactive markers, proteinuria, urine albumin, kidney injury marker-1 (KIM-1), Neutrophil gelatinase-associated lipocalin (NGAL), Interleukin-18, Liver-type fatty acid-binding protein (L-FABP), Asymmetric dimethylarginine (ADMA), Lactate dehydrogenase (LDH), Glutathione-Stransferase (GST), N-acetyl-β-glucosaminidase (NAG), Alanine aminopeptidase (AAP), γ-Glutamyltransferase (GGT), Tissue inhibitor of metalloproteinases-2 (TIMP-2) and/or Insulin like growth factor-binding protein 7 (IG-FBPT).

For further review on preferred biomarkers associated with renal function a person skilled in the art may also rely on published review articles such as Krstic et al. 2016 or Gowda et al. 2010.

As used herein, the term "sample" is a biological sample that is obtained or isolated from the patient or subject. "Sample" as used herein may, e.g., refer to a sample of bodily fluid or tissue obtained for the purpose of diagnosis, prognosis, therapy guidance, stratification, monitoring or control or evaluation of a subject of interest, such as a patient. Preferably herein, the sample is a sample of a bodily fluid, such as blood, serum, plasma, cerebrospinal fluid, urine, saliva, sputum, pleural effusions, cells, a cellular extract, a tissue sample, a tissue biopsy, a stool sample and the like. Particularly, the sample is blood, blood plasma, blood serum, or urine.

Embodiments of the present invention refer to the isolation of a first sample and the isolation of a second sample, optionally a "third sample", a "fourth sample" etc. In the context of the method of the present invention, the terms "first sample" and "second sample" as well as possible "third samples" or "fourth samples" etc. relate to the relative determination of the temporal order of isolation of the samples employed in the method of the present invention. When the terms first sample and second sample are used in specifying the present method, these samples are not to be considered as absolute determinations of the number of samples taken. Therefore, additional samples may be isolated from the patient before, during or after isolation of the first and/or the second sample, or between the first or second samples, wherein these additional samples may or may not be used in the method of the present invention. The first sample may therefore be considered as any previously obtained sample. The second sample may be considered as any further or subsequent sample.

"Plasma" in the context of the present invention is the virtually cell-free supernatant of blood containing anticoagulant obtained after centrifugation. Exemplary anticoagulants include calcium ion binding compounds such as EDTA or citrate and thrombin inhibitors such as heparinates or hirudin. Cell-free plasma can be obtained by centrifugation of the anticoagulated blood (e.g. citrated, EDTA or heparinized blood), for example for at least 15 minutes at 2000 to 3000 g.

"Serum" in the context of the present invention is the liquid fraction of whole blood that is collected after the blood is allowed to clot. When coagulated blood (clotted blood) is centrifuged serum can be obtained as supernatant.

As used herein, "urine" is a liquid product of the body secreted by the kidneys through a process called urination (or micturition) and excreted through the urethra.

According to the present invention proADM, proBNP and/or proANP and/or optionally other markers or clinical scores are employed as markers for therapy guidance, therapy stratification and/or therapy control of a patient having been diagnosed with a cardiovascular disease as well as optionally prognosis, diagnosis, risk assessment and risk stratification of an adverse event in the health of a patient having been diagnosed with a cardiovascular disease, preferably heart failure.

A skilled person is capable of obtaining or developing means for the identification, measurement, determination and/or quantification of any one of the above proADM, proBNP, and/or proANP molecules, or fragments or variants thereof, as well as the other markers of the present invention according to standard molecular biological practice.

The level of proADM, proBNP and/or proANP or fragments thereof as well as the levels of other markers of the present invention can be determined by any assay that reliably determines the concentration of the marker. Particularly, mass spectrometry (MS) and/or immunoassays can be employed as exemplified in the appended examples. As used herein, an immunoassay is a biochemical test that measures the presence or concentration of a macromolecule/polypeptide in a solution through the use of an antibody or antibody binding fragment or immunoglobulin.

Methods of determining proADM, proBNP and/or proANP or other the markers used in the context of the present invention are intended in the present invention. By way of example, a method may be employed selected from the group consisting of mass spectrometry (MS), luminescence immunoassay (LIA), radioimmunoassay (RIA), chemiluminescence- and fluorescence-immunoassays, enzyme immunoassay (EIA), Enzyme-linked immunoassays (ELISA), luminescence-based bead arrays, magnetic beads based arrays, protein microarray assays, rapid test formats such as for instance immunochromatographic strip tests, rare cryptate assay, and automated systems/analyzers.

Determination of proADM, proBNP and/or proANP and optionally other markers based on antibody recognition is a preferred embodiment of the invention. As used herein, the term, "antibody" refers to immunoglobulin molecules and immunologically active portions of immunoglobulin (Ig) molecules, i.e., molecules that contain an antigen binding site that specifically binds (immuno reacts with) an antigen. According to the invention, the antibodies may be monoclonal as well as polyclonal antibodies. Particularly, antibodies that are specifically binding to at least proADM, proBNP and/or proANP or fragments thereof are used.

An antibody is considered to be specific, if its affinity towards the molecule of interest, e.g. proADM, proBNP and/or proANP, or the fragment thereof is at least 50-fold higher, preferably 100-fold higher, most preferably at least 1000-fold higher than towards other molecules comprised in a sample containing the molecule of interest. It is well known in the art how to develop and to select antibodies with a given specificity. In the context of the invention, monoclonal antibodies are preferred. The antibody or the antibody binding fragment binds specifically to the herein defined markers or fragments thereof. In particular, the antibody or the antibody binding fragment binds to the herein defined peptides of proADM, proBNP and/or proANP. Thus, the herein defined peptides can also be epitopes to which the antibodies specifically bind. Further, an antibody or an antibody binding fragment is used in the methods and kits of the invention that binds specifically to ADM or proADM, particularly to MR-proADM, to proBNP, particularly to NT-proBNP and/or to proANP, particularly to MR-proANP.

Further, an antibody or an antibody binding fragment is used in the methods and kits of the invention that binds specifically to proADM, proBNP and/or proANP or fragments thereof and optionally to other markers of the present inventions. Exemplary immunoassays can be luminescence immunoassay (LIA), radioimmunoassay (RIA), chemiluminescence- and fluorescence-immunoassays, enzyme immunoassay (EIA), Enzyme-linked immunoassays (ELISA), luminescence-based bead arrays, magnetic beads based arrays, protein microarray assays, rapid test formats, rare cryptate assay. Further, assays suitable for point-of-care testing and rapid test formats such as for instance immune-chromatographic strip tests can be employed. Automated immunoassays are also intended, such as the KRYPTOR assay.

Alternatively, instead of antibodies, other capture molecules or molecular scaffolds that specifically and/or selectively recognize proADM, proBNP and/or proANP may be encompassed by the scope of the present invention. Herein, the term "capture molecules" or "molecular scaffolds" comprises molecules which may be used to bind target molecules or molecules of interest, i.e. analytes (e.g. proADM, proADM, MR-proADM, proBNP, NT-proBNP, proANP, and/or MR-proANP), from a sample. Capture molecules must thus be shaped adequately, both spatially and in terms of surface features, such as surface charge, hydrophobicity, hydrophilicity, presence or absence of lewis donors and/or acceptors, to specifically bind the target molecules or molecules of interest. Hereby, the binding may, for instance, be mediated by ionic, van-der-Waals, pi-pi, sigma-pi, hydrophobic or hydrogen bond interactions or a combination of two or more of the aforementioned interactions or covalent interactions between the capture molecules or molecular scaffold and the target molecules or molecules of interest. In the context of the present invention, capture molecules or molecular scaffolds may for instance be selected from the group consisting of a nucleic acid molecule, a carbohydrate molecule, a PNA molecule, a protein, a peptide and a glycoprotein. Capture molecules or molecular scaffolds include, for example, aptamers, DARpins (Designed Ankyrin Repeat Proteins). Affimers and the like are included.

In certain aspects of the invention, the method comprises an immunoassay comprising the steps of:
a) contacting the sample with
  i. a first antibody or an antigen-binding fragment or derivative thereof specific for a first epitope of proADM, proBNP and/or proANP, and
  ii. a second antibody or an antigen-binding fragment or derivative thereof specific for a second epitope of proADM, proBNP and/or proANP; and
b) detecting the binding of the two antibodies or antigen-binding fragments or derivates thereof to proADM, proBNP and/or proANP.

Preferably, one of the antibodies can be labeled and the other antibody can be bound to a solid phase or can be bound selectively to a solid phase. In a particularly preferred aspect of the assay, one of the antibodies is labeled while the other is either bound to a solid phase or can be bound selectively to a solid phase. The first antibody and the second antibody can be present dispersed in a liquid reaction mixture, and wherein a first labeling component which is part of a labeling system based on fluorescence or chemiluminescence extinction or amplification is bound to the first antibody, and a second labeling component of said labeling system is bound to the second antibody so that, after binding of both antibodies to proADM, proBNP and/or proANP or fragments thereof to be detected, a measurable signal which permits detection of the resulting sandwich complexes in the measuring solution is generated. The labeling system can comprise a rare earth cryptate or chelate in combination with a fluorescent or chemiluminescent dye, in particular of the cyanine type.

In a preferred embodiment, the method is executed as heterogeneous sandwich immunoassay, wherein one of the antibodies is immobilized on an arbitrarily chosen solid phase, for example, the walls of coated test tubes (e.g. polystyrol test tubes; coated tubes; CT) or microtiter plates, for example composed of polystyrol, or to particles, such as for instance magnetic particles, whereby the other antibody has a group resembling a detectable label or enabling for selective attachment to a label, and which serves the detection of the formed sandwich structures. A temporarily delayed or subsequent immobilization using suitable solid phases is also possible.

The method according to the present invention can furthermore be embodied as a homogeneous method, wherein the sandwich complexes formed by the antibody/antibodies and the marker, proADM, proBNP and/or proANP or a fragment thereof, which is to be detected remains suspended in the liquid phase. In this case it is preferred, that when two antibodies are used, both antibodies are labeled with parts of a detection system, which leads to generation of a signal or triggering of a signal if both antibodies are integrated into a single sandwich. Such techniques are to be embodied in particular as fluorescence enhancing or fluorescence quenching detection methods. A particularly preferred aspect relates to the use of detection reagents which are to be used pair-wise, such as for example the ones which are described in U.S. Pat. No. 4,882,733, EP0180492 or EP0539477 and the prior art cited therein. In this way, measurements in which only reaction products comprising both labeling components in a single immune-complex directly in the reaction mixture are detected, become possible. For example, such technologies are offered under the brand names TRACE® (Time Resolved Amplified Cryptate Emission) or KRYPTOR®, implementing the teachings of the above-cited applications. Therefore, in particular preferred aspects, a diagnostic device is used to carry out the herein provided method. For example, the level of proADM, proBNP and/or proANP or fragments thereof and/or the level of any further marker of the herein provided method, is determined. In particular preferred aspects, the diagnostic device is KRYPTOR® or correlating automated systems.

The level of the marker of the present invention, e.g. proADM, proBNP and/or proANP or fragments thereof, or other markers, can also be determined by a mass spectrometric (MS) based methods. Such a method may comprise detecting the presence, amount or concentration of one or more modified or unmodified fragment peptides of e.g. proADM, proBNP and/or proANP in said biological sample or a protein digest (e.g. tryptic digest) from said sample, and optionally separating the sample with chromatographic methods, and subjecting the prepared and optionally separated sample to MS analysis. For example, selected reaction monitoring (SRM), multiple reaction monitoring (MRM) or parallel reaction monitoring (PRM) mass spectrometry may be used in the MS analysis, particularly to determine the amounts of proADM, proBNP and/or proANP or fragments thereof.

Herein, the term "mass spectrometry" or "MS" refers to an analytical technique to identify compounds by their mass. In order to enhance the mass resolving and mass determining capabilities of mass spectrometry, the samples can be processed prior to MS analysis. Accordingly, the invention relates to MS detection methods that can be combined with immuno-enrichment technologies, methods related to sample preparation and/or chromatographic methods, preferably with liquid chromatography (LC), more preferably with high performance liquid chromatography (HPLC) or ultra high performance liquid chromatography (UHPLC). Sample preparation methods comprise techniques for lysis, fractionation, digestion of the sample into peptides, depletion, enrichment, dialysis, desalting, alkylation and/or peptide reduction. However, these steps are optional. The selective detection of analyte ions may be conducted with tandem mass spectrometry (MS/MS). Tandem mass spectrometry is characterized by mass selection step (as used herein, the term "mass selection" denotes isolation of ions having a specified m/z or narrow range of m/z's), followed by fragmentation of the selected ions and mass analysis of the resultant product (fragment) ions.

The skilled person is aware how quantify the level of a marker in the sample by mass spectrometric methods. For example, relative quantification "rSRM" or absolute quantification can be employed as described above.

Moreover, the levels (including reference levels) can be determined by mass spectrometric based methods, such as methods determining the relative quantification or determining the absolute quantification of the protein or fragment thereof of interest.

Relative quantification "rSRM" may be achieved by:
1. Determining increased or decreased presence of the target protein by comparing the SRM (Selected reaction monitoring) signature peak area from a given target fragment peptide detected in the sample to the same SRM signature peak area of the target fragment peptide in at least a second, third, fourth or more biological samples.
2. Determining increased or decreased presence of target protein by comparing the SRM signature peak area from a given target peptide detected in the sample to SRM signature peak areas developed from fragment peptides from other proteins, in other samples derived from different and separate biological sources, where the SRM signature peak area comparison between the two samples for a peptide fragment are normalized for e.g to amount of protein analyzed in each sample.
3. Determining increased or decreased presence of the target protein by comparing the SRM signature peak area for a given target peptide to the SRM signature peak areas from other fragment peptides derived from different proteins within the same biological sample in order to normalize changing levels of histones protein to levels of other proteins that do not change their levels of expression under various cellular conditions.
4. These assays can be applied to both unmodified fragment peptides and to modified fragment peptides of the target proteins, where the modifications include, but are not limited to phosphorylation and/or glycosylation, acetylation, methylation (mono, di, tri), citrullination, ubiquitination and where the relative levels of modified peptides are determined in the same manner as determining relative amounts of unmodified peptides.

Absolute quantification of a given peptide may be achieved by:
1. Comparing the SRM/MRM signature peak area for a given fragment peptide from the target proteins in an individual biological sample to the SRM/MRM signature peak area of an internal fragment peptide standard spiked into the protein lysate from the biological sample. The internal standard may be a labeled synthetic version of the fragment peptide from the target protein that is being interrogated or the labeled recombinant protein. This standard is spiked into a sample in known amounts before (mandatory for the recombinant protein) or after digestion, and the SRM/MRM signature peak area can be determined for both the internal fragment peptide standard and the native fragment peptide in the biological sample separately, followed by comparison of both peak areas. This can be applied to unmodified fragment peptides and modified fragment peptides, where the modifications include but are not limited to phosphorylation and/or glycosylation, acetylation, methylation (e.g. mono-, di-, or tri-methylation), citrullination, ubiquitinylation, and where the absolute levels of modified peptides can be determined in the same manner as determining absolute levels of unmodified peptides.
2. Peptides can also be quantified using external calibration curves. The normal curve approach uses a constant amount of a heavy peptide as an internal standard and a varying amount of light synthetic peptide spiked into the sample. A representative matrix similar to that of the test samples needs to be used to construct standard curves to account for a matrix effect. Besides, reverse curve method circumvents the issue of endogenous analyte in the matrix, where a constant amount of light peptide is spiked on top of the endogenous analyte to create an internal standard and varying amounts of heavy peptide are spiked to create a set of concentration standards. Test samples to be compared with either the normal or reverse curves are spiked with the same amount of standard peptide as the internal standard spiked into the matrix used to create the calibration curve.

The invention further relates to kits, the use of the kits and methods wherein such kits are used. The invention relates to kits for carrying out the herein above and below provided methods. The herein provided definitions, e.g. provided in relation to the methods, also apply to the kits of the invention. In particular, the invention relates to kits for therapy guidance, stratification and/or monitoring of a remote patient management for a patient having been diagnosed with a cardiovascular disease, wherein the kit comprises detection reagents for determining of at least one biomarker selected from the group consisting of proADM, proBNP and proANP or fragment(s) thereof in a sample from a patient, and reference data, such as reference values for determining whether a level of the at least one biomarker selected from the group consisting of proADM, proBNP and proANP is indicative of prescribing or not prescribing a remote patient management, in particular reference data for a low benefit level the at least one biomarker and a high benefit level of the at least one biomarker, wherein said reference data is preferably stored on a computer readable medium and/or employed in the form of computer executable code configured for comparing the determined at least one biomarker with the reference values, optionally, detection reagents for determining the level of at least one additional biomarker or fragment(s) thereof, in a sample from a patient and/or means for determining at least one clinical parameter, preferably age, weight, body mass index, gender, ethnic background, blood creatinine, left ventricular ejection fraction (LVEF), a right ventricular ejection fraction (LVEF), NYHA class, MAGGIC heart failure risk score, state of medical treatment, blood pressure (systolic/diastolic), heart rate, heart rhythm by electrocardiogram (ECG), peripheral oxygen rate (SpO2), self-rated health status (scale), or a parameter indicating renal function, preferably a creatinine clearance rate and/or a glomerular filtration rate (GFR) and reference data, such as reference values for determining whether a level of the at least one additional biomarker or fragment(s) thereof and/or the at least one clinical parameter is indicative of prescribing or not prescribing a remote patient management, wherein said reference data is preferably stored on a computer readable medium and/or employed in the form of computer executable code configured for comparing the determined levels of said at least one biomarker or fragment(s) thereof and/or said at least one clinical parameter with the reference values.

As used herein, "reference data" comprise reference level(s) of proADM, proBNP and/or proANP and optionally further markers as described herein. The levels of proADM, proBNP and/or proANP and in the sample of the subject can be compared to the reference levels comprised in the reference data of the kit. The reference levels are herein described above and are exemplified also in the appended examples. The reference data can also include a reference sample to which the level of proADM, proBNP and/or proANP and optionally further biomarkers compared. The reference data can also include an instruction manual how to use the kits of the invention.

The kit may additionally comprise items useful for obtaining a sample, such as a blood sample, for example the kit may comprise a container, wherein said container comprises a device for attachment of said container to a cannula or syringe, is a syringe suitable for blood isolation, exhibits an internal pressure less than atmospheric pressure, such as is suitable for drawing a pre-determined volume of sample into said container, and/or comprises additionally detergents, chaotropic salts, ribonuclease inhibitors, chelating agents, such as guanidinium isothiocyanate, guanidinium hydrochloride, sodium dodecylsulfate, polyoxyethylene sorbitan monolaurate, RNAse inhibitor proteins, and mixtures thereof, and/or A filter system containing nitro-cellulose, silica matrix, ferromagnetic spheres, a cup retrieve spill over, trehalose, fructose, lactose, mannose, poly-ethylenglycol, glycerol, EDTA, TRIS, limonene, xylene, benzoyl, phenol, mineral oil, anilin, pyrol, citrate, and mixtures thereof.

As used herein, the "detection reagent" or the like are reagents that are suitable to determine the herein described marker(s), e.g. of proADM, proBNP and/or proANP. Such exemplary detection reagents are, for example, ligands, e.g. antibodies or fragments thereof, which specifically bind to the peptide or epitopes of the herein described marker(s). Such ligands might be used in immunoassays as described above. Further reagents that are employed in the immunoassays to determine the level of the marker(s) may also be comprised in the kit and are herein considered as detection reagents. Detection reagents can also relate to reagents that are employed to detect the markers or fragments thereof by MS based methods. Such detection reagent can thus also be reagents, e.g. enzymes, chemicals, buffers, etc, that are used to prepare the sample for the MS analysis. A mass spectrometer can also be considered as a detection reagent. Detection reagents according to the invention can also be calibration solution(s), e.g. which can be employed to determine and compare the level of the marker(s).

The terms "cut-off values", "reference values" or "threshold values" may be used interchangeably and the specific values described herein might be different in other assays, if these have been "calibrated" differently from the assay systems used in the present invention. Therefore the cut-off values or reference values shall apply for such differently calibrated assays accordingly, taking into account the differences in calibration. One possibility of quantifying the difference in calibration is a method comparison analysis (correlation) of the assay in question (e.g. a Biomarker x assay) with the respective biomarker assay used in the present invention (e.g. Assay name x) by measuring the respective biomarker (e.g. Biomarker x) in samples using both methods. Another possibility is to determine with the assay in question, given this test has sufficient analytical sensitivity, the median biomarker level of a representative normal population, compare results with the median biomarker levels as described in the literature (e.g. a citation for the normal population) and recalculate the calibration based on the difference obtained by this comparison.

The sensitivity and specificity of a diagnostic and/or prognostic test depends on more than just the analytical "quality" of the test, they also depend on the definition of what constitutes an abnormal result. In practice, Receiver Operating Characteristic curves (ROC curves), are typically calculated by plotting the value of a variable versus its relative frequency in "normal" (i.e. apparently healthy individuals not having an infection and "disease" populations, e.g. subjects having an infection. For any particular marker (like proADM, proBNP and/or proANP), a distribution of marker levels for subjects with and without a disease/condition will likely overlap. Under such conditions, a test does not absolutely distinguish normal from disease with 100% accuracy, and the area of overlap might indicate where the test cannot distinguish normal from disease. A threshold is selected, below which the test is considered to be abnormal and above which the test is considered to be normal or below or above which the test indicates a specific condition, e.g. infection or a cardiovascular or cerebrovascular event. The area under the ROC curve is a measure of the probability that the perceived measurement will allow correct identification of a condition. ROC curves can be used even when test results do not necessarily give an accurate number. As long as one can rank results, one can create a ROC curve. For example, results of a test on "disease" samples might be ranked according to degree (e.g. 1=low, 2=normal, and 3=high). This ranking can be correlated to results in the "normal" population, and a ROC curve created. These methods are well known in the art; see, e.g., Hanley et al. 1982. Radiology 143: 29-36. Preferably, a threshold is selected to provide a ROC curve area of greater than about 0.5, more preferably greater than about 0.7, still more preferably greater than about 0.8, even more preferably greater than about 0.85, and most preferably greater than about 0.9. The term "about" in this context refers to +/−5% of a given measurement.

The horizontal axis of the ROC curve represents (1-specificity), which increases with the rate of false positives. The vertical axis of the curve represents sensitivity, which increases with the rate of true positives. Thus, for a particular cut-off selected, the value of (1-specificity) may be determined, and a corresponding sensitivity may be obtained. The area under the ROC curve is a measure of the probability that the measured marker level will allow correct identification of a disease or condition. Thus, the area under the ROC curve can be used to determine the effectiveness of the test.

A ruling-in identifies a minimal proportion of subjects that will actually develop a disease, a disorder or an adverse event and ensure that this true positive group has a sufficiently large proportion of the subjects testing positive. Such test should reach a maximal specificity and maximal positive predictive value (PPV). Herein, a ruling-in preferably refers to indicating that a remote patient management is beneficial and is to be prescribed.

A ruling-out identifies a minimal proportion of subjects that will certainly not develop a disease, a disorder or an adverse event and ensure that of the subjects testing negative, sufficiently few will develop the disease (false negatives). Such test should therefore reach a maximal sensitivity and maximal negative predictive value (NPV). Herein, a ruling-out preferably refers to indicating that a remote patient management is not beneficial and is not to be prescribed.

The methods of the present invention may in part be computer-implemented. For example, the step of comparing the detected level of a marker, e.g. the proADM, proBNP and/or proANP or fragments thereof, with a reference level can be performed in a computer system. In the computer-system, the determined level of the marker(s) can be combined with other marker levels and/or parameters of the subject in order to calculate a score, which is indicative for the diagnosis, prognosis, risk assessment and/or risk stratification. For example, the determined values may be entered (either manually by a health professional or automatically from the device(s) in which the respective marker level(s) has/have been determined) into the computer-system. The computer-system can be directly at a telemedical center, a point-of-care (e.g. primary care, ICU or ED), or it can be at a remote location connected via a computer network (e.g. via the internet, or specialized medical cloud-systems, optionally combinable with other IT-systems or platforms such as hospital information systems (HIS)). Typically, the computer-system will store the values (e.g. marker level or parameters such as age, blood pressure, weight, sex, etc. or clinical scoring systems such as SOFA, qSOFA, BMI etc.) on a computer-readable medium and calculate the score based-on pre-defined and/or pre-stored reference levels or reference values. The resulting score will be displayed and/or printed for the user (typically a health professional such as a physician). Alternatively or in addition, the associated prognosis, diagnosis, assessment, treatment guidance, patient management guidance or stratification will be displayed and/or printed for the user (typically a health professional such as a physician).

In one embodiment of the invention, a software system can be employed, in which a machine learning algorithm is evident, preferably to identify hospitalized patients at risk for sepsis, severe sepsis and septic shock using data from electronic health records (EHRs). A machine learning approach can be trained on a random forest classifier using EHR data (such as labs, biomarker expression, vitals, and demographics) from patients. Machine learning is a type of artificial intelligence that provides computers with the ability to learn complex patterns in data without being explicitly programmed, unlike simpler rule-based systems. Earlier studies have used electronic health record data to trigger alerts to detect clinical deterioration in general. In one embodiment of the invention the processing of proADM, proBNP and/or proANP levels may be incorporated into appropriate software for comparison to existing data sets, for example proADM, proBNP and/or proANP levels may also be processed in machine learning software to assist in diagnosing or prognosing the occurrence of an adverse event or deciding on whether or not prescribing a remote patient management.

As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

Thus, the terms "comprising"/"including"/"having" mean that any further component (or likewise features, integers, steps and the like) can/may be present. The term "consisting of" means that no further component (or likewise features, integers, steps and the like) is present.

The term "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

Thus, the term "consisting essentially of" means those specific further components (or likewise features, integers, steps and the like) can be present, namely those not materially affecting the essential characteristics of the composition, device or method. In other words, the term "consisting essentially of" (which can be interchangeably used herein with the term "comprising substantially"), allows the presence of other components in the composition, device or method in addition to the mandatory components (or likewise features, integers, steps and the like), provided that the essential characteristics of the device or method are not materially affected by the presence of other components.

The term "method" refers to manners, means, techniques and procedures for accomplishing a given task including, but not limited to, those manners, means, techniques and procedures either known to, or readily developed from known manners, means, techniques and procedures by practitioners of the chemical, biological and biophysical arts.

FIGURES

The present invention is further described by reference to the following figures. The figures exemplify non-limiting and potentially preferred embodiments, presented for further illustration of the invention.

BRIEF DESCRIPTION OF THE FIGURES

(FIG. 9A) Using NT-proBNP and for a particular desired safety (sensitivity of 95%) can reduce the patient population recommended for RPM. (FIG. 9B) The recommendation of RPM based on both, NT-proBNP and MR-proADM leads to an even more accurate and efficient selection of patients in this setting for the same desired safety.

FIGS. 15A-15B Boxplot visualization of quarterly biomarker distributions of (FIG. 15A) NT-proBNP and (FIG. 15B) MR-proADM for the two study arms RPM and SOC over time in the TIM-HF2 study. Panel numbers "00" to "12" indicate month of study visit. Vertical axes are log-scaled.

EXAMPLES

Figure 1:
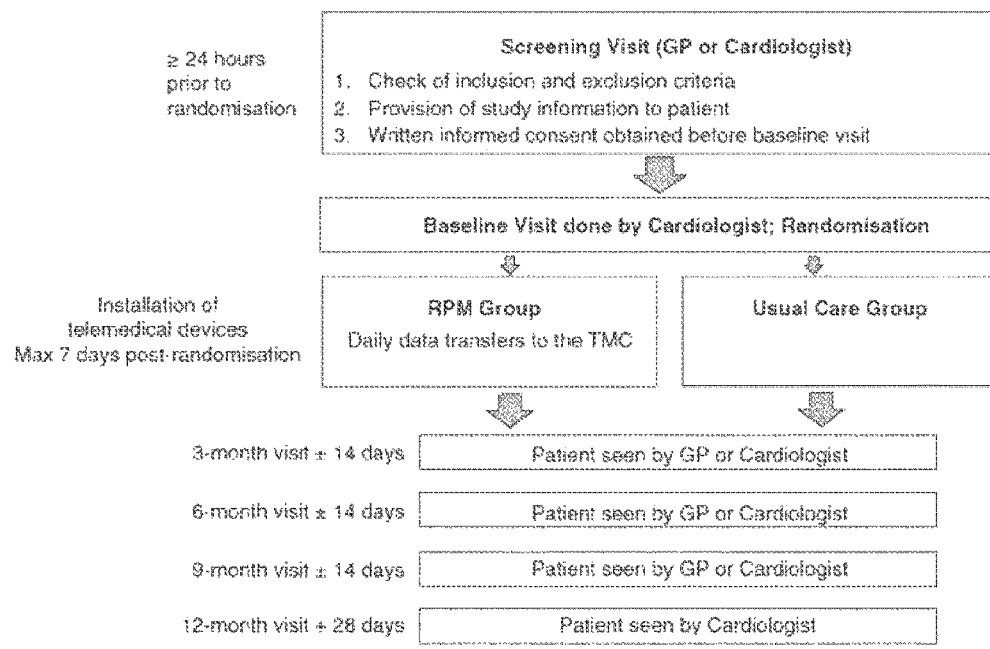
FIG. 1 Trial flow chart of the study
FIG. 2 Trial profile
FIG. 3 Kaplan-Meier cumulative event curve for all-cause death FIG. 4 Forest plot of subgroup analyses for percentage of days lost due to unplanned cardiovascular hospital admissions and all-cause mortality FIG. 5 ROC curve for proADM for death or acute decompensation within 90 days after initial measurement (Usual care patients)

The present invention is further described by reference to the following non-limiting examples. The examples describe non-limiting and practical embodiments, presented for further illustration of the invention.

Methods of the Examples

Study Design and Participants

The present study is part of the Telemedical Interventional Management in Heart Failure II (TIM-HF2), randomized, controlled trial investigating the impact of telemedicine on unplanned cardiovascular hospitalisations and mortality in heart failure. Details on the method of the trial and partly some of the results have been published in Koehler et al. 2018a and Koehler et al. 2018b, which are hereby incorporated by reference.

The TIM-HF2 trial was a prospective, randomised, controlled, parallel-group, unmasked (with randomisation concealment), multicentre trial with pragmatic elements introduced for data collection (ClinicalTrials.gov Identifier: NCT01878630). The trial was done in Germany, and patients were recruited from 200 university, local, and regional hospitals, and cardiology and general practitioner (GP) practices. In total, 113 sites located in 14 metropolitan areas with more than 200 000 inhabitants and/or with a medical university (i.e. Berlin, Dresden, Hamburg, Stuttgart, Frankfurt am Main, Leipzig, Hannover), and in 11 rural areas in Germany (namely: Brandenburg, Bavaria, Thuringia, Saxony, Saxony-Anhalt, Hesse, Baden-Württemberg, Lower Saxony, Mecklenburg-Western Pomerania, North Rhine-Westphalia, Saarland) were included. Forty-three sites were hospitals, 10 sites were university hospitals, and 60 sites were local cardiologist practices. In addition, 87 general practitioners (GPs) collaborated in the study by screening and following up their patients Patients were eligible for inclusion if they had been admitted to hospital for worsening heart failure within 12 months before randomisation, were in functional New York Heart Association class II or III, had a left ventricular ejection fraction of 45% or lower (or if more than 45%, were being treated with oral diuretics). Patients were excluded if they had major depression (ie, PHQ-9 score >9), were on haemodialysis, or had been admitted to hospital for any reason within 7 days before randomisation. In addition, patients with a left ventricular assist device or those who had undergone coronary revascularisation or cardiac resynchronisation therapy implantation within 28 days before randomisation were excluded, as were those who were scheduled for coronary revascularisation, transcatheter aortic valve implantation, mitral clip implantation, or cardiac resynchronisation therapy implantation 3 months after randomisation. The inclusion and exclusion criteria are summarized in Table 1.

The TIM-HF2 trial was designed, implemented, and overseen by an independent steering committee. This report was prepared and submitted for publication by the steering committee. An independent data safety monitoring board reviewed safety data on an ongoing basis. The clinical endpoint committee, masked to study group assignment, adjudicated all deaths and hospitalisations using prospectively defined criteria in the clinical endpoint committee charter. The adjudicated data were used for outcomes regarding hospitalisations and deaths.19 The study complied with good clinical practice in accordance with the Declaration of Helsinki and the laws and regulations applicable in Germany. Written approval from the appropriate ethics committees was obtained.

Patients provided written informed consent, granting permission for the telemedical centre to contact their health insurance company to cross check the hospital admissions reported by the investigators with those on file in the health insurance records. This process was approved by the German Federal Social Insurance Office and done for patients in both study groups.

Randomisation and Masking

Potentially eligible patients were screened for eligibility, and those agreeing to participate and who provided written informed consent were then screened and had baseline measurements and assessments done. Eligible and willing patients were randomly assigned (1:1) using a secure web-based system to either remote patient management plus usual care (remote patient management group) or to usual care alone (usual care group). To ensure a balance of important clinical covariates between the two study groups, we used Pocock's minimisation algorithm with 10% residual randomness. Randomisation was concealed but neither participants nor investigators were masked to group assignment in this open trial.

Procedures and Remote Patient Management

The remote patient management intervention comprised the following: a daily transmission of bodyweight, systolic and diastolic blood pressure, heart rate, analysis of the heart rhythm, peripheral capillary oxygen saturation (SpO2) and a self-rated health status (scale range one to five) to the telemedical centre; a definition of a patient's risk category using the baseline and follow-up visit biomarker data in combination with the daily transmitted data; patient education; and co-operation between the telemedical centre, and the patient's GP and cardiologist.

Home Telemonitoring System

The telemonitoring system, which was installed in the patient's home within 7 days after randomisation, was a multicomponent system:

The system used is based on a Bluetooth system with a digital tablet (Physio-Gate® PG 1000, GETEMED Medizin-und Informationstechnik AG) as the central structural element to transmit vital measurements from the home of the patient to the TMC at the Charité—Universitätsmedizin Berlin. Four measuring devices are part of the system: a 3-channel ECG device to collect a 2 min or streaming ECG measurement (PhysioMem® PM 1000 GETEMED Medizin-und Informationstechnik AG), a device to collect peripheral capillary oxygen saturation (SpO2; Masimo Signal Extraction Technology (SET®), a system to collect blood pressure (UA767PBT, A&D Ltd.) and a body weighing scales (Seca 861, seca GmbH & Co KG). Each device is equipped with a Bluetooth chip and connected to the digital tablet. The TMC software used is 'Fontane' (eHealth Connect 2.0, T-Systems International GmbH), which was specifically developed for use in the TIM-HF2 study. The key innovation of Fontane is a novel self-adapting TMC middleware, which consists of three key components:

An algorithm for the transmitted patient data to identify critical values or missing data, which allows for an immediate identification of the patients requiring immediate (medical) attention, Telecommunication software for a direct communication between TMC staff, patients, GPs, and local cardiologists, as well as Electronic health records for all relevant medical information (e.g. medication plan; reports about previous hospitalisation; laboratory data).

Patients were also provided with a mobile phone to be used to contact the telemedical centre directly in emergency situations. The mobile phone allowed (DORO Easy 510/Doro HandlePlus 334 gsm, Doro A B) to call the TMC directly in case of emergency. In such situations, it is also possible to initiate a live ECG stream using the ECG device. The tablet uses the mobile network to transmit the patient data automatically in an encrypted manner (GSM-encryption via VPN-Tunnel) to a central server of the TMC in Berlin provided by project partner Deutsche Telekom AG. The combination of measurements and personal data with distinct information codes are only executed at a server at the Charité—Universitätsmedizin Berlin. To ensure patient safety, it is required a priori that the average transmission time to get the data to the TMC must be <90 s. The availability of the mobile network connection is provided by the provider Deutsche Telekom AG. The complete data collection process, transmission and processing is done in strict compliance with state-of-the-art confidentiality and technical standards as agreed with and certified by the relevant data protection officer. For authentication of the individual measurements, all data transmissions incorporated unique device identification information. A service level agreement with the technical provider is concluded for first and second level support and corresponding service and escalation concepts.

Remote Patient Management

During the telemonitoring system installation process, certified nurses provided patient training on the system and initiated a heart failure patient education programme; the latter was continued monthly by structured telephone interviews with the patient. The monthly telephone interviews were an integral part of the remote patient management intervention. Combined with the daily data transmissions to the telemedical centre, the patient's clinical and symptomatic status and concomitant medications were assessed, in addition to adherence to the remote patient management intervention and other social and technical issues, which were discussed between the patient and the telemedical centre nurse. Using the wireless system with a digital tablet the data from the patient's was transmitted home to the centre. This was done by using the mobile phone network (secured via a virtual private network tunnel) and transmission of patient data was set at a fixed time daily.

The telemedical centre provided physician-led medical support and patient management 24 h a day, Monday to Sunday, for the entire study period using the Fontane system, a CE-marked telemedical analysis software (T-Systems International GmbH, Frankfurt, Germany). Algorithms were programmed and implemented in this system which guided patient management and allowed the telemedical centre physicians to act promptly (eg, concomitant medication change, initiation of an ambulatory assessment by a home physician, or to hospitalise the patient) and to piroritise high-risk patients.

Patients were categorised as low or high risk using the combination of mid-regional pro-adrenomedullin (MR-proADM) values and the patient transmitted data.

At the baseline visit and at each follow-up visit, biomarkers are taken and analysed by an independent laboratory. The results are sent to the CTC and the TMC. According to defined cut-off values for mid-regional pro-adrenomedullin (MR-proADM), patients are risk categorised as follows: low risk patients (MR-proADM≤1.2 nmol/L) and high risk patients (MR-proADM>1.2 nmol/L). High risk patients were primarily followed by TMC physicians ('doctors care'), and low risk patients by registered TMC nurses ('nurse care'). The risk category was revaluated every 3 months using the MR-proADM results obtained at each follow-up visit.

The prioritization in regard to the transmitted data were managed according to the criteria shown below, wherein physicians and nurses prioritized the workload and workflow so that patients presenting with any of the data cut-off limits are managed with priority:

Bradycardia, heart rate<50 b.p.m
Tachycardia, heart rate>100 b.p.m.
Ventricular tachycardia
New-onset atrial fibrillation
PQ interval>200 ms
QRS duration ≥120 ms
QTc interval>460 ms
SpO2<94%
Body weight (weight gain >1 kg in 1 day, >2 kg in 3 days; >2.5 kg in 8 days)
Blood pressure systolic: <90 or >140 mmHg; diastolic <40 or >90 mmHg
Self-rated health status (grades from 1-very good to 5-very bad): deterioration of about 2 grades starting from 1, or grade 4 or 5)

The Fontane system also enabled direct communication between the telemedical centre staff and the patient, and the patient's GP and local cardiologists, all of whom were involved in the management of the patient. Via the Fontane system, the telemedical centre created a study-specific electronic patient file, which was accessible by both the telemedical centre staff and patient's care provider.

Patients in both study groups were followed up for at least 365 days and up to 393 days after randomisation. All patients were seen by their treating cardiologist at the screening and baseline visit and at the final study visit; the latter was done on day 365 (28-day time window) after randomisation. In between, patient visits were scheduled at 3, 6, and 9 months, and were undertaken by the patient's GP or local cardiologist. At all visits, data were collected in a case report form which included vital signs and bodyweight, and patients were asked about the occurrence of hospital admissions since the last study contact. The study flow is shown in FIG. 1. The assessments performed at each visit are displayed in Table 2.

To avoid contact information and data collection bias, given the daily contact with patients in the remote patient management group, a quality control system was implemented to ensure the accurate and completed reporting of hospital admissions in both the remote patient management plus usual care and usual care groups. This process required the cooperation of patients, investigators, and the patients' respective health insurance companies. The accuracy of data concerning hospital admissions was confirmed using data from the health insurance companies, and a cross check was done with the hospital admissions reported by the investigators.

The RPM intervention consisted thus in particular of the following elements:

A daily transfer of body weight, blood pressure (systolic/diastolic), heart rate, analysis of the heart rhythm as derived from a 2 min 3-channel electrocardiogram (ECG), peripheral capillary oxygen saturation (SpO2) and a self-rated health status (scale range 1-5)

Identification of a patient risk category using the baseline and follow-up visit biomarker values Patient education, and Cooperation between the telemedical centre (TMC), the patient's GP and cardiologist ('doc-to-doc telemedical scenario') with respect to patient management.

Patients randomised to the UC group were followed in accordance with the current standards (i.e. ESC guidelines for HF management) at the discretion of their treating physicians (Ponikowski et al. 2016).

In addition patients allocated to the RPM group undergo a daily structured review of their concomitant medications based on the transmitted data. In consent with the study site physicians, the TMC physicians will optimise concomitant treatments as appropriate to achieve the following targets:

Heart rate<75 b.p.m. for patients in sinus rhythm.
Blood pressure control: systolic <140 mmHg and diastolic <90 mmHg.
Patients with new-onset atrial fibrillation: use of anticoagulant therapy as a long-term treatment and antiarrhythmic therapy.
Patients in NYHA class II-IV: instigate the use of mineralocorticoid receptor antagonists where possible. The aim is to ensure that patients are prescribed the maximally tolerated doses to achieve these targets and, in addition, diuretic doses are adapted in case of weight gain and worsening symptoms.

The telemedical team informs the patients' GP or caring physician by telephone, fax or email about any new events or important clinical findings from the monthly telephone contact, contacts with the emergency doctor, or any intervention made to the patients' therapy as a result of measured telemedical vital parameters. The TMC preferably only advices the patient's primary physician—it is the latter who has the overall responsibility to instigate the medical management of the patients.

Study Outcomes

The primary outcome was the percentage of days lost due to unplanned cardiovascular hospital admissions or death from any cause, comparing remote patient management plus usual care to usual care alone during the individual patient follow-up time. The main secondary outcomes were all-cause mortality and cardiovascular mortality during the individual patient follow-up time plus 28 days after the last study visit, to a maximum of 393 days; percentage of days lost due to unplanned cardiovascular hospital admissions, and percentage of days lost due to unplanned heart failure hospital admissions; change in Minnesota Living with Heart Failure Questionnaire (MLHFQ) global score; and change in N-terminal prohormone brain natriuretic peptide (NT-proBNP) and MR-proADM between randomisation and the final study visit.

The main secondary outcomes, comparing RPM to Usual Care included:

a) All-cause mortality during the individual patient follow-up time (+28 days of the final visit to a maximum 393 days)
b) Cardiovascular mortality during the individual patient follow-up time (+28 days of the final visit to a maximum 393 days)

c) Percentage of days lost due to unplanned cardiovascular hospitalisations during the individual patient follow-up time
d) Percentage of days lost due to unplanned HF-hospitalisations during the individual patient follow-up time
e) Change in MLHFQ-questionnaire global score between baseline and 365 days
f) Change in levels of NT-proBNP and of MR-proADM between baseline and 365 days The following recurrent event analyses were performed:
a) Unplanned cardiovascular hospitalisations and cardiovascular mortality.
b) Unplanned cardiovascular hospitalisations and all-cause mortality.
c) Unplanned HF hospitalisations and cardiovascular mortality.
d) Unplanned HF hospitalisations and all-cause mortality Subgroup analyses is performed for the primary outcome to assess the consistency of intervention effects across the following subgroups:
Metropolitan vs. rural area of medical care.
Male vs. female.
Above/below median age.
LVEF 545% vs. LVEF>45%.
NYHA functional class I/II vs. III/IV.
Cardiac resynchronisation therapy (CRT) at baseline yes/no.
Implantable cardioverter defibrillator (ICD) at baseline yes/no.
MR-proADM at baseline ≤1.2 nmol/L vs. >1.2 nmol/L.

Statistical Analysis

Data for specific subgroups from the TIM-HF trial were used for sample size calculations. For the patient subgroup that mirrored the population it was intended to include in the TIM-HF2 trial, 19 days were lost due to all-cause death or unplanned cardiovascular hospital admissions at 12 months in the usual care group, and 12 days were lost for patients in the remote patient management group, which corresponds to a 38% reduction. With an estimated pooled SD of 48, it was calculated that 750 patients would be required in each group to detect this difference with a power of 80% and a two-sided a of 5%.

R (version 3.4.4) and Stata (version 14.2) were used for analyses. The primary and secondary efficacy analyses were performed on the full analysis set, in accordance with the intention-to-treat principle. The full analysis set consisted of all randomised patients who gave consent and began their assigned care.

Baseline characteristics were summarised as number of patients (%) for categorical variables and as mean (SD) for continuous variables; for all baseline laboratory tests, the median and IQR was used.

For the primary analysis of percentage of days lost due to all-cause death or unplanned cardiovascular hospital admission, the proportion of follow-up time lost due to death or unplanned cardiovascular hospitalisation was defined as the number of days lost divided by the intended follow-up. For patients who died, the number of days lost between the date of death and the date of intended follow-up plus the number of days spent in hospital for cardiovascular reasons were counted. For patients who completed the study as planned or who withdrew prematurely from follow-up, the fraction of follow-up time was defined as number of days lost (due to cardiovascular hospitalisation) divided by the follow-up time realised (ie, up to the censoring date). For the primary outcome, a permutation test was used to compare the weighted averages of the percentage of days lost between the two groups. The two-sided permutation test p value was calculated as the fraction of permutations, which had an absolute value of the test statistic at least as large as the observed test statistic, when we applied a mid-p correction in case of equality. For this analysis 2000 randomly drawn permutations were used.

Confidence intervals (CIs) were calculated using the method described by Garthwaite (Garthwaite P H. Confidence intervals from randomization tests. Biometrics 1996; 52: 1387-93), which is based on the Robbins-Monro method. In short, this method does a separate search for each endpoint of the CI by sequentially updating the estimates where the magnitude of steps is governed by the distance between the original test statistic and the test statistic for the permuted data, and the step number. Follow-up time was weighted using weighted arithmetic means, and annualised averages are presented.

In short, this method does a separate search for each endpoint of the CI by sequentially updating the estimates where the magnitude of steps is governed by the distance between the original test statistic and the test statistic for the permuted data, and the step number. Follow-up time was weighted using weighted arithmetic means, and annualised averages are presented.

All survival analyses were done on a time-to-first event basis. Cumulative incidence curves for all-cause mortality were constructed according to the Kaplan-Meier method and the differences between curves were examined by the log-rank statistic. A competing risk analysis was used for cardiovascular mortality to take into account that the event of interest could not occur because of another previous fatal event. Cox-proportional hazards regression models were used to estimate (cause-specific) hazard ratios (HRs). Event rates are expressed as the number of events per 100 patient years of follow-up, taking into account the censoring of follow-up data.

Sensitivity analyses for mortality outcomes examined the robustness of the results using the full analysis set of all patients censored at day 393 after randomisation as defined in the statistical analysis plan. We analysed data for number of hospitalisation events by negative binomial models. For continuous variables such as the MLHFQ global score, changes in group means of both study groups at 12 months were compared by ANCOVA models adjusting for the baseline value. The biomarker test results were analysed using a log scale and ANCOVA models.

Compliance with the daily data transmissions to the telemedical centre was defined as the number of days between the day when the first data transmission was sent to the telemedical centre up to the end of the patient's individual follow-up minus any day when the patient was admitted to hospital for any reason. A statistical test of interaction was done to assess whether the effect of the remote patient management on the primary outcome was consistent across the prespecified subgroups. Interaction tests for the subgroup analyses were done by adding the interaction term in the corresponding models.

Example 1: Benefit of Remote Patient Management for Patients Suffering of HF

Figure 2:
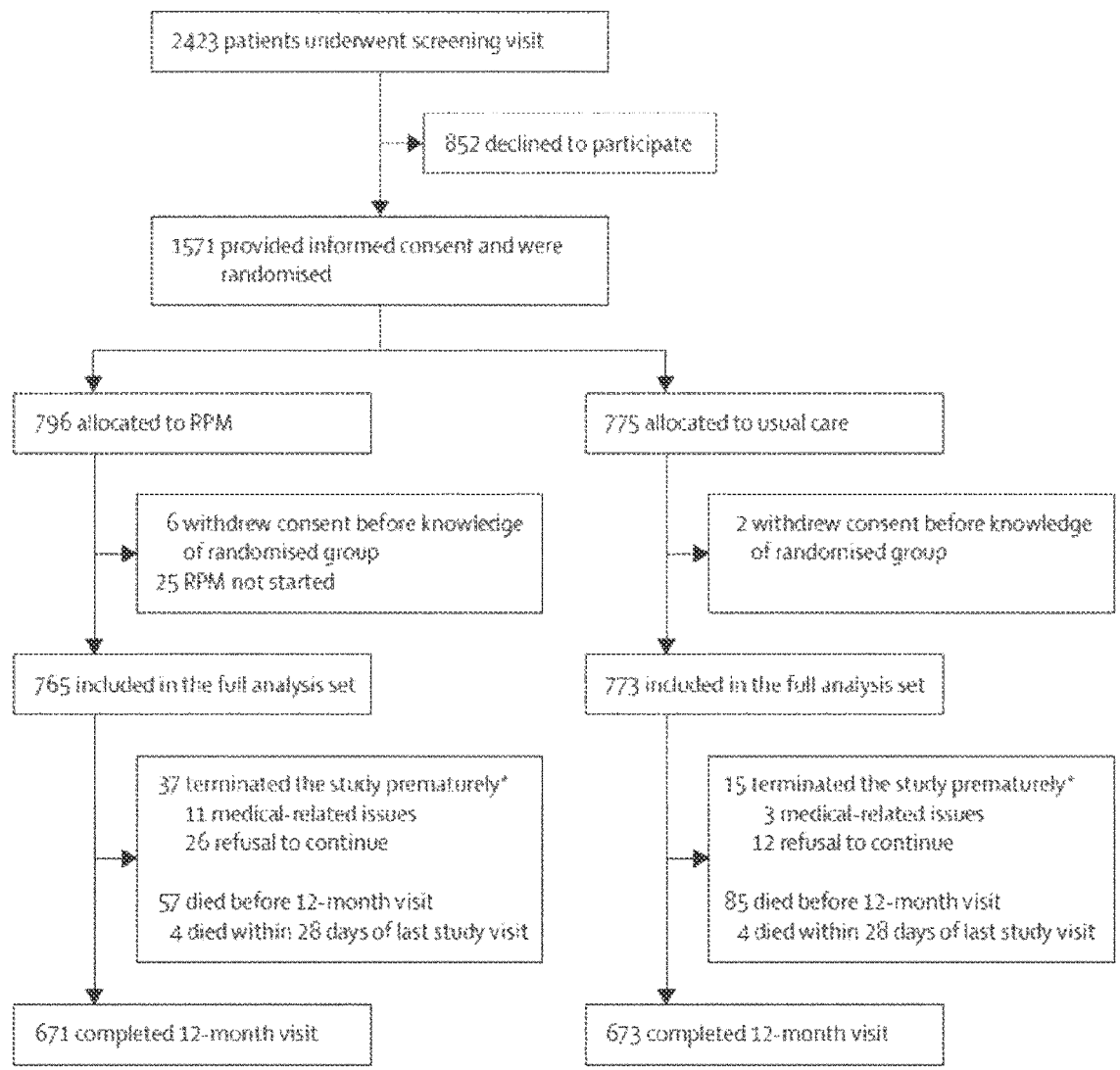

Between Aug. 13, 2013, and May 12, 2017, 1571 patients were randomly assigned (796 to remote patient management plus usual care and 775 to usual care only, of which 765 in the remote patient management group and 773 in the usual care group were included in the full analysis set; FIG. 2).

Baseline clinical and laboratory characteristics and the use of cardiovascular medications were similar between the two groups (see table 3).

The mean age of all patients was 70 years (SD 10), and 70% were men.

For patients randomly assigned to receive remote patient management, 743 (97%) were at least 70% compliant with the daily transfer of data to the telemedical centre. Additionally, all patients were contacted within 24 h of missing data transmissions. Survival status was known for all patients up to the maximum follow-up for each patient (ie, up to day 393 after randomisation).

265 (35%) of 765 patients in the remote patient management group and 290 (38%) of 773 in the usual care group were admitted to hospital for an unplanned cardiovascular reason or died. The percentage of days lost due to unplanned cardiovascular hospital admissions or all-cause death was statistically reduced in patients allocated to remote patient management (4.88%, 95% CI 4.55-5.23) as compared with usual care (6.64%, 95% CI 6.19-7.13; ratio 0.80, 95% CI 0.65-1.00; p=0.0460; table 2). Patients assigned to remote patient management lost a weighted average of 17.8 days per year compared with 24.2 days per year for patients assigned to usual care for this outcome.

Figure 3:
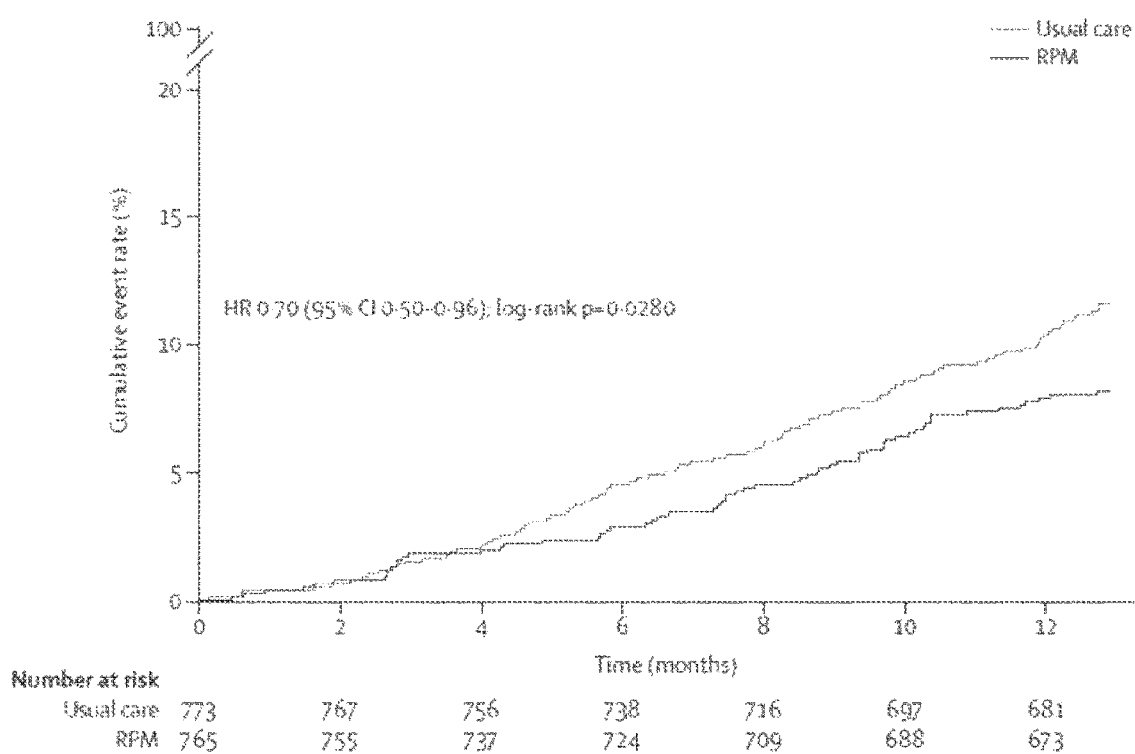
Figure 4:
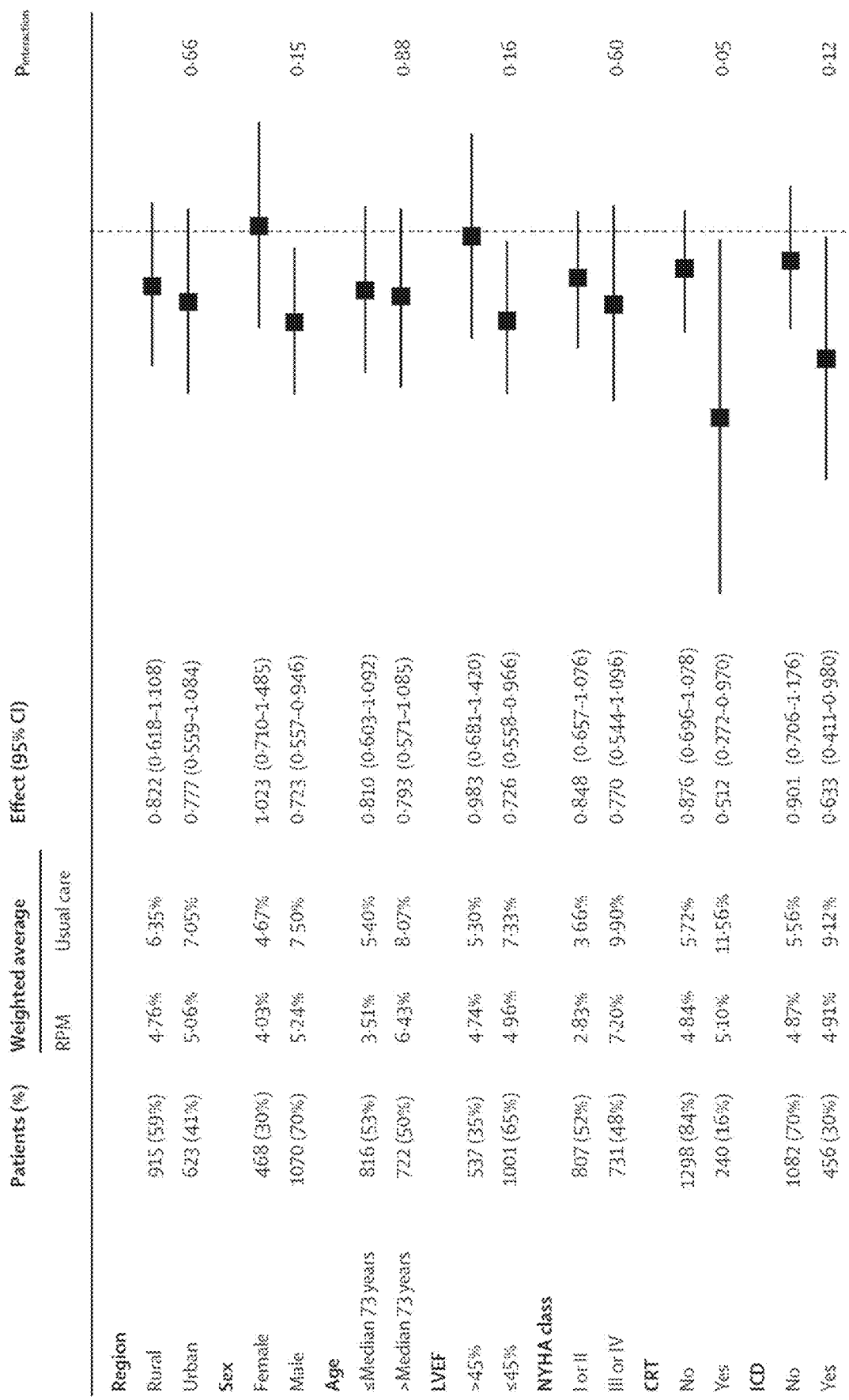

The rate of all-cause death was 7.9 per 100 person-years of follow-up in the remote patient management group and 11.3 per 100 person-years of follow-up in the usual care group (HR 0.70, 95% CI 0.50-0.96; p=0.0280; table 4; FIG. 3). The difference between the remote patient management and usual care groups with respect to death from a cardiovascular cause was not statistically significant (HR 0.67, 95% CI 0-45-1·01; p=0.0560).

Patients assigned to remote patient management lost fewer days than the usual care group for unplanned hospital admissions due to worsening heart failure (mean 3.8 days per year [95% CI 3.5-4.1] vs 5.6 days per year [5.2-6·0], respectively). The percentage of days lost for this outcome for the remote patient management and usual care groups was 1.04% (95% CI.0·96-1.11) and 1.53% (1.43-1.64), respectively (ratio 0.80, 95% CI 0.67-0.95; p=0.0070). Comparing remote patient management with the usual care group, similar results were obtained for the sensitivity analysis done for all-cause mortality (ratio 0.74, 95% CI 0.54-1.02; p=0.0633).

The percentage of days lost due to unplanned cardiovascular hospital admissions was 1.71% (95% CI 1.59-1.83) for the remote patient management group and 2.29% (2.13-2.45) for the usual care group (ratio 0.89, 95% CI 0.74-1.07; p=0.208).

The change from baseline in the Minnesota Living with Heart Failure Questionnaire (MLHFQ) global score at 12 months, was not statistically different between the remote patient management and usual care group (table 5).

FIG. 3 shows the results of the subgroup analyses for the primary outcome. We noted no effect of prespecified subgroups on the difference between treatment groups for the primary outcome.

2251 unplanned hospital admissions were reported and classified by the clinical endpoint committee (appendix p 4). Of these hospitalisations, 262 (14 in the remote patient management group and 248 in the usual care group) were identified during the cross-check verification procedure with health insurance records. 1,026,078 vital parameters were transmitted to the telemedical centre (a median of 1421 per patient [range 6-3962]); table 6 provides a summary of the data transmitted and actions taken.

Example 2: Prognostic Ability of Biomarker Determination for Prescribing or not Prescribing Remote Patient Management On the study population and collected data from the TIM-HF II trial as described above and in Koehler et al. 2018a and Koehler et al. 2018b further analysis was perform to assess the prognostic ability of the biomarkers proADM, proBNP and/or proANP to predict the benefit of prescribing or not prescribing a remote patient management.

Methods for Biomarker Analysis

As detailed above, in TIM-HF II trial a total of 1538 patients (median age: 73, IQR: 64-78; 70% male) were randomly assigned either to RPM (N=765) or SOC (N=773). The terms SOC (standard of care) and usual care group (UC) are used interchangeably herein. Patients had study visits every 90 days over one year of follow-up time. For the analysis of the biomarkers, blood was drawn at baseline and at every visit.

NT-proBNP, MR-ANP and MR-proADM was assessed concerning (i) their association with the primary endpoint of the original trial % lost days due to unplanned cardiovascular hospitalization or all-cause death, (ii) their association with the pre-specified endpoint all-cause death or re-hospitalization for heart failure considered to be decisive for RPM patient selection, and (iii) their predictive performance when used in combination for the identification of patients who can safely be excluded from RPM for the next 90 days (no all-cause death or re-hospitalization for heart failure).

For the latter, we gained statistical power by pooling all repeated observations of biomarkers and subsequent 90-days follow-up for all patients under SOC (as expected no trend over repeated measurements observed). After accounting for renal insufficiency and its association with biomarker levels via stratification by eGFR (CKD-EPI formula) or GFR based on Cockroft-Gault, we calculated biomarker cutoffs for safe rule-outs (100%, 99%, 95% sensitivity) and their hypothetical performance in terms of saved RPM effort (% excluded patients from RPM) as well as in terms of efficacy of RPM for the included patients (reduction of risk of event, number-needed-to-be-treated NNT). Due to the unique available dataset for RPM patients, the exclusion algorithm could further be evaluated with detailed data on emergencies, telephone calls and medication.

Results of Biomarker Analysis for MR-proADM, ProBNP or proANP within 90 Days from Baseline For an endpoint of "All-cause death or unplanned CV-hospitalization due to acute decompens. within 90 days from baseline" an ROC analysis and analysis of the performance biomarker cutoffs in UC patients was conducted as a benchmark.

Figure 5:
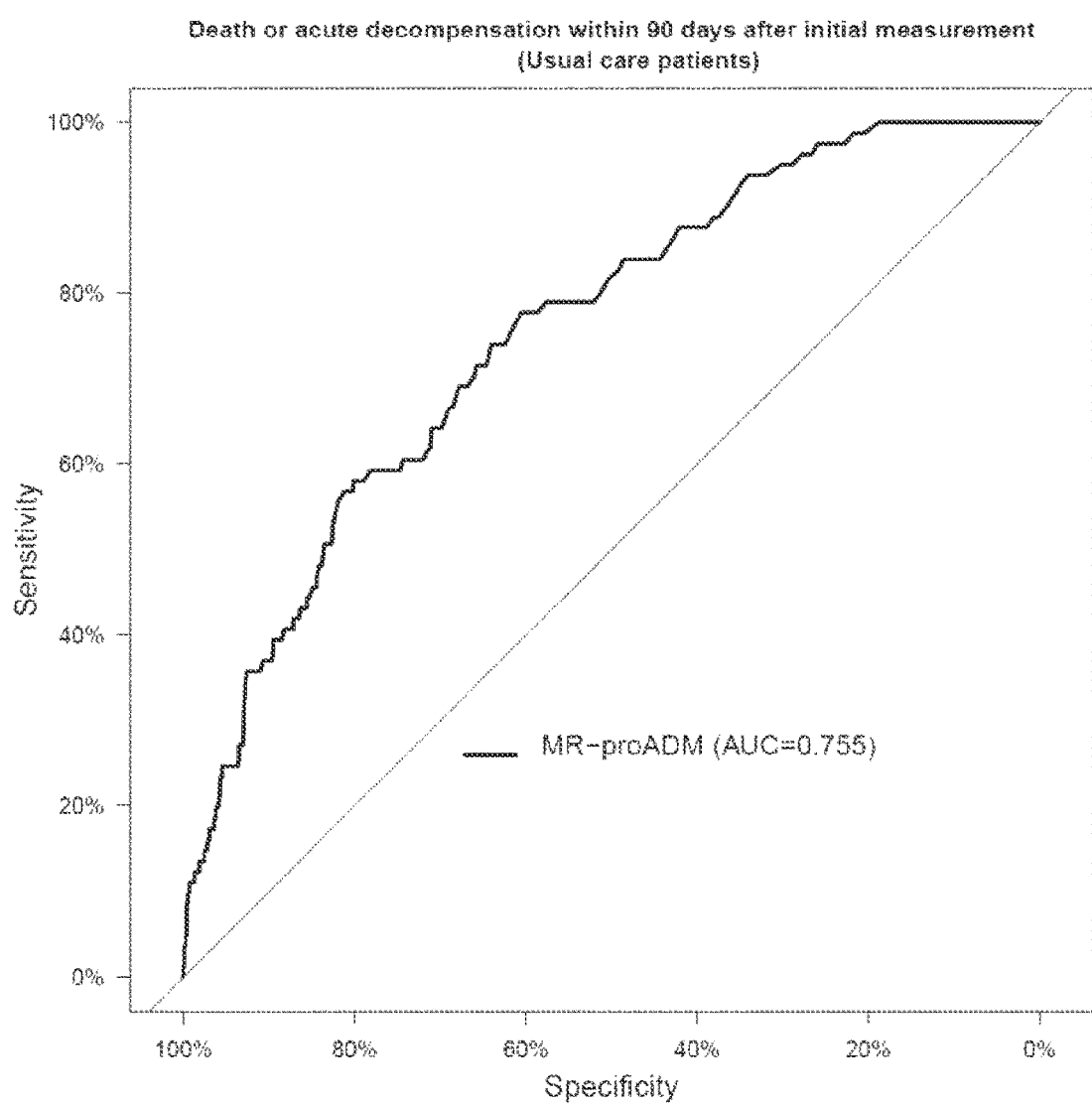
Figure 6:
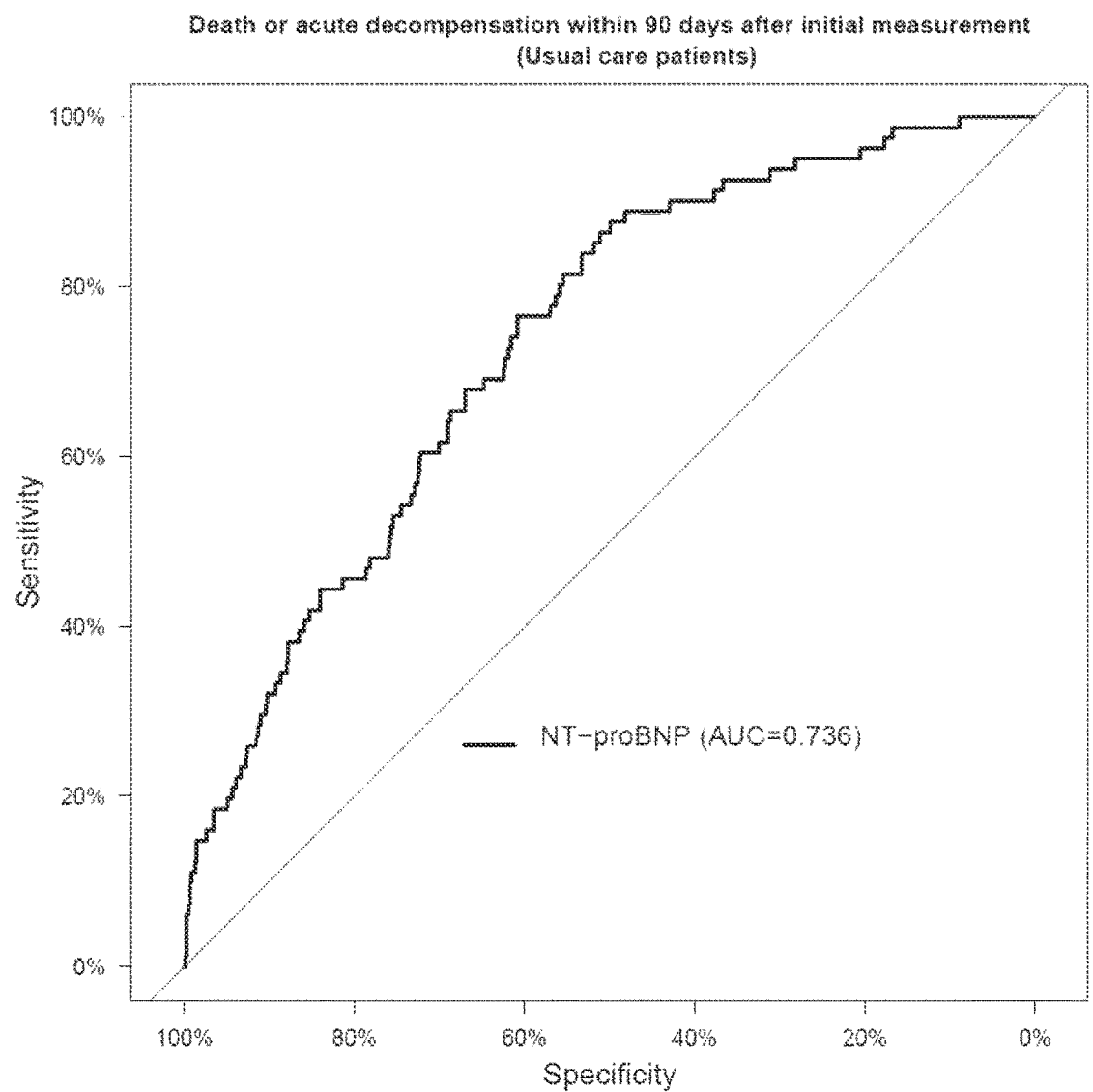
FIG. 6 ROC curve for proBNP for death or acute decompensation within 90 days after initial measurement (Usual care patients)
Figure 7:
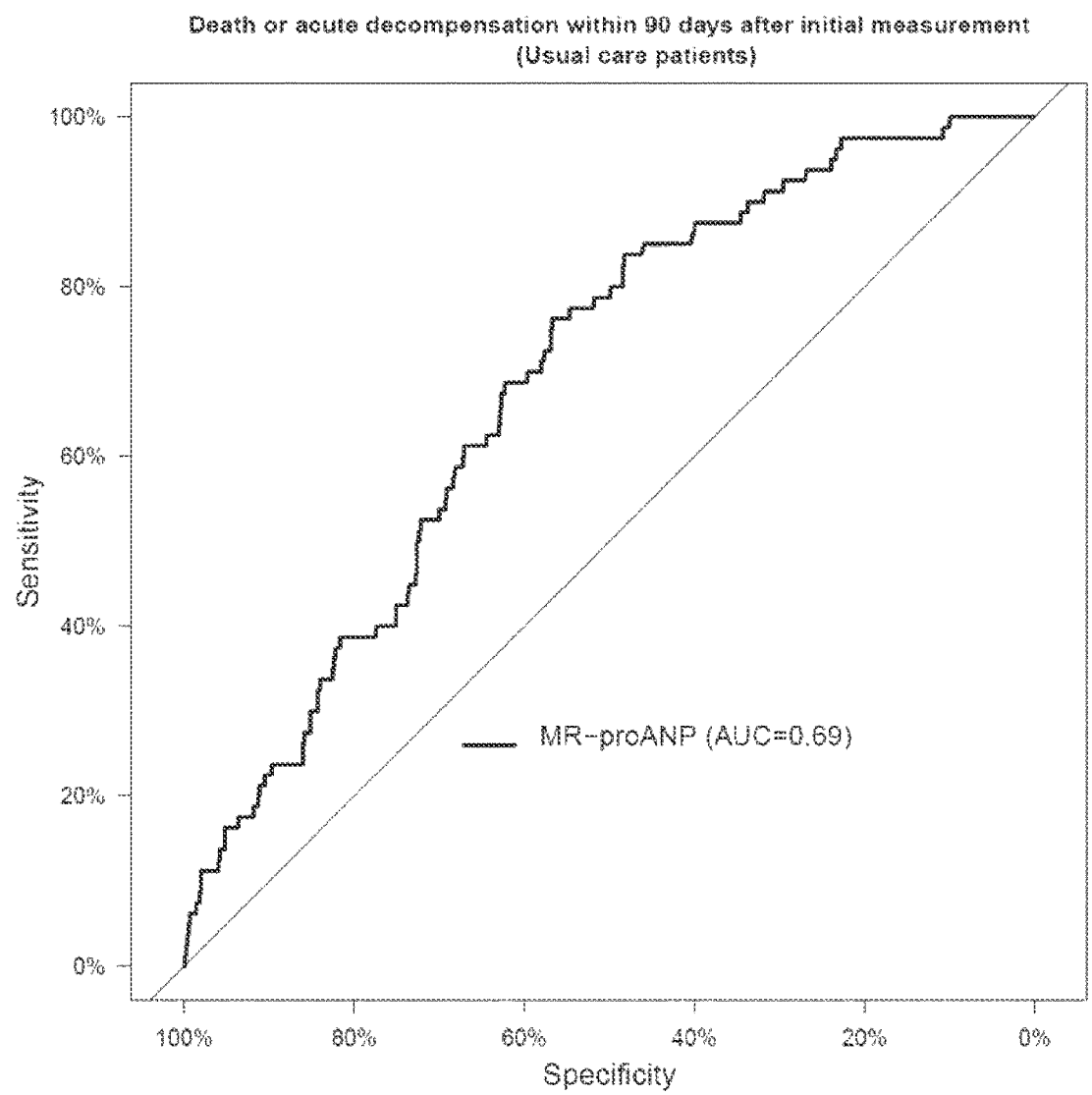
FIG. 7 ROC curve for proANP for death or acute decompensation within 90 days after initial measurement (Usual care patients)

FIG. 5-7 show the ROC curves for death or acute decompensation within 90 days after initial measurement (Usual care patients). The area under the curve (AUC) for MR-proADM is 0.755, for NT-proBNP is 0.736 and for MR-proANP 0.69. All of the biomarkers exhibit thus a high prognostic potential, which may be exploited for therapy guidance, monitoring or stratification of a remote patient management as described herein.

Patients with higher levels of NT-proBNP or MR-proADM at baseline visit of TIM-HF2 had a higher rate of lost days and were more likely to develop adverse events during the year of the trial. This indicated their potential for the allocation of RPM.

Table 7-9 summarize the cutoff analysis for the biomarkers proADM, proBNP and proANP. Particularly, preferred cutoffs for establishing a low benefit and high benefit levels for prescribing or not prescribing relate to cutoffs for which a sensitivity of 100% or 95% is reached.

As shown in Table 7 for MR-proADM a cutoff value of 0.75 nmol/L yields a sensitivity of 100% and 0.86 nmol/L a sensitivity of 95%.

As shown in Table 8 for NT-proBNP a cutoff value of 237.6 pg/mL yields a sensitivity of 100% and 609.4 pg/mL a sensitivity of 95%.

As shown in Table 9 for MR-proANP a cutoff value of 106.9 pmol/L yields a sensitivity of 100% and 158.5 pmol/L a sensitivity of 95%.

Results of Biomarker Analysis when Combined with Determining the GFR within 90 Days from Baseline Particular, well results were achieved when using an NT-proBNP- and MR-proADM—in combination with determining a parameter indicating renal function, such as a GFR.

An NT-proBNP- and MR-proADM-based algorithm stratified by eGFR<60 and eGFR>=60 could identify a notable portion of patients who remained event-free for 90 days already under SOC, while, on the other hand, identifying critical SOC patients with event with perfect or near-perfect sensitivity. For 100% (99%, 95%) sensitivity, 9% (15%, 25%) of SOC patients could hypothetically be excluded from RPM. For comparison, at 100% sensitivity, using NT-proBNP alone or in combination with eGFR would only have excluded safely 0.8% or 2.7% of patients, respectively.

For the exclusion algorithm with 100% sensitivity, the risk of suffering from an event within 90 days for SOC patients was 11% for patients hypothetically assigned to RPM and 0% for patients kept for SOC. By comparing these sub-population between study arms (again, pooling all observations of biomarkers and subsequent 90-day follow-ups; no trend of biomarkers over repeated measurements observed), it was shown that RPM could significantly decrease the risk of suffering from an event among the hypothetically included patients from 11% to 8%. Further, NNT was lowered from 42 (all patients) to 34 (hypothetically included patients). Finally, true RPM patients who would have been excluded from RPM via the presented algorithm had a significantly lower chance of suffering from emergencies, received less medication changes and communicated less with RPM doctors than those who would have been included. This further suggested that the identified low-risk patients were less in need of RPM than the identified high-risk patients, based on a characterization by biomarkers.

Table 10 summarizes the results and beneficial impact for a stratification of biomarker cutoffs by a GFR based upon CKD-EPI.

Table 11 and 13 summarize the results and beneficial impact for a stratification of biomarker cutoffs by a GFR based upon Cockroft-Gault.

Particular well results are achieved when using a combination of proADM, proBNP and GFR. As seen in the columns 6 and 9 of both tables, in such a case twice as many or three times as many patients may be safely excluded from a remote management in comparison to only using proBNP and GFR without proADM for prescribing or not prescribing a remote patient management.

Results of Biomarker Analysis within One Year from Baseline

Furthermore the predictive power of the biomarkers were evaluated with regard to adverse events within one year after randomization and sample isolation. NT-proBNP and MR-proADM were used at baseline. The primary endpoint was lost days due to all cause death or CV hospitalization, the secondary endpoint was all cause death within one year after randomization.

The primary analysis of quintiles of the two biomarkers with respect to the prediction of the primary endpoint shows that the incidence increased in the SOC group from 1.4% lost days (MR-proADM≤0.75 nmol/L; lowest quintile) to 17.6% in the highest quintile. In the RPM group values were similar at the lowest quintile (1.4%) and 12.1% at the highest quintile (p=0.21 versus SOC). The treatment effect (ratio % lost days RPM vs. SOC) increased from 0.98 to 0.69 (p for interaction 0.29). NT-proBNP had similar prognostic power with the treatment effect ranging from 0.87 at the lowest to 0.63 at the highest quintile (p for interaction 0.33). Findings for the secondary endpoint (all-cause death) were similar. Accordingly, a trend towards lower % lost days and risk of death, as well as smaller benefits from RPM for patients with lower biomarker levels was observed. Building on this observation, a biomarker-based RPM patient selection algorithm was explored with the aim to reduce the rate of patients recommended for RPM.

Once the biomarkers were combined to identify patients who had no events (all-cause death) and therefore could not profit from RPM, 13.7% of patients with MR-proADM<0.69 nmol/L or NT-proBNP<125.1 ng/L could have been excluded in the SOC group. If miss rates of <2.5% or <5% are accepted, the relative share of excluded patients rose to 16.9% or 25.3% respectively. In all three scenarios the hazard ratio for the beneficial treatment effect of RPM remained at 0.71 significant (p<0.05) and was mutually the same as in the primary study (HR=0.70).

Thus, by using biomarker based selection of patients, the number needed to treat to prevent one death, could be lowered from 28 to 26 (sensitivity 100%, no event missed) to a minimum of 23 (sensitivity 95.5%, MR-proADM<0.75 nmol/L, NT-proBNP<383.3 ng/L).

Figure 8:
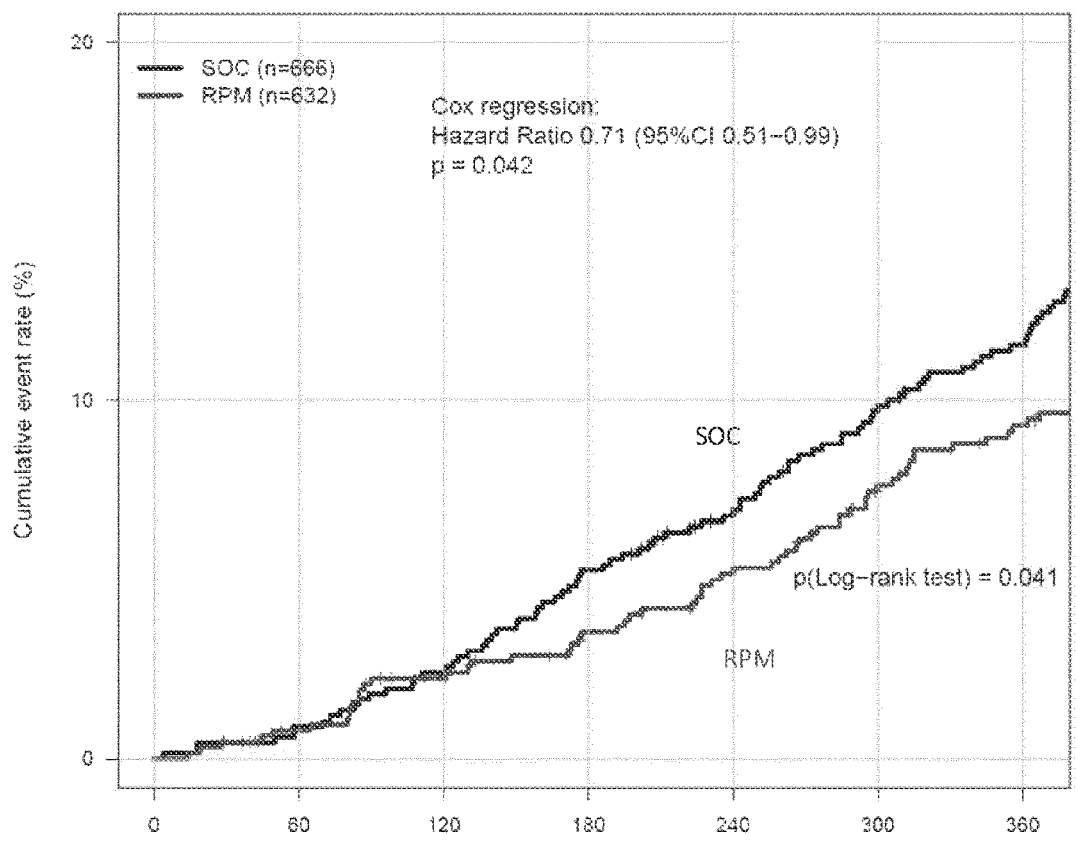
FIG. 8 Kaplan-Meier analysis for RPM and usual care group showing a split of the curves at 90 days and a significant benefit of the RPM group (Log-rank test: 0.017)

Table 12 summarizes the results and the FIG. 8 shows the Kaplan-Meier-curve for the biomarker based modified patient cohort (patients with no events excluded based on the biomarker cutoffs listed above for 100% sensitivity).

In conclusion, the use of MR-proADM and NT-proBNP alone or in combination allows a safe, more precise, effective and therefore cost-saving allocation of patients with heart failure to remote patient management. The number needed to treat by RPM to save one life could be lowered from 28 in the original study to 23 using the biomarkers approach.

Example 3: Prognostic Ability of a Combination of ProBNP and ADM for Prescribing or not Prescribing Remote Patient Management On the study population and collected data from the TIM-HF II trial as described above and in Koehler et al. 2018a and Koehler et al. 2018b a further statistical analysis was performed to determine particularly beneficial scenarios of using proADM and/or proBNP to predict the benefit of prescribing or not prescribing a remote patient management.

Outcomes and Biomarker Analysis

In brief, as outcomes the primary study endpoint was "percentage of days lost due to unplanned cardiovascular (CV) hospitalization or due to all-cause death during the individual follow-up time". The regular individual follow-up period covered 365 days after randomization in all patients plus the varying time to the final study visit, which should have taken place within 4 weeks after day 365. The secondary endpoints include all-cause mortality (a), CV mortality (b), % lost days due to unplanned CV hospitalizations (c) and % lost days due to hospitalization with worsening heart failure (d).

For the purpose of biomarker analysis, levels of NT-proBNP and MR-proADM at baseline were used. Whole blood was collected by venipuncture during study visits. NT-proBNP was measured with the chemiluminescence immunoassay Roche NT-proBNP (Roche Diagnostics GmbH, Mannheim, Germany) which has a measuring range of 5 to 35.000 pg/ml and functional assay sensitivity of 50 pg/ml (manufacturer information, package insert). MR-proADM was measured with the immunofluorescent assay B·R·A·H·M·S MR-proADM KRYPTOR (B·R·A·H·M·S GmbH, Hennigsdorf, Germany). The MR-proADM assay has a total measuring range of 0.05 to 100 nmol/L with a functional assay sensitivity of 0.25 nmol/L.
Statistics
Association of NT-proBNP and MR-proADM with Endpoints Linear and Cox proportional hazards regressions were used to test the association of % lost days due to unplanned CV hospitalization and time to all-cause death, respectively, with both biomarkers. For modelling, biomarker levels were log-transformed. Also, % lost days was log-transformed after imputing a value of 0.1% for patients who had 0.0% lost days, which is in line with previous analyses. Models including both biomarkers were compared to models only including NT-proBNP as a predictor variable to assess the significance of adding MR-proADM (by F-test and likelihood ratio test, respectively).

Complementarily, average % lost days due to unplanned CV hospitalization (using an average weighted by individual follow-up time, in line with previous analyses of the trial) was calculated, as well as the rate of all-cause death for both the SOC and RPM group for all quintiles of both biomarkers. For each quintile, a p-value for the effect of RPM vs. SOC on these endpoints was calculated using permutation tests (% lost days due to unplanned CV hospitalization) and Cox proportional hazards regressions (all-cause death). Also a p-value for the interaction of quintile and RPM was calculated to explore how strong the evidence was that the effect of RPM differed across the biomarker quintiles.
Selection Scenarios for Patients Recommended for RPM To identify criteria for the subgroup of the original population for which RPM could be recommended on the basis of additional biomarker assessment, only those patients were used that had been assigned to the SOC study arm. Hence, these served as the benchmark population for the derivation and evaluation of biomarker guidance. The reason is that only in this group it can be assumed that any clinical endpoint has not been prevented by RPM.

Figure 12A:
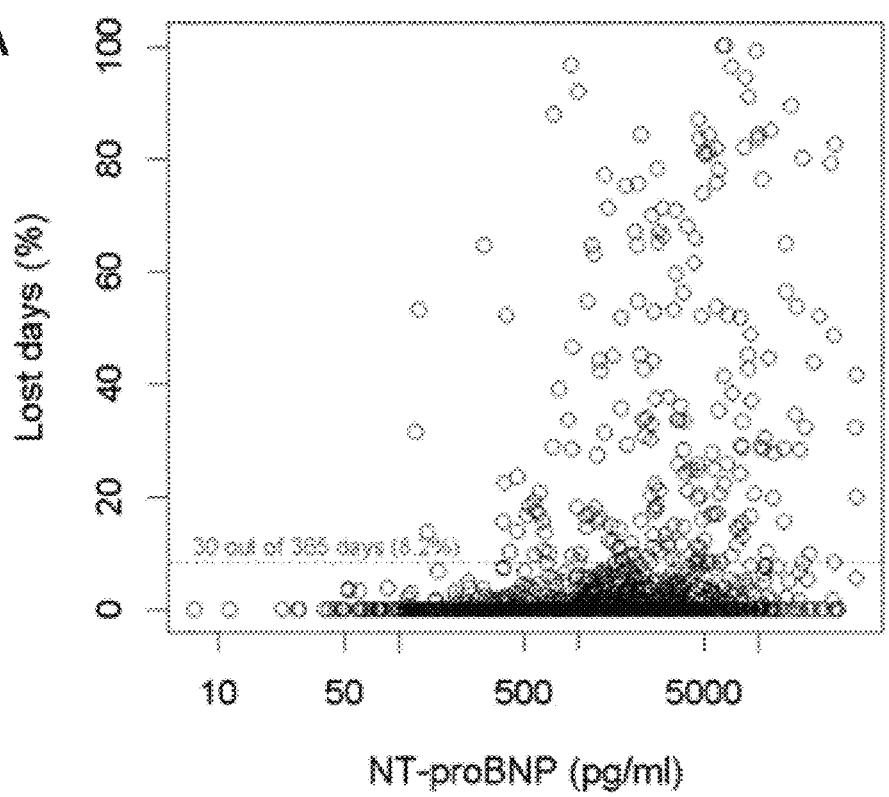
FIGS. 12A-12B Raw data on the relationship of the primary TIM-HF2 study endpoint % lost days with biomarkers (FIG. 12A) NT-proBNP and (FIG. 12B) MR-proADM. For the specification of biomarker cutoffs for the selection of patients with RPM recommendation, an event was defined as having at least one month lost during one year follow-up time, i.e. at least 30 lost days/year corresponding to a rate of at least 8.2% lost days (dashed line).
Figure 12B:
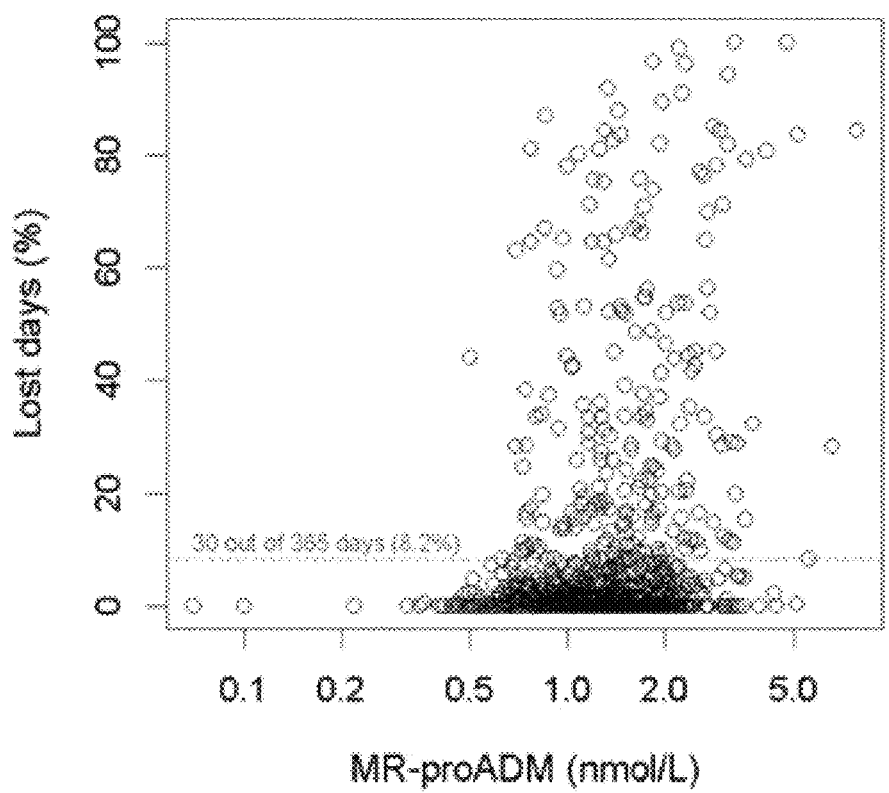
Figure 13A:
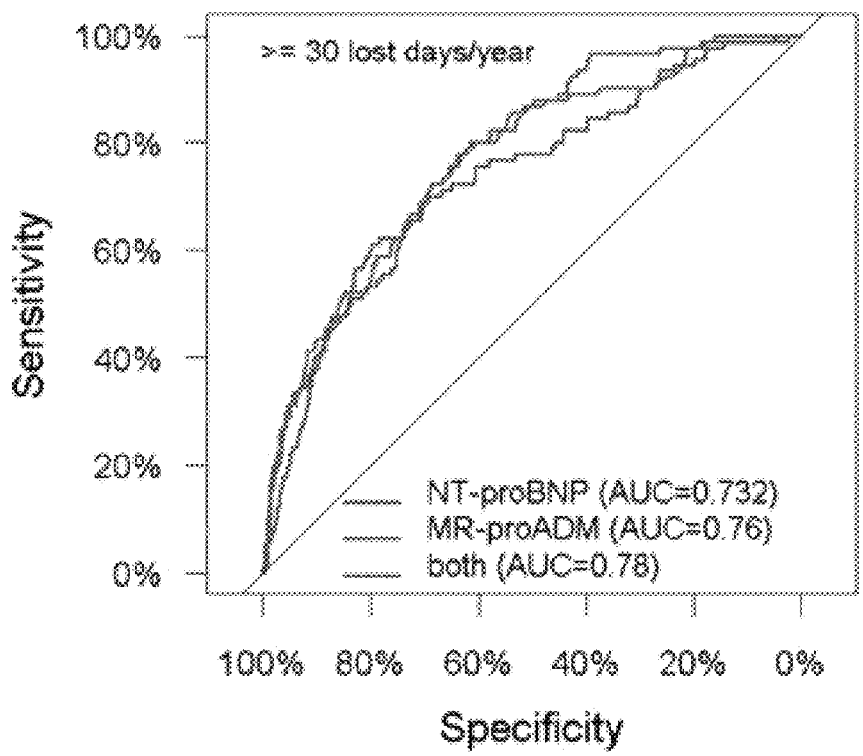
FIGS. 13A-13F ROC analyses of all TIM-HF2 patients characterizing the prognostic potential of the biomarker MR-proADM, LVEF and MAGGIC score compared with and in addition to NT-proBNP concerning primary endpoint % lost days (categorized with one month lost during one year follow-up time, FIGS. 13A, 13C, 13E) and secondary endpoint all-cause death (FIGS. 13B, 13D, 13F). The same set of patients with complete data for all required variables was used for all ROC analyses shown in FIGS. 13A-13F to facilitate comparability (N=1522).
Figure 13B:
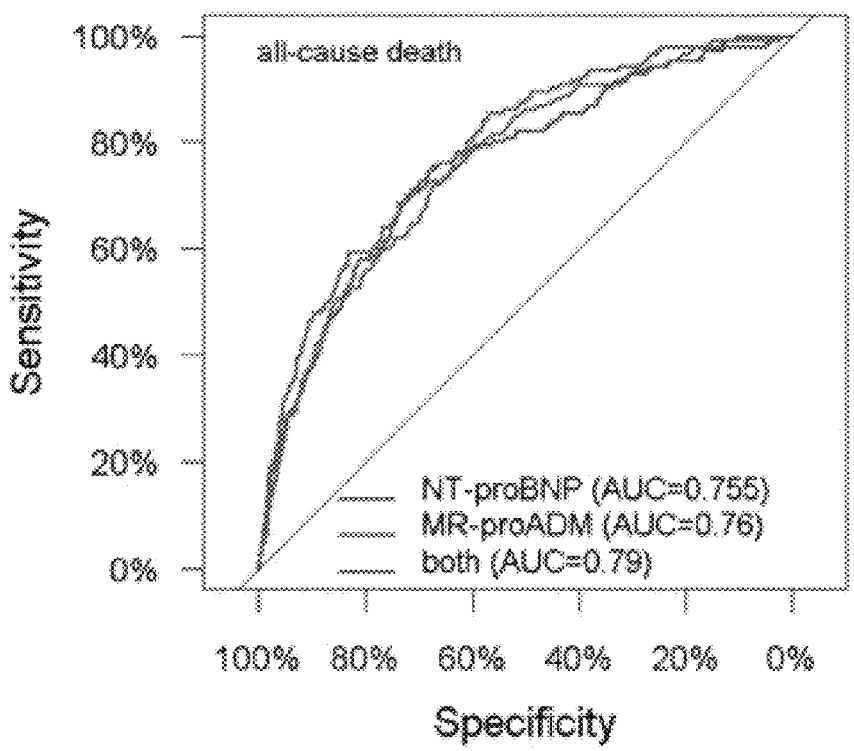
Figure 13C:
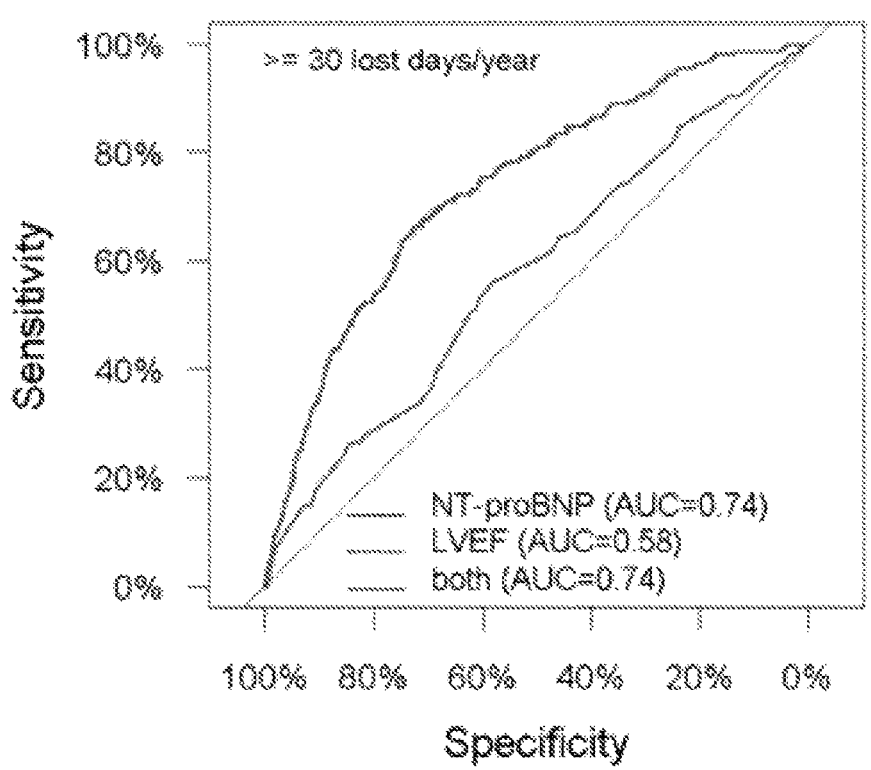
Figure 13D:
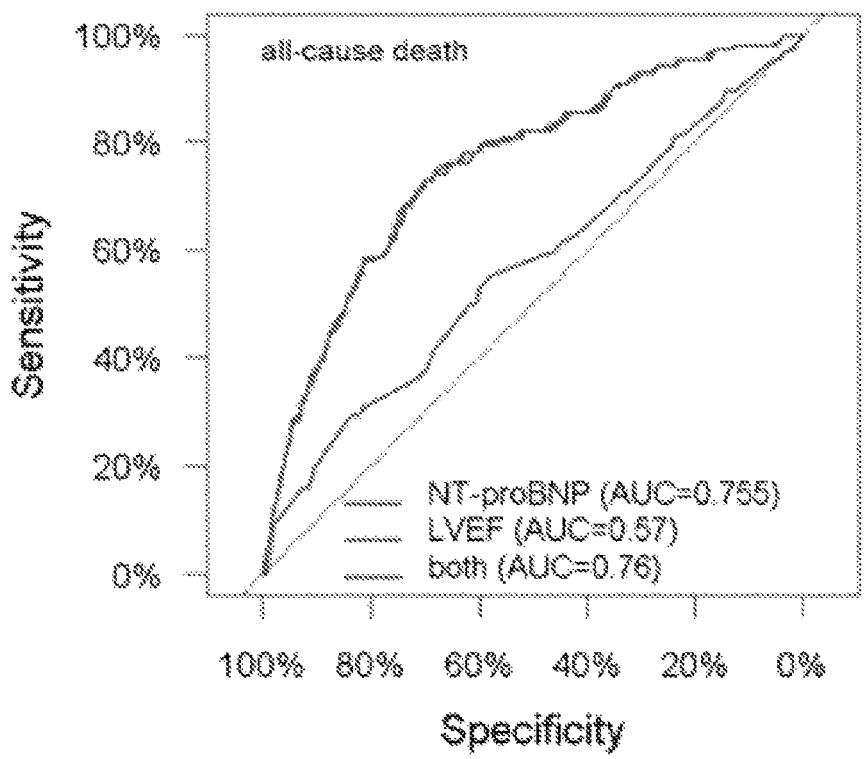
Figure 13E:
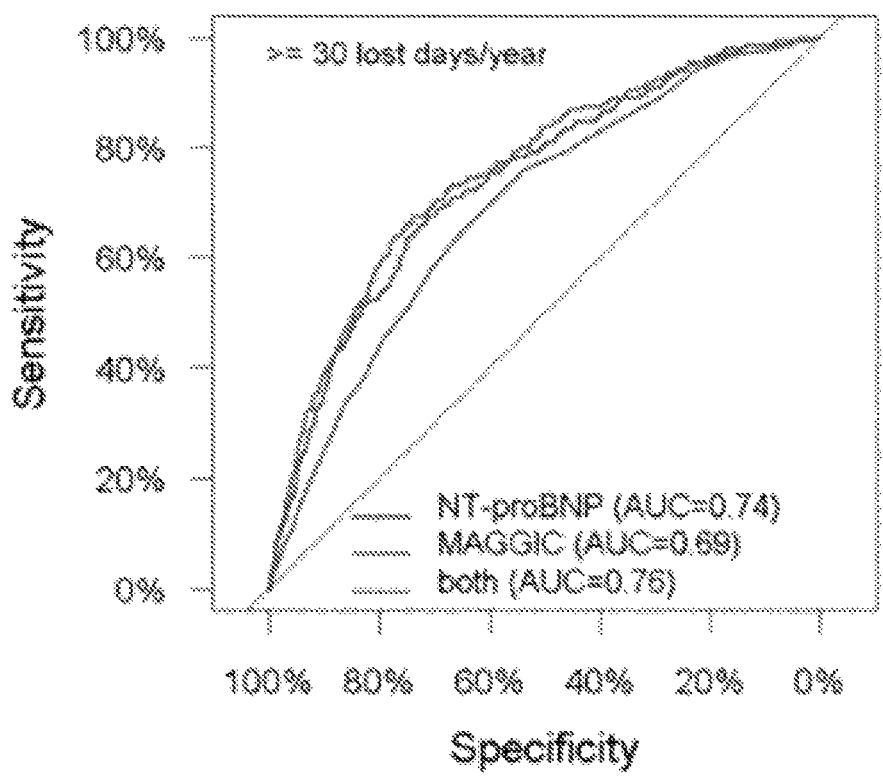
Figure 13F:
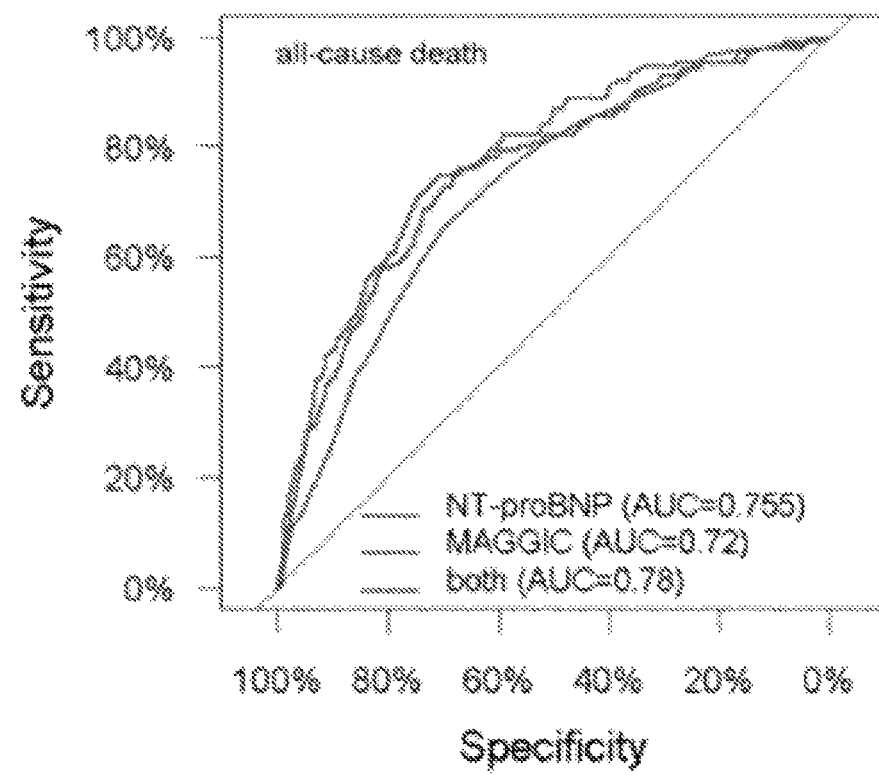
Figure 14A:
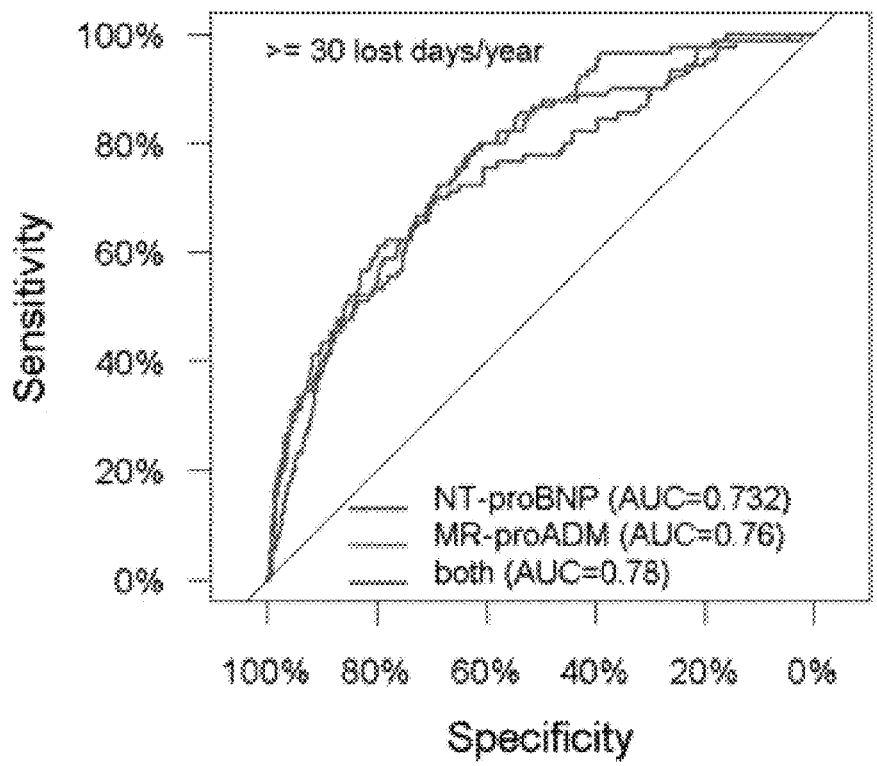
FIGS. 14A-14F ROC analyses of SOC patients characterizing the prognostic potential of the biomarker MR-proADM, LVEF and MAGGIC score compared with and in addition to NT-proBNP concerning primary endpoint % lost days (categorized with one month lost during one year follow-up time, FIGS. 14A, 14C, 14E) and secondary endpoint all-cause death (FIGS. 14B, 14D, 14F). The same set of SOC patients with complete data for all required variables was used for all ROC analyses shown in FIGS. 14A-14F to facilitate comparability (N=767).
Figure 14B:
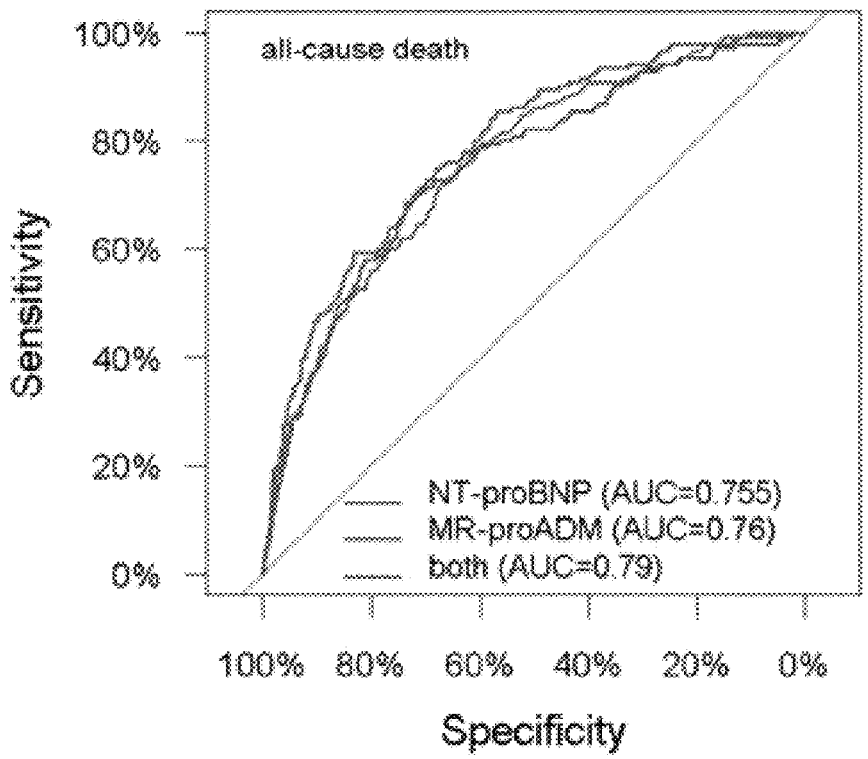
Figure 14C:
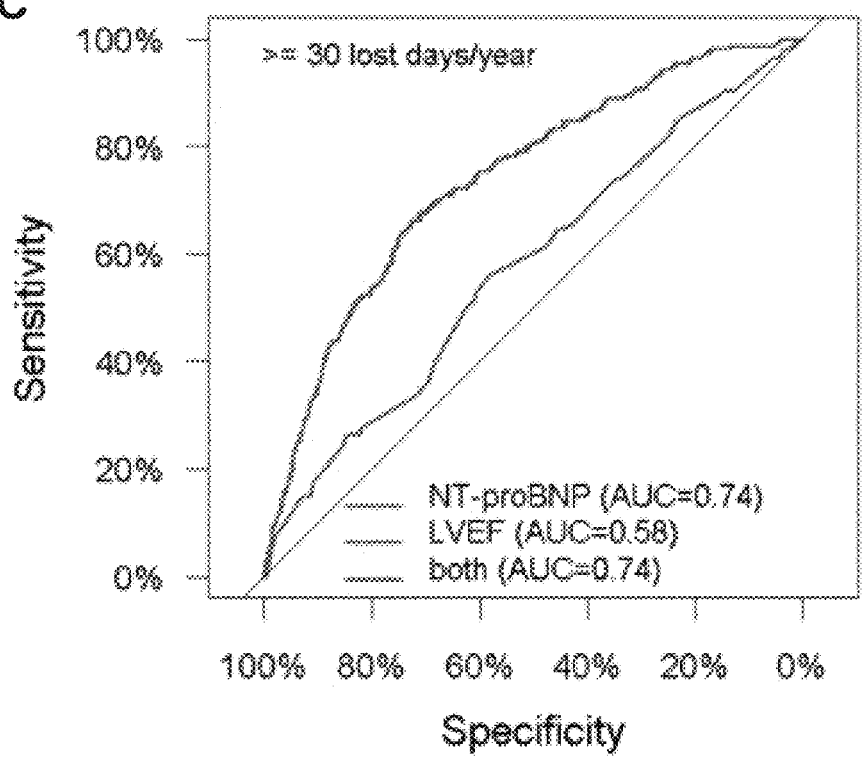
Figure 14D:
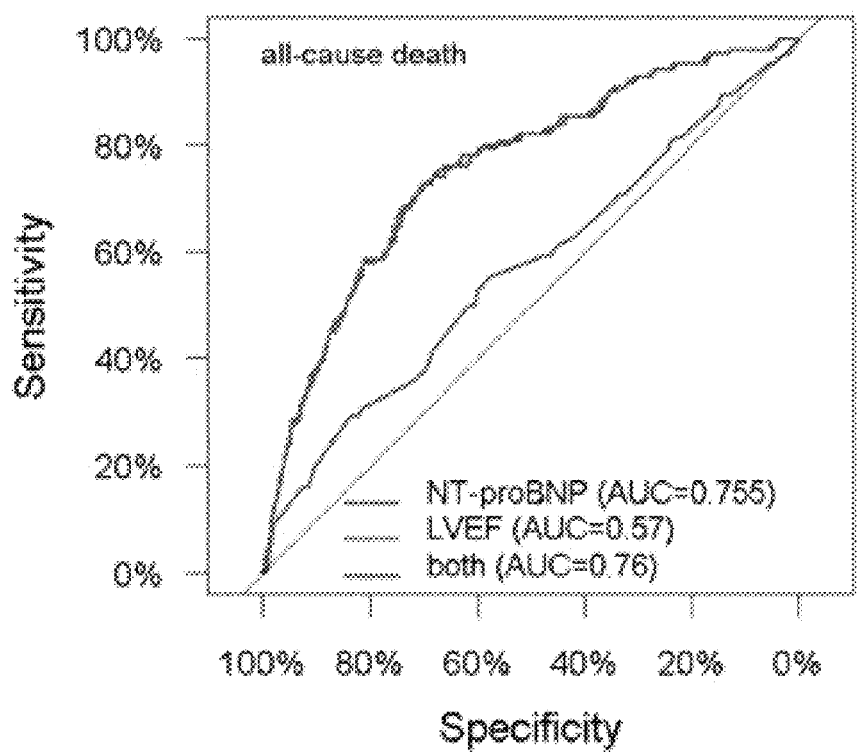
Figure 14E:
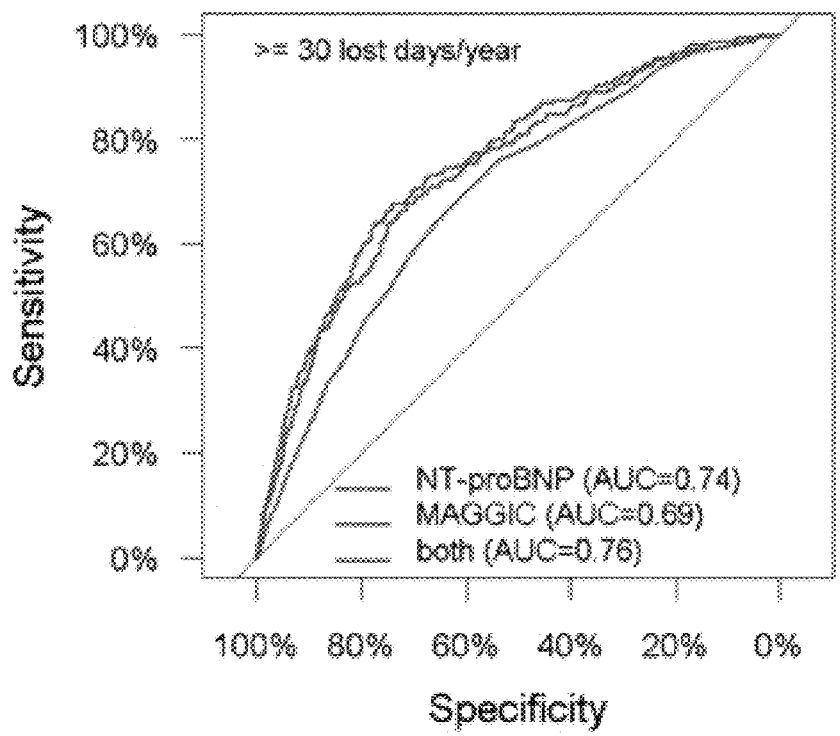
Figure 14F:
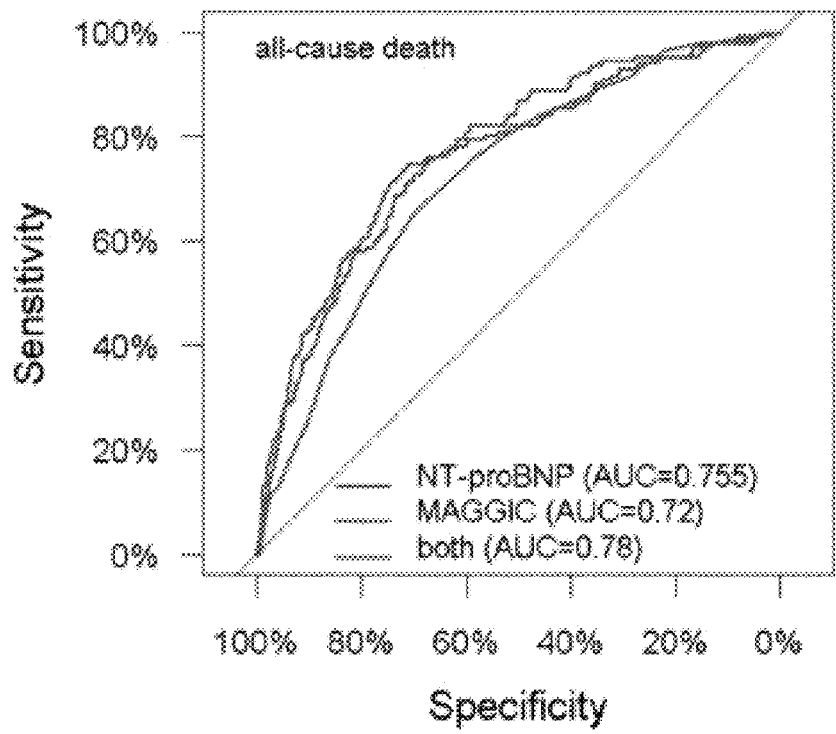

For the primary endpoint, an event was defined as having at least 30 lost days out of 365 days of follow up, i.e., as having a rate of at least 8.2% lost days. In the following description of this example, this scenario will be called "30 lost days/year". With this approach, the vast majority of patients who died (82 out of 89 in the SOC group), but also all patients who out of one year spent a month or more in hospitals due to unplanned CV admission are included. With this binary measure, only those deaths which were relatively far away in time from the baseline biomarker measurement (at least 11 months for a patient who was followed up for one year) were categorized as no event. FIG. 12 illustrates this event definition further. The secondary endpoint was pre-specified as all-cause death.

The biomarker-based selection scenarios for patients recommended for RPM were further optimized for high safety. Different scenarios were explored for both endpoints with desired sensitivities of 100%, 98% and 95%, meaning that the defined biomarker cutoffs should not miss more than 0%, 2% or 5% of patients with an event during follow-up time. To make use of the information carried by both biomarkers, patients were recommended for RPM if they had at least a certain level of NT-proBNP and, simultaneously, at least a certain level of MR-proADM.

Figure 9A:
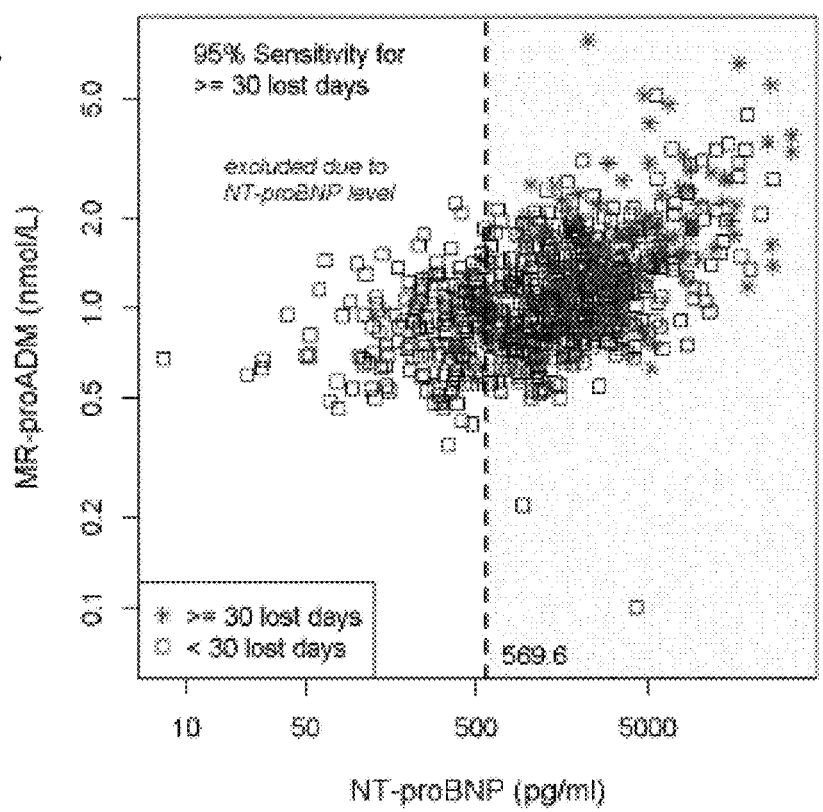
FIGS. 9A-9B Description of a biomarker-based selection algorithm of patients recommended for RPM based on whether the patients lost at least one month out of one study year (i.e., at least 30 out of 365 study days) due to all-cause death or unplanned CV hospital admission (red, star symbols) or not (blue, rectangle symbols). Patients in the shaded green area are recommended for RPM based on biomarker guidance.

Note that, theoretically, for all scenarios with sensitivity <100%, there is more than one possible combination of biomarker cutoffs that realizes the desired sensitivity. The analysis of the current example, remained restricted to those cases where both biomarkers on their own achieved identical sensitivity. This is equivalent with assuming that both biomarkers should be weighed equally in their joint use for patient selection (instead of assuming that one should be more permissive with high levels of NT-proBNP than with levels of MR-proADM, or vice versa). FIG. 9 gives an illustration of how biomarker guidance for the joint use of NT-proBNP and MR-proADM was assessed. For comparison, also the percentage of patients was calculated that could be excluded from the population to whom RPM was recommended when using NT-proBNP alone.
Evaluation of Scenarios Regarding Efficacy of RPM The basic intention of biomarker guidance for RPM is to assign those patients to the intervention who will profit most from it, and rather exclude those who will not. Consequently, it was important for all six scenarios (two endpoints (% lost days due to unplanned CV hospitalization; all-cause death) and three desired sensitivities) to show how the endpoints of TIM-HF2, and hence the efficacy of RPM in heart failure, were affected by retrospectively reducing the original population to the subpopulation recommended to RPM via biomarkers. Effect estimates and p-values were calculated for the subpopulation who satisfied the recommendation criteria (i.e., whose NT-proBNP and MR-proADM surpassed the respective thresholds) in full accordance with all statistical procedures in the original trial population in the earlier publication (Koehler et al. 2018a).

In brief, for ratios of % lost days between treatments (primary endpoint and secondary endpoints c and d), the geometric mean of % lost days in the RPM group was divided by the geometric mean of % lost days in the SOC group. This was preceded by imputing a value of 0.1% lost days for patients who had 0.0% lost days. The corresponding p-values were calculated via permutation tests with 2000 permutations and the difference in means as test statistic. For the time-to-event analyses for all-cause death (secondary endpoint a) and CV death (secondary endpoint b), Cox proportional hazards regressions were used to estimate hazard ratios, confidence intervals and p-values. Note for the interpretation of the results that upward changes in p-values are at least to some degree mechanical since in the reduced subpopulations the statistical tests have less power to detect an effect at the same significance level. For the latter endpoint, non-CV deaths were treated as regular censoring events (end of follow up). Further, a Kaplan-Meier curve and a log-rank test were provided for the endpoint all-cause death for one of the patient selection scenarios.
Further Analysis for the Most Efficient Scenario: Patient Characteristics and RPM Interventions For the most efficient of the evaluated scenarios of double-biomarker guidance (reducing the population recommended for RPM by the most) which was the one with 95% sensitivity regarding ≥30 lost days/year, patient characteristics at baseline were compared between the group recommended for RPM and the group not recommended for RPM. Also, patient characteristics at baseline were compared between the SOC and RPM group for the patients recommended for RPM (i.e., for the groups which were the basis for the endpoint calculations described in the previous subsection).

The availability of unique electronic health record data and cross-verified emergency data for the patients who were in the original RPM group allowed further comparisons. The TMC employed various interventions during the course of the telemedical treatment and registered the occurrence of emergencies for the RPM patients. Thus, these RPM data allowed to compare (i) the rate of emergencies, (ii) the average medical effort in time spent by TMC doctors between those patients who would have been recommended to RPM in this retrospective scenario, in line with their original random group assignment in the trial, and those who would not have been recommended to RPM in this scenario, against their original group assignment in the trial. For the calculation of effort in time, all interventions by the TMC documented in the electronic patient record were categorized into medical and non-medical related actions. Average duration of each action was calculated via empirical values and values from the electronic patient record. Emergencies and medical effort was visualized following Allen et al. (2019).

Further, by summing up the time of medical and non-medical effort across all patients who would not have been recommended to RPM in the retrospective scenario, but were assigned to RPM in the original trial, the effort that could have been saved by employing the explored biomarker guidance could roughly be estimated.

All statistical analyses were conducted and documented by scripts using R version 3.5.1 (R. Core Team 2018), a language and environment for data processing, statistical computing and graphics. Cox proportional hazards models were computed with package survival 2.42.3 (Terry et al. 2000).

Results for Using a Combination of proBNP and ADM for the Prescription of a Remote Patient Management
Association of NT-proBNP and MR-proADM with Endpoints Linear and Cox proportional hazards regression models showed that both, NT-proBNP and of MR-proADM, were significantly associated with % lost days due to unplanned CV hospitalization and time to all-cause death (all p<0.001). In model comparisons, linear and Cox proportional hazards models that included both biomarkers performed significantly better than models that included only NT-proBNP as a predictor (all p<0.001). The raw data on the association of biomarkers with the primary endpoint is shown in FIG. 12.

In line with this, the primary analysis of quintiles of the two biomarkers and their association with the event rates for the primary endpoint showed that for MR-proADM, % lost days increased in the SOC group from 1.4% (MR-proADM≤0.75 nmol/L; lowest quintile; Table 14A) to 17.6% (MR-proADM up to the measured maximum of 7.8 nmol/L; highest quintile) across quintiles. In the RPM group, this trend was similar (1.4% to 12.1%). The same tendency of higher risk for suffering from events with higher biomarker levels can also be seen for NT-proBNP (Table 14A), as well as for the endpoint all-cause death (Table 14B).

Furthermore, the effect that RPM had on these two endpoints tended to increase across quintiles. For example, NT-proBNP had prognostic power for the treatment effect of RPM on % lost days, as patients in the lowest quintile (with ≤487.9 pg/ml) had slightly more % lost days in RPM than in SOC, but for those patients in the highest quintile (with 3701.2-35000 pg/ml), % lost days were markedly reduced in the SOC group. The same trend held for MR-proADM, as well for the endpoint all-cause death.

Selection Scenarios for Patients Recommended for RPM

The cutoffs for selection which patients should not be recommended for RPM ranged between 125.1 and 413.7 pg/ml for NT-proBNP and 0.63 and 0.75 nmol/L for MR-proADM, depending on the desired safety (sensitivities 100%; 98%; 95%) and patient selection criterion (at least 30 lost days/year due to unplanned CV hospitalization or all-cause death; all-cause death), as shown in Table 15.

The lower the desired sensitivity, the higher were the critical biomarker cutoffs and the higher was the proportion of patients that would not be recommended for RPM. Also, the lower the desired sensitivity, the higher was the positive predictive value (PPV) of the biomarker guidance. For example, if we allowed that 5% of the patients who suffered from 30 out of 365 lost days or more did not receive RPM (95% sensitivity), 21.5% of patients who would be recommended for RPM by the biomarker combination would experience this event. For comparison, the rate of this event in the full SOC group in the original trial population was 16.4%. This increase in PPV was associated with a reduction of the population who was recommended to RPM by 27.0%.

This scenario of biomarker guidance is shown in FIG. 9, panel B. Thus, biomarkers allowed to define the critical population more accurately and efficiently. Notably, the proportion of patients who would be recommended for RPM could be reduced by roughly one quarter in both scenarios with 95% sensitivity. Even for 100% sensitivity, with a joint use of NT-proBNP and MR-proADM, still 10.8% and 13.9% could have been excluded from RPM (Table 15).

Figure 9B:
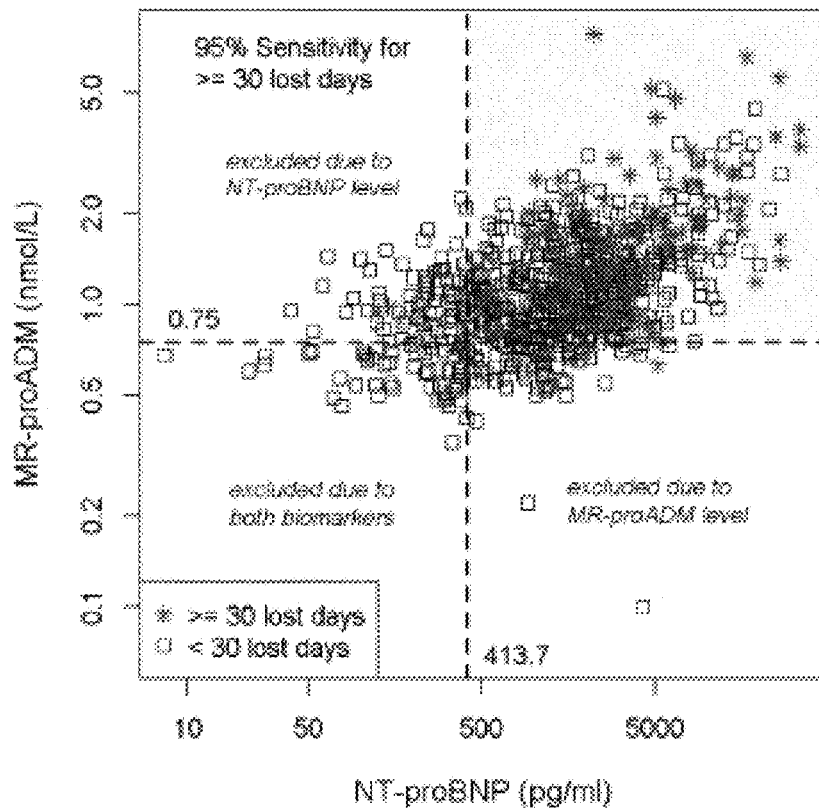

The reduction of the population recommended for RPM by the joint use of NT-proBNP and MR-proADM allowed to exclude event-free patients with rather high levels of NT-proBNP, who nevertheless had rather low levels of MR-proADM (lower right quadrant in FIG. 9B). These would have been included in RPM based on the sole use of NT-proBNP for risk stratification (FIG. 9, panel A).

Comparing a single vs. the explored double-biomarker guidance, the superiority of using two biomarkers was in particular obvious for high safety: for 100% sensitivity regarding 30 out of 365 or more lost days (all-cause death, respectively), NT-proBNP alone would reduce the population with RPM recommended by 3.4% (3.4%) of patients, reaching 4.0% (3.9%) specificity. This is more than three times higher when using a combination of NT-proBNP and MR-proADM, where the population with RPM recommended would safely be reduced by 10.8% (13.9%) of patients, reaching 12.9% (15.7%) specificity.

For 95% sensitivity regarding 30 out of 365 or more lost days, NT-proBNP alone would reduce the population with RPM recommended by 23.4% of patients (FIG. 9, panel A), reaching 27.1% specificity. This was, again, increased when using MR-proADM in addition, where the population with RPM recommended could be reduced by 27.0% of patients, reaching 31.4% specificity (FIG. 9, panel B).

Note that for all sensitivities <100%, these numbers depend on the exact combination algorithm that is used to integrate the information of both biomarkers. For example, following the approach explored in the example where both biomarkers are weight equally (see Methods), in the scenario of 95% sensitivity for all-cause death, NT-proBNP alone would reduce the population recommended for RPM by 32.3% (cutoff 383.3 pg/ml), while for the double-biomarker guidance in this scenario only a reduction by 25.6% was found (Table 15). The exclusion rate could be increased further to 36.0% by additionally employing MR-proADM (with single marker sensitivity at 100%) in the selection procedure.

Evaluation of Scenarios Regarding Efficacy of RPM

Table 15 shows the effect of biomarker based reduction of the randomized groups with respect to the primary and all secondary endpoints. The effects on the endpoints remained mainly significant, specifically for the most efficient scenario and the endpoint all-cause mortality. More notably, since p-values are affected by a biomarker-based reduction of the sample, effect estimates remained highly similar to the results of the original trial, indicating efficacy of RPM for most endpoints. This also highlighted by the Kaplan-Meier curve for the latter scenario and the endpoint all-cause death (see FIG. 11). The number-needed-to-treat (NNT) for all-cause death could be lowered by the exclusion of patients: For the scenarios of 95% sensitivity regarding 30 lost days/year (all-cause death), NNT was lowered from 28 in the original population to 23 (21) in the reduced subpopulation selected via biomarkers.

Further Analysis for 95% Scenario: Patient Characteristics and RPM Interventions For the biomarker guidance scenario with 95% sensitivity regarding the endpoint 30 lost days/year (i.e., ≥8.2% lost days), the patient characteristics of the identified subgroups is described. The biomarker cutoffs for this scenario were as follows: only patients were recommended for RPM who had both a level of NT-proBNP 413.7 pg/ml and a level of MR-proADM 0.75 nmol/L (see Table 16).

With this, related to the primary endpoint, with a sensitivity of 95%, n=1098/1538 (71.4%) patients remained in the biomarkers selected data set. The Table 16a shows the characteristics of these patients by randomized treatment groups and the Table 16b the characteristics of selected versus not selected patients. Data in the Table 16a confirm that despite biomarkers based selection, both randomized treatment groups remain comparable without significant differences. Table 16b shows that the biomarkers selected patients were at higher risk with lower LVEF and higher NYHA categories.

Figure 10A:
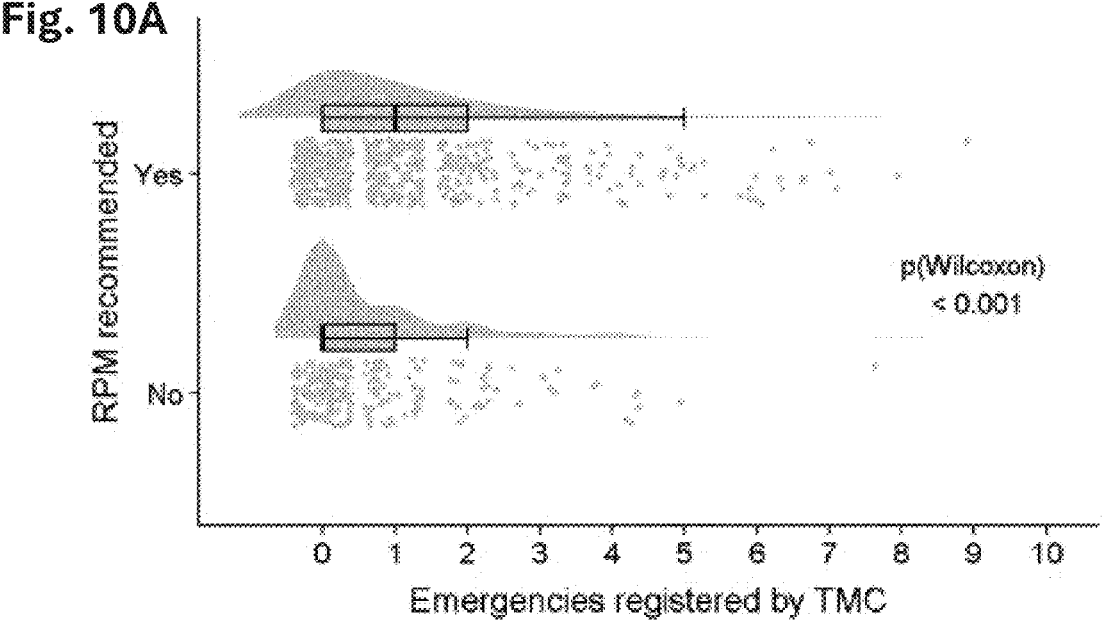
FIGS. 10A-10B Comparison of (FIG. 10A) rate of emergencies and (FIG. 10B) medical effort spent by the telemedicine centre between the groups that, based on the presented biomarker guidance scenario, would have been recommended to RPM (i.e., only patients with NT-proBNP 413.7 and MR-proADM 0.75) and those that would not have been recommended to RPM (those below the cutoffs).
Figure 10B:
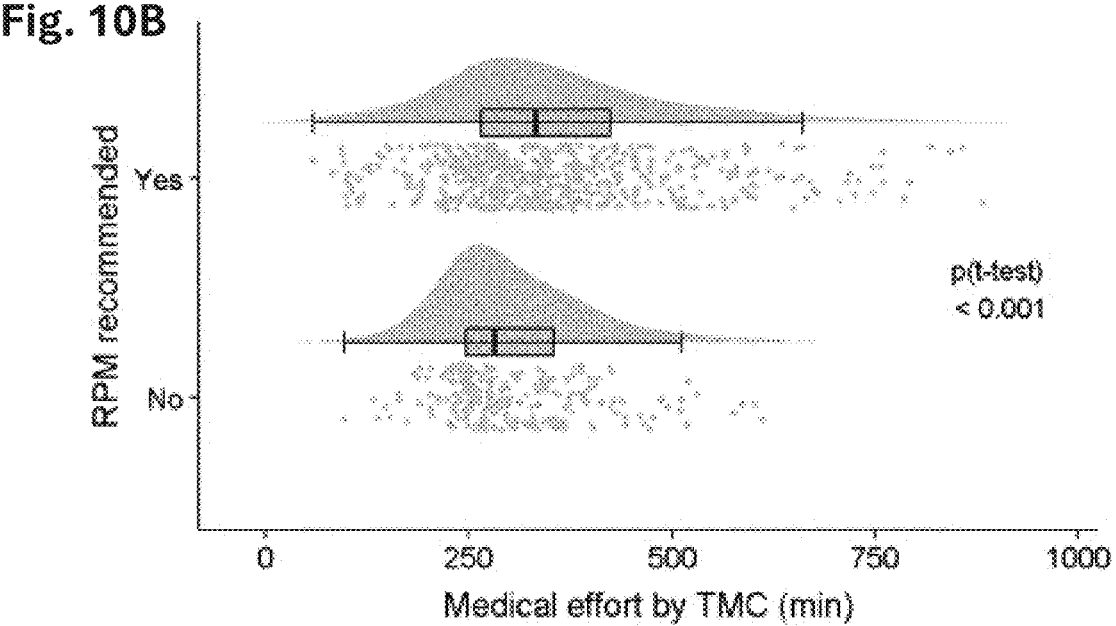

Further results were obtained based on the unique electronic health record data that was available for patients who were in the RPM group during the trial. For the scenario explored in the current example, the rate of emergencies in patients who would have been excluded from RPM was significantly lower than among those who had would have been recommended for RPM (median 0, IQR 0-1 vs. median 1, IQR 0-2; Wilcoxon rank sum test, p<0.001; FIG. 10A). Thus, this result is consistent with the aim to identify those patients who, due to their risk of experiencing adverse events, are more in need of RPM. Further, as should be expected, the medical effort that TMC staff spent for patients who would not have been recommended for RPM given the explored biomarker-guidance scenario was significantly lower than the effort spent for patients who would have been recommended for RPM (average 305 minutes, SD 88 minutes vs. average 355 minutes, SD 141 minutes; t-test, p<0.001; FIG. 10B).

Based on the effort data that could be estimated from the electronic health records for each individual patient who was assigned to RPM in the original trial, a substantial amount of staff time could have been saved in this biomarker guidance scenario. The total estimated time of medical effort that was spent for patients in the trial's RPM group by the TMC was 4332 hours (appr. 5.7 hours per patient). The time of non-medical effort that was spent by the TMC was 356 hours (appr. 0.5 hours per patient). Of this, 1170 hours of medial effort and 99 hours of non-medical effort could have been saved if RPM had not been recommended to those patients who were below biomarker cutoffs that have been explored here (see Table 16a, b for detailed description of this subpopulation of patients). Note that these results are qualitatively similar for other biomarker guidance scenarios based on other desired sensitivities or the other endpoint (all-cause death).

Figure 11:
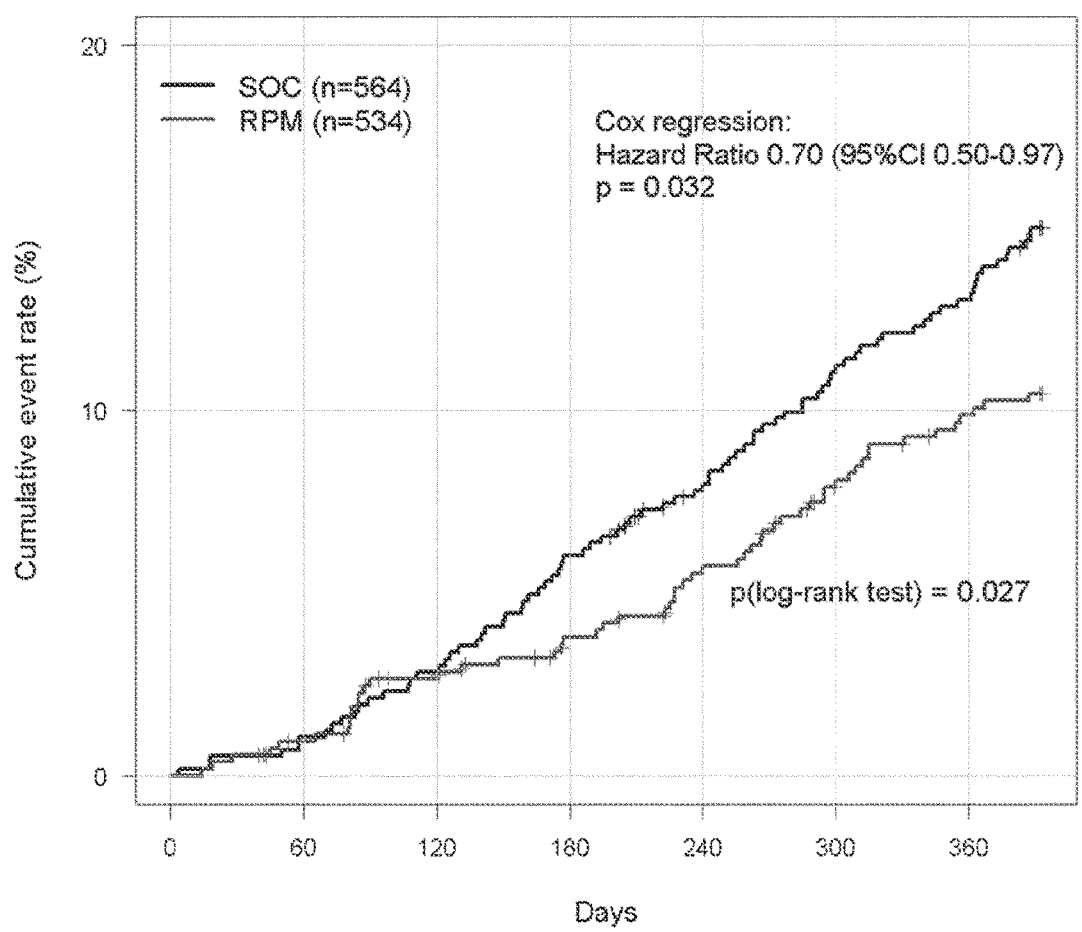
FIG. 11 Kaplan-Meier curve and log-rank test for comparing the effect of RPM on time to all-cause death in the subpopulation of TIM-HF2 reduced via a biomarker guidance scenario (i.e., only patients with NT-proBNP 413.7 and MR-proADM 0.75 nmol/L are considered).

Further results are related to patients selected with 95% sensitivity regarding the endpoint all-cause mortality. FIG. 11 shows the Kaplan-Meier curve of the two treatment groups in the biomarkers based personalized cohorts.

In summary, in the present example of a biomarkers substudy of TIM-HF2 it was found that with the combination of NT-proBNP (cutoff <383.3 pg/ml) and MR-proADM (cutoff <0.75 nmol/L) 72.5% of the originally randomized patients could be selected who have the same benefit as the original cohort. Therefore, by a simple measurement of those two biomarkers at baseline, RPM indication could be personalized to a higher risk cohort. Of note, the biomarker test can be easily taken from any caregiver and requires no other pre-analytic procedures. The blood sample can be send by the standard postal service to a centralized core lab very cost effective as proven in the main study (Koehler et al 2018a).

Example 3 primarily analysed the prognostic effect of NT-proBNP and MR-proADM, which both are significantly associated with outcome. Comparing the two randomized groups, effects of treatment are not significantly predicted by both markers. Therefore, the approach to use these markers was primarily employed to identify patients who do not profit from RPM. This was done by analyzing the biomarkers in the SOC-group with no events. Cutoffs identified by this approach were applied to the randomized cohorts and the selected populations were compared for efficacy. Example 3 shows that the effect of RPM remained mainly the same. The approach enabled to personalize the recommendation for RPM and for the present example reduce the eligible cohort to 71.4% of the entire population and thus avoids efficiently unnecessary cost-intensive therapies.

TABLE 1

Inclusion and exclusion criteria for patient participation in the study

| Inclusion criteria | Exclusion criteria |
| --- | --- |
| Diagnosed with HF—NYHA class II or III | Hospitalisation within the last 7 days before randomisation |
| Echocardiographically determined left ventricular ejection fraction ≤45% or >45% + oral diuretic prescribed | Implanted cardiac assist system |
| Hospitalisation due to decompensated HF within the last 12 months before randomisation | Acute coronary syndrome within the last 7 days before randomisation |
| Depression score PHQ-9 < 10 | High urgent listed for heart transplantation |
| Written informed consent obtained | Planned revascularisation, transcatheter aortic valve implantation, MitraClip and/or CRT implantation within 3 months after randomisation |
| | Revascularisation and/or CRT implantation within 28 days before randomisation |
| | Known alcohol or drug abuse |
| | Terminal renal insufficiency with haemodialysis |
| | Impairment or unwillingness to use the telemonitoring equipment (e.g. dementia, impaired self-determination, lacking ability to communicate) |
| | Existence of any disease reducing life expectancy to less than 1 year |
| | Age < 18 years |
| | Pregnancy |
| | Participation in other treatment studies or remote patient management programmes (register studies possible) |

Abbreviations:
CRT, cardiac resynchronisation therapy;
HF, heart failure;
NYHA, New York Heart Association;
PHQ, Patient Health Questionnaire.

TABLE 2

Study flow and assessments performed at different visits

|  | Screening | Baseline | 3-Month visit | 6-Month visit | 9-Month visit | Final visit (365 days or within +28 days) |
|---|---|---|---|---|---|---|
| Informed consent and patient information | X | X |  |  |  |  |
| Review inclusion/exclusion criteria | X | X |  |  |  |  |
| Randomisation |  | X |  |  |  |  |
| Physical examination |  | X |  |  |  | X |
| Registration medication |  | X |  |  |  | X |
| Echocardiography |  | X |  |  |  |  |
| 12-channel ECG |  | X |  |  |  | X |
| Laboratory tests: haemoglobin, haematocrit, leucocytes, thrombocytes, sodium, potassium, creatinine |  | X | X | X | X | X |
| Cardiac biomarkers: NT-proBNP, MR-proADM, MR-proANP, procalcitonin |  | X | X | X | X | X |
| Health questionnaires: MLHFQ, EQ-5D-3 L, PHQ-9D, G9-EHFScBS |  | X |  |  |  |  |
| Registration of events: hospitalisation, emergency, death |  |  | X | X | X | X |

Abbreviations: EQ-5D-3 L, EuroQol-5 Dimensions-3 Levels; G9-EHFScBS, German 9-Item European Heart Failure Self-care Behaviour Scale; MLHFQ, Minnesota Living with Heart Failure Questionnaire; MR-proADM, mid-regional pro-adrenomedullin; MR-proANP, mid-regional pro-A type natriuretic peptide; NT-proBNP, N-terminal pro-B type natriuretic peptide; PHQ-9D, Patient Health Questionnaire nine questions in German

TABLE 3

|  | Baseline characteristics: | |
|---|---|---|
|  | Remote patient management (n = 765) | Usual care (n = 773) |
| Age (years) | 70 (11) | 70 (10) |
| Sex |  |  |
| Male | 533 (70%) | 537 (69%) |
| Female | 232 (30%) | 236 (31%) |
| Living alone | 213 (28%) | 222 (29%) |
| Living in a urban area vs rural area |  |  |
| Rural | 457 (60%) | 458 (59%) |
| Urban | 308 (40%) | 315 (41%) |
| NYHA class |  |  |
| I | 3 (0%) | 8 (1%) |
| II | 400 (52%) | 396 (51%) |
| III | 359 (47%) | 367 (47%) |
| IV | 3 (0%) | 2 (0%) |
| LVEF | 41 (13) | 41 (13) |
| ≤45% | 492 (64%) | 509 (66%) |
| >45% | 273 (36%) | 264 (34%) |
| <40% | 342 (45%) | 328 (42%) |
| 40-50% | 228 (30%) | 272 (35%) |
| >50% | 195 (25%) | 173 (22%) |
| Days between discharge of last heart failure hospital admission and randomisation | 92 (81) | 93 (82) |
| ≤30 days | 192 (25%) | 198 (26%) |
| 31-90 days | 281 (36%) | 276 (36%) |
| >90 days | 299 (39%) | 291 (38%) |
| Bodyweight (kg) | 87 (21) | 88 (21) |
| Body-mass index (kg/m$^2$) | 30 (6) | 30 (6) |
| Blood pressure (mm Hg) |  |  |
| Systolic | 126 (19) | 125 (20) |
| Diastolic | 74 (11) | 74 (11) |
| Pulse (beats per min) | 73 (14) | 72 (14) |

TABLE 3-continued

|  | Baseline characteristics: | |
|---|---|---|
|  | Remote patient management (n = 765) | Usual care (n = 773) |
| Primary cause of heart failure |  |  |
| Ischaemic cause (coronary artery disease or myocardial infarction) | 301 (39%) | 323 (42%) |
| Hypertension | 128 (17%) | 146 (19%) |
| Dilated cardiomyopathy | 176 (23%) | 171 (22%) |
| Other | 160 (21%) | 133 (17%) |
| Cardiovascular risk factors |  |  |
| Smoking status |  |  |
| Unknown | 24 (3%) | 27 (3%) |
| Non-smoker | 378 (49%) | 385 (50%) |
| Former smoker | 286 (37%) | 304 (39%) |
| Smoker | 77 (10%) | 57 (7%) |
| Hyperlipidaemia |  |  |
| Unknown | 41 (5%) | 39 (5%) |
| No | 306 (40%) | 318 (41%) |
| Yes | 418 (55%) | 415 (54%) |
| Diabetes mellitus | 347 (45%) | 355 (46%) |
| Medical history |  |  |
| Coronary revascularisation (PCI) | 262 (34%) | 298 (39%) |
| Coronary artery bypass surgery | 134 (18%) | 145 (19%) |
| TAVI | 23 (3%) | 30 (4%) |
| Mitral clip | 26 (3%) | 34 (4%) |
| Cardiac surgery for valves | 86 (11%) | 71 (9%) |
| Implantable cardioverter defibrillator | 222 (29%) | 234 (30%) |
| Cardiac resynchronisation therapy | 118 (15%) | 122 (16%) |
| Ablation of pulmonary veins | 71 (9%) | 52 (7%) |
| Laboratory measurements |  |  |
| Haemoglobin (mmol/L) | 8 (7-9) | 8 (8-9) |
| Serum sodium (mmol/L) | 140 (137-142) | 140 (138-142) |

TABLE 3-continued

Baseline characteristics:

| | Remote patient management (n = 765) | Usual care (n = 773) |
|---|---|---|
| Potassium (mmol/L) | 5 (4-5) | 5 (4-5) |
| Serum creatinine (µmol/L) | 108 (87-141) | 109 (88-148) |
| Estimated GFR (mL/min per 1.73 m² of body surface area, Cockcroft-Gault) | 60 (43-88) | 60 (42-84) |
| NT-proBNP (pg/mL) | 1407 (626-3142) | 1488 (594-3069) |
| In patients with LVEF ≤45 (n = 1001) | 1728 (798-3858) | 1798 (786-3667) |
| In patients with LVEF >45 (n = 537) | 1056 (468-2042) | 1035 (405-1985) |
| MR-proADM (nmol/L) | 1 (1-2) | 1 (1-2) |
| Concomitant treatment | | |
| ACE inhibitors or ARBs | 628 (82%) | 641 (83%) |
| ARN inhibitors | 44 (6%) | 47 (6%) |
| β blockers | 702 (92%) | 711 (92%) |
| Aldosterone antagonists | 441 (58%) | 405 (52%) |
| Loop diuretics | 717 (94%) | 721 (93%) |
| Thiazides | 191 (25%) | 185 (24%) |
| Other diuretics | 4 (1%) | 1 (0%) |
| Vitamin K antagonists | 265 (35%) | 272 (35%) |
| Antiplatelet therapy | 103 (13%) | 130 (17%) |
| NOACs | 205 (27%) | 208 (27%) |
| Platelet aggregation inhibitors | 266 (35%) | 267 (35%) |
| Lipid-lowering drugs | 456 (60%) | 453 (59%) |
| Insulin | 170 (22%) | 170 (22%) |
| Oral hypoglycaemic drugs | 206 (27%) | 185 (24%) |
| Ivabradine | 22 (3%) | 43 (6%) |
| Calcium antagonists | 163 (21%) | 188 (24%) |
| Nitrates | 37 (5%) | 48 (6%) |
| Digitalis glycosides | 119 (16%) | 133 (17%) |
| Antiarrhythmic drugs | 99 (13%) | 98 (13%) |

Data are mean (SD) or n (%), median (IQR) for all laboratory tests.
NYHA = New York Heart Association.
LVEF = left ventricular ejection fraction.
PCI = percutaneous coronary intervention.
TAVI = transcatheter aortic valve implantation.
GFR = glomerular filtration rate.
NT-proBNP = N-terminal prohormone of brain natriuretic peptide.
MR-proADM = mid-regional proadrenomedullin.
ACE = angiotensin-converting enzyme.
ARB = angiotensin-receptor blocker.
ARN = angiotensin receptor-neprilysin.
NOAC = novel oral anticoagulant.

TABLE 4

Primary and key secondary outcomes

| | Remote patient management (n = 765) | | Usual care (n = 773) | | Ratio, remote patient management vs usual care (95% CI) | p value |
|---|---|---|---|---|---|---|
| | Number of patients with event | Weighted average (95% CI) | Number of patients with event | Weighted average (95% CI) | | |
| Percentage of days lost due to unplanned cardiovascular hospitalisation or death of any cause | 265 (35%) | 4.88% (4.55-5.23) | 290 (38%) | 6.64% (6.19-7.13) | 0-80* (0.65-1.00) | 0.0460 |
| Days lost per year | ... | 17.8 days (16.6-19.1) | ... | 24.2 days (22.6-26.0) | ... | ... |
| All-cause mortality† | 61 (8%) | 7.86 (6.14-10.10) | 89 (12%) | 11.34 (9.21-13.95) | 0.70‡ | 0.0280 |
| Cardiovascular moriality† | 39 (5%) | 5.04 (3.68-6.90) | 59 (8%) | 7.51 (5.82-9.70) | 0.67‡ (0.45-1.01) | 0.0560 |

* Ratio of the weighted average.
† Measured during induvidual patient follow-up time plus 28 days after the study visit, to a maximum of 393 days.
‡ Hazard ratio.

TABLE 5

| | Remote patient management (n = 465) | | Usual care (n = 773) | | Mean difference* | |
|---|---|---|---|---|---|---|
| | Patients (n) | Mean (95% CI) | Patients (n) | Mean (95% CI) | (95% CI) | p value |
| Quality of life | | | | | | |
| Change in MLHFQ global score from baseline to 12 months† | 649 | -3.08 (-4.42 to -1.75) | 624 | -1.98 (-3.34 to -0.61) | -1.11 (-3.01 to 0.80) | 0.26 |

TABLE 5-continued

| | Remote patient management (n = 465) | | Usual care (n = 773) | | Mean difference* | |
|---|---|---|---|---|---|---|
| | Patients (n) | Mean (95% CI) | Patients (n) | Mean (95% CI) | (95% CI) | p value |
| Biomarker values | | | | | | |
| Change in NT-proBNP (pg/mL) from baseline to 12 months† | 654 | −24.66% (−29.68 to 19.29) | 628 | −18.72% (−24.28 to −12.75) | −7.31% (−16.03 to 2.31) | 0.13 |
| In patients with LVEF ≤ 45% | 423 | −34.30% (−39.94 to 28.12) | 410 | −27.16% (−33.51 to −20.20) | −9.80% (−20.64 to 2.52) | 0.11 |
| In patients with LVEF > 45% | 241 | −3.71% (−12.99 to 6.56) | 218 | −0.68% (−10.73 to 10.49) | −3.04% (−16.32 to 12.33) | 0.68 |
| Change in MR-proADM (nmol/L) from baseline to 12 months† | 665 | 8.44% (5.99 to 10.94) | 628 | 3.76% (1.35 to 6.23) | 4.50% (1.14 to 7.98) | 0.0084 |

$MLHFQ$ = Minnesota Living with Heart Failure Questionnaire.
$NT\text{-}proBNP$ = N-terminal prohormone of brain natriuretic peptide.
$LVEF$ = left ventricular ejection fraction.
$MR\text{-}proADM$ = mid-regional proadrenomedullin.
* Mean difference in change in the remote patient management group vs change in the usuall care group.
† Data obtained at final study visit performed at a maximum of 393 days after randomisation.

TABLE 6

Selected interventions of TMC physicians and nurses in the remote management group

| | Number of interventions | Median (range) per patient |
|---|---|---|
| Evaluation of patient-transmitted vital parameters* | 1 026 078 | 1421.0 (6-3962) |
| Patient case review by TMC physicians and nurses | 38 694 | 36.0 (0-273) |
| Monthly structured telephone interview | 9189 | 12.0 (1-13) |
| TMC initiated contact with patient for evaluation of key vital parameters | 4324 | 4.0 (0-37) |
| TMC initiated contact with patient after discharge, physician appointment, and for validation of medication list | 6037 | 7.0 (1-27) |
| TMC initiated medication changes | 3546 | 3.0 (0-57) |
| TMC initiated scheduled 3-month medical report sent to patient's local physician (GP or cardiologist) | 2812 | 4.0 (0-4) |
| TMC physician and patient telephone consultations | 1535 | 1.0 (0-40) |
| TMC initiated contact with health-care professionals | 863 | 0.0 (0-21) |
| Patient home heart failure education including caregivers | 765 | 1.0 (1-1) |
| TMC initiated emergency department visits | 30 | NA |
| TMC initiated unplanned cardiovascular hospital admissions | 57 | NA |
| TMC initiated unplanned non-cardiovascular hospital admissions | 13 | NA |

*Vital parameters are bodyweight, blood pressure, self-rated health status, and electrocardiogram including peripheral capillary oxygen saturation.
TMC = telemedicine centre.
GP = general practitioner.
NA = not applicable; only the total number is known, and not the median per patient.

TABLE 7

Cutoff Analysis for proADM

| Cutoff | Sensitivity | Specificity | NPV | PPV | PredNeg | PredPos |
|---|---|---|---|---|---|---|
| 0.75 nmol/L | 100 | 18.8 | 100 | 12.7 | 16.8 | 83.2 |
| 0.86 nmol/L | 95.1 | 30.2 | 98.1 | 13.8 | 27.5 | 72.5 |
| 0.91 nmol/L | 91.4 | 35.7 | 97.2 | 14.4 | 32.9 | 67.1 |
| 0.98 nmol/L | 86.4 | 42.7 | 96.4 | 15.1 | 39.6 | 60.4 |
| 1.07 nmol/L | 80.2 | 51.2 | 95.6 | 16.2 | 47.8 | 52.2 |

TABLE 8

Cutoff Analysis for proBNP

| Cutoff | Sensitivity | Specificity | NPV | PPV | PredNeg | PredPos |
|---|---|---|---|---|---|---|
| 237.6 pg/ml | 100 | 8.9 | 100 | 11.5 | 7.9 | 92.1 |
| 609.4 pg/ml | 95.1 | 27.9 | 98 | 13.5 | 25.5 | 74.5 |
| 1107.9 pg/ml | 90.1 | 42.9 | 97.4 | 15.7 | 39.5 | 60.5 |
| 1402.95 pg/ml | 85.2 | 51.8 | 96.7 | 17.2 | 47.9 | 52.1 |
| 1595.8 pg/ml | 80.2 | 55.9 | 96 | 17.7 | 52.1 | 47.9 |

TABLE 9

Cutoff Analysis for proANP

| Cutoff | Sensitivity | Specificity | NPV | PPV | PredNeg | PredPos |
|---|---|---|---|---|---|---|
| 106.9 pmol/L | 100 | 9.9 | 100 | 11.5 | 8.9 | 91.1 |
| 158.8 pmol/L | 93.8 | 23.9 | 97 | 12.6 | 22.1 | 77.9 |
| 186.2 pmol/L | 90 | 33.7 | 96.7 | 13.7 | 31.2 | 68.8 |
| 235.6 pmol/L | 85 | 45.9 | 96.3 | 15.5 | 42.7 | 57.3 |
| 248.3 pmol/L | 80 | 49.9 | 95.5 | 15.7 | 46.7 | 53.3 |

TABLE 10

Stratification of biomarker cutoffs by a GFR based upon CKD-EPI

| Total sensitivity (%) | ADM Cutoff (GFR<) | ADM Cutoff (GFR>=) | BNP Cutoff (GFR<) | BNP Cutoff (GFR>=) | % patients excluded from RPM with SNP, ADM and GFR | Event rate of excluded pats (100-NPV) | Event rate of included pats (PPV) | % patients excluded from RPM w/o Arm using only BNP and GFR |
|---|---|---|---|---|---|---|---|---|
| GFR 50 strata ||||||||| 
| 100 | 0.98 | 0.53 | 237.6 | 42.4 | 6.4 | 0 | 10.5 | 2 |
| 99 | 0.98 | 0.62 | 237.6 | 140.2 | 15.1 | 1 | 11.4 | 7.6 |
| 95 | 1.06 | 0.68 | 273.7 | 281.6 | 23.4 | 1.9 | 12.3 | 19.5 |
| 90 | 1.1 | 0.73 | 564.4 | 459.8 | 33.9 | 3 | 13.4 | 30.7 |
| 86 | 1.13 | 0.77 | 714.9 | 526.2 | 39.3 | 3.6 | 13.9 | 41.9 |
| 81 | 1.24 | 0.86 | 903.2 | 774.6 | 51.1 | 3.7 | 18.3 | 50 |
| GFR 60 strata ||||||||| 
| 100 | 0,97 | 0.53 | 237.6 | 42.4 | 9.3 | 0 | 10.9 | 2.7 |
| 99 | 0.98 | 0.57 | 273.7 | 137.7 | 15.4 | 1 | 11.5 | 7.9 |
| 95 | 1.05 | 0.63 | 402.6 | 266.7 | 24.9 | 1.8 | 12.5 | 18.5 |
| 90 | 1.07 | 0.7 | 585.2 | 358.1 | 33 | 3 | 13.3 | 30 |
| 86 | 1.1 | 0.73 | 842.2 | 460.1 | 38.2 | 3.5 | 13.8 | 38.9 |
| 80 | 1.14 | 0.78 | 1082 | 590.8 | 46.5 | 4.2 | 14.8 | 50 |

TABLE 11

Stratification of biomarker cutoffs by a GFR based upon Cockroft-Gault

| Total sensitivity (%) | ADM Cutoff (GFR<) | ADM Cutoff (GFR>=) | BNP Cutoff (GFR<) | BNP Cutoff (GFR>=) | % patients excUed from RPM with BNP, ADM and GFR | Event rate excluded (100-NPV) | Event rate included PPV | % patients excluded from RPM w/o ACM using only BNP and GFR |
|---|---|---|---|---|---|---|---|---|
| GFR 50 strata ||||||||| 
| 100 | 0.62 | 0.53 | 937.6 | 42.4 | 4.5 | 0 | 10.3 | 2.2 |
| 99 | 0.84 | 0.57 | 273.7 | 137.7 | 11.6 | 1.3 | 11 | 7.4 |
| 95 | 1.05 | 0.63 | 454.4 | 203.9 | 21.7 | 2.1 | 12 | 17.1 |
| 89 | 1.08 | 0.7 | 842.2 | 298.4 | 30.8 | 3.4 | 12.7 | 30.5 |
| 86 | 1.14 | 0.73 | 1007 | 457.1 | | 3.7 | 13.8 | |
| 80 | 1.23 | 0.75 | 1364 | 502.2 | 45.4 | 4.3 | 14.5 | 45.6 |
| GFR 60 strata ||||||||| 
| 100 | 0.62 | 0.53 | 137.7 | 42.4 | 4.2 | 0 | 10.3 | 1.5 |
| 99 | 0.75 | 0.53 | 203.9 | 42.4 | 6.6 | 1.1 | 10.5 | 2.5 |
| 95 | 0.92 | 0.63 | 402.6 | 273.6 | 24.9 | 2.1 | 12.4 | 16.5 |
| 90 | 0.97 | 0.68 | 585.2 | 298.4 | 31.3 | 3.1 | 12.9 | 30 |
| 85 | 1.05 | 0.7 | 935.5 | 457.1 | 40.9 | 3.6 | 14.2 | 38.8 |
| 80 | 1.08 | 0.73 | 1268 | 502.2 | 46.3 | 4.2 | 14.7 | 43.4 |

TABLE 12

Exclusion based on SOC outcomes

| Biomarker | Endpoint | Follow-up | Sensitivity (%) | MR-proADM cutoff [nmol/L] | NT-proBNP cutoff [ng/L] | SOC patients not recommended for RPM [%] | RPM vs. SOC outcomes for RPM- Hazard Ratio | p-value | NNT |
|---|---|---|---|---|---|---|---|---|---|
| combined | All-cause Death | 1 year | 100 | 0.69 | 125.1 | 13.7 | 0.71 | 0.0423 | 26 |
| combined | All-cause Death | 1 year | 97.7 | 0.72 | 145.4 | 16.9 | 0.71 | 0.0467 | 26 |
| combined | All-cause Death | 1 year | 95.5 | 0.75 | 383.3 | 25.3 | 0.71 | 0.0425 | 23 |

TABLE 13

| | Optimized MR-proADM cutoff for 100% sensitivity | Optimized NT-proBNP cutoff for 100% sensitivity | Specificity when using GFR strata in addition to biomarkers | Gain in specificity when using GFR in addition to both biomarkers | Gain in specificity when using MR-proADM in addition to NT-proBNP and GFR |
|---|---|---|---|---|---|
| GFR >= 30 | 0.75 | 383.3 | 28.3% | +4.5%-points | +11.8%-points |
| GFR < 30 | 1.14 | 237.6 | | | |

TABLE 14A

Average % lost days due to unplanned CV hospitalization for the different biomarker quintiles for SOC and RPM subgroups. P-values for the treatment effect, as well as for the interaction of treatment with quintile are presented.

| Biomarker | Quintiles* | Lost days SOC | Lost days RPM | Δ Lost days SOC-RPM | p-value SOC vs. RPM | p-value Interaction |
|---|---|---|---|---|---|---|
| NT-proBNP [pg/ml] | 0-488 | 0.95 | 1.56 | −0.62 | 0.40 | |
| | 488-1099 | 2.38 | 2.74 | 0.36 | 0.56 | |
| | 1099-1880 | 5.09 | 2.21 | 2.88 | 0.05 | 0.32 |
| | 1880-3701 | 7.61 | 5.33 | 2.29 | 0.36 | |
| | 3701-35000 | 17.28 | 12.84 | 4.45 | 0.11 | |
| MR-proADM [nmol/L] | 0-0.75 | 1.35 | 1.39 | −0.04 | 0.91 | |
| | 0.75-0.95 | 4.05 | 1.29 | 2.76 | 0.05 | |
| | 0.98-1.20 | 3.47 | 3.60 | −0.13 | 0.57 | 0.68 |
| | 1.20-1.58 | 6.66 | 6.78 | −0.12 | 0.56 | |
| | 1.58-7.82 | 17.64 | 12.13 | 5.51 | 0.21 | |

* upper limits are included in respective Quintiles, lower limits not

TABLE 14B

Rate of all-cause death for the different biomarker quintiles for SOC and RPM subgroups. P-values for the treatment effect, as well as for the interaction of treatment with quintile are presented.

| Biomarker | Quintiles* | Eventrate SOC (%) | Eventrate RPM (%) | Hazard ratio SOC/RPM | p-value SOC vs. RPM | p-value Interaction |
|---|---|---|---|---|---|---|
| NT-proBNP [pg/ml] | 0-488 | 1.9 | 2.6 | 1.35 | 0.70 | 0.71 |
| | 488-1099 | 4.6 | 5.1 | 1.10 | 0.86 | |
| | 1099-1880 | 5.9 | 3.2 | 0.56 | 0.30 | |
| | 1880-3701 | 14.7 | 8.4 | 0.55 | 0.10 | |
| | 3701-35000 | 30.5 | 20.4 | 0.68 | 0.09 | |
| MR-proADM | 0-0.75 | 2.1 | 2.3 | 1.11 | 0.89 | 0.40 |
| | 0.75-0.95 | 5.8 | 1.3 | 0.21 | 0.05 | |

TABLE 14B-continued

Rate of all-cause death for the different biomarker quintiles for SOC and RPM subgroups. P-values for the treatment effect, as well as for the interaction of treatment with quintile are presented.

| Biomarker | Quintiles* | Eventrate SOC (%) | Eventrate RPM (%) | Hazard ratio SOC/RPM | p-value SOC vs. RPM | p-value Interaction |
|---|---|---|---|---|---|---|
| [nmol/L] | 0.98-1.20 | 7.2 | 6.0 | 0.85 | 0.73 | |
| | 1.20-1.58 | 12.4 | 10.8 | 0.90 | 0.76 | |
| | 1.58-7.82 | 29.9 | 20.3 | 0.67 | 0.08 | |

* upper limits are included in respective Quintiles, lower limits not

TABLE 15

Biomarker-based RPM recommendation scenarios and corresponding RPM effects for primary and secondary endpoints.

| | | Endpoint for selection: | ≥ 30 lost days/year | | | all-cause death | | |
|---|---|---|---|---|---|---|---|---|
| | Endpoint | Sensitivity: | 100% | 98% | 95% | 100% | 98% | 95% |
| Selection scenarios of patients recommended for RPM | | Cutoff MR-proADM [nmol/L] | 0.63 | 0.72 | 0.75 | 0.69 | 0.72 | 0.75 |
| | | Cutoff NT-proBNP [pg/ml] | 125.1 | 145.4 | 413.7 | 125.1 | 145.4 | 383.3 |
| | | Sensitivity (%) | 100 | 97.64 | 95.28 | 100 | 97.73 | 95.45 |
| | | Specificity (%) | 12.87 | 19.68 | 31.42 | 15.7 | 18.98 | 28.36 |
| | | Excluded (%) | 10.75 | 16.83 | 27.04 | 13.87 | 17.04 | 25.59 |
| | | NPV (%) | 100 | 97.69 | 97.13 | 100 | 98.45 | 97.94 |
| | | PPV (%) | 18.43 | 19.31 | 21.45 | 13.5 | 13.69 | 14.89 |
| Evaluation of RPM intervention effect: RPM vs. SOC for subset of patients recommended for RPM | Days lost due to unplanned cardiovascular hospital admissions or all-cause death | Average SOC (%) | 8.68 | 7.75 | 7.41 | 8.53 | 7.75 | 7.64 |
| | | Average RPM (%) | 6.28 | 5.95 | 5.52 | 6.35 | 5.95 | 5.80 |
| | | Ratio | 0.78 | 0.83 | 0.80 | 0.80 | 0.83 | 0.81 |
| | | p-value | 0.082 | 0.146 | 0.052 | 0.089 | 0.146 | 0.106 |
| | All-cause death (time to event) | Hazard ratio | 0.68 | 0.72 | 0.70 | 0.71 | 0.72 | 0.71 |
| | | 95%-Cl low | 0.48 | 0.51 | 0.50 | 0.50 | 0.51 | 0.52 |
| | | 95%-Cl high | 0.96 | 1.00 | 0.97 | 0.99 | 1.00 | 0.99 |
| | | p-value | 0.027 | 0.048 | 0.031 | 0.043 | 0.048 | 0.044 |
| | Cardiovascular death (time to event) | Hazard ratio | 0.64 | 0.69 | 0.67 | 0.68 | 0.69 | 0.68 |
| | | 95%-Cl low | 0.42 | 0.45 | 0.44 | 0.45 | 0.45 | 0.45 |
| | | 95%-Cl high | 0.99 | 1.04 | 1.00 | 1.03 | 1.04 | 1.03 |
| | | p-value | 0.042 | 0.071 | 0.051 | 0.066 | 0.071 | 0.065 |
| | % days lost due to unplanned cardiovascular hospital admissions | Average SOC (%) | 2.77 | 2.52 | 2.41 | 2.73 | 2.52 | 2.46 |
| | | Average RPM (%) | 2.11 | 2.00 | 1.87 | 2.10 | 2.00 | 1.94 |
| | | Ratio | 0.90 | 0.92 | 0.89 | 0.91 | 0.92 | 0.91 |
| | | p-value | 0.341 | 0.455 | 0.250 | 0.394 | 0.455 | 0.349 |
| | % days lost due to unplanned hospital admissions due to worsening heart failure | Average SOC (%) | 1.90 | 1.73 | 1.63 | 1.87 | 1.73 | 1.68 |

TABLE 16a

Characteristics of biomarkers based selected patients by randomized treatment groups.

| Variable | class | All patients N | % | RPM patients N | % | SOC patients N | % | *p value |
|---|---|---|---|---|---|---|---|---|
| Sex | female | 467 | 30.8 | 337 | 30.9 | 130 | 30 | 0.637 |
| Age [years] mean (SD) | | 72.6(9.2) | | 72.9(9.1) | | 72.3(9.3) | | 0.296 |
| NYHA class | I | 1 | 0.0 | 0 | 0 | 1 | 0.2 | 0.730 |
| | II | 501 | 45.9 | 268 | 46.8 | | 46.5 | 0.730 |
| | III | 592 | 52.9 | 299 | 52.9 | | 53 | 0.730 |
| | IV | 4 | 0.2 | 0 | 0.2 | | 0.4 | 0.730 |
| Living in a urban area vs rural area | rural | 630 | 57.3 | 387 | 58.0 | | 56.2 | 0.456 |
| Living alone | | 317 | 28.9 | 264 | | | 29.1 | 0.929 |
| LVEF | 40 <   | 254 | 23.2 | 142 | 21.2 | | 25.2 | 0.200 |
| | ≥50 | 336 | 30.8 | 254 | 30.8 | | 28.9 | 0.200 |
| | EF < 50 | 508 | 46.9 | 350 | 46.9 | | 45.9 | 0.200 |
| Discharge from last heart failure admission and randomization <3 months | | 727 | 66.2 | 368 | 66.2 | | 65.2 | 0.556 |
| Primary cause of heart failure | Dilated cardio-myopathy | 199 | 19.5 | 114 | 19.4 | | 20.2 | 0.181 |
| | Hypertension | 188 | 16.8 | 103 | 15.3 | | 18.3 | 0.181 |
| | Ischaemic | 487 | 45.2 | 253 | 45.2 | | 45.2 | 0.181 |
| | Other | 204 | 18.8 | 192 | | | 16.3 | 0.181 |
| Current smoker | | 75 | 6.8 | 39 | 7.3 | | 5.9 | 0.333 |
| Hyperlipidemia | | 632 | 57.6 | 319 | 58.0 | | 56.6 | 0.288 |
| Diabetes mellitus | | 537 | 48.9 | 278 | 49.8 | | 48.2 | 0.687 |
| Coronary revascularisation | | 454 | 39.5 | 236 | | | 41.3 | 0.360 |
| Coronary artery bypass surgery | | 218 | 21.8 | 114 | 21.1 | | 20.2 | 0.697 |
| TAVI | | 45 | 4.9 | 26 | 3.2 | | 4.6 | 0.421 |
| Mitral clip | | 55 | 5.4 | 45 | | | 5.5 | 0.647 |
| Prior cardiac valve surgery | | 116 | 10.8 | 58 | 12.8 | | 10.3 | 0.258 |
| ICD | | 356 | 32.8 | 188 | 31.8 | | 33.3 | 0.550 |
| CRTd | | 202 | 18.4 | 103 | 18.3 | | 18.6 | 0.580 |
| ACE inhibitors or ARB | | 882 | 84.3 | 455 | 84.5 | | 80.7 | 0.826 |
| ARN inhibitors | | 75 | 6.8 | 44 | | | 7.3 | 0.636 |
| 13 blockers | | 1019 | 92.8 | 528 | 92.9 | | 93.6 | 0.341 |
| Aldosterone antagonists | | 535 | 52.4 | 283 | 52.3 | | 50.2 | 0.152 |
| Loop diuretics | | 1056 | 96.2 | 543 | 96.3 | | 96.1 | 1.000 |
| Vitamin K antagonists | | 445 | 40.5 | 228 | 40.6 | | 40.4 | 0.992 |
| Antiplatelet therapy | | 169 | 15.4 | 93 | | | 16.5 | 0.341 |
| NOACs | | 306 | 27.8 | 158 | 27.8 | | 28 | 0.966 |
| Digitalis glycosides | | 218 | 19.9 | 118 | | | 20.9 | 0.403 |
| Antiarrhythmic drugs | | 144 | 13.1 | 73 | | | 12.9 | 0.933 |
| | | Median (IQR) | | | | | | |
| MR-proADM [mmol/L] | | 1.22 (0.97-1.65) | | 1.23 (0.96-1.68) | | 1.21 (0.97-1.63) | | 0.598 |
| NT-proBNP [pg/ml] | | 1980 (1107-3927) | | 1918 (1075-4119) | | 2048 (1146-3779) | | 0.650 |

TABLE 16b

Characteristics of biomarkers based selected patients versus not selected patients

| Variable | class | All patients N | % | Not RPM N | % | RPM N | % | *p value |
|---|---|---|---|---|---|---|---|---|
| Sex | female | 467 | 30.4 | 130 | 29.7 | 337 | 30.7 | 0.743 |
| Age [years] mean (SD) | | 70.3(10.5) | | 64.6(11.3) | | 72.6(92) | | <0.001 |
| NYHA class | I | 11 | 0.7 | 10 | 2.3 | 1 | 0.1 | <0.001 |
| | II | 795 | 51.8 | 294 | 67.1 | 501 | 45.6 | <0.001 |
| | III | 725 | 47.2 | 133 | 30.4 | 592 | 53.9 | <0.001 |
| | IV | 5 | 0.3 | 1 | 0.2 | 4 | 0.4 | <0.001 |
| Living in a urban area vs rural area | rural | 915 | 59.6 | 285 | 65.1 | 630 | 57.4 | 0.007 |
| Living alone | | 434 | 28.3 | 117 | 26.7 | 317 | 28.9 | 0.432 |
| LVEF | 40 < 50 | 372 | 24.2 | 118 | 26.9 | 254 | 23.1 | 0.004 |
| | ≥50 | 494 | 32.2 | 158 | 36.1 | 336 | 30.6 | 0.004 |
| | EF < 40 | 670 | 43.6 | 162 | 37 | 508 | 46.3 | 0.004 |
| Discharge from last heart failure admission and randomization <3 months | | 956 | 62.2 | 229 | 52.3 | 727 | 66.2 | <0.001 |

TABLE 16b-continued

Characteristics of biomarkers based selected patients versus not selected patients

| Variable | class | All patients N | % | Not RPM N | % | RPM N | % | *p value |
|---|---|---|---|---|---|---|---|---|
| Primary cause of heart failure | Dilated cardio-myopathy | 443 | 21.28 | | 29.2219 | | 19.9 | <0.001 |
| | Hypertension | 374 | 17.80 | | 20.5184 | | 16.8 | <0.001 |
| | Ischaemic | 824 | 40.63 | | 30.4491 | | 44.7 | <0.001 |
| | Other | 291 | 18.87 | | 19.9204 | | 18.6 | <0.001 |
| Current smoker | | 134 | 8.59 | | 13.5 75 | | 6.8 | <0.001 |
| Hyperlipidemia | | 832 | 54.00 | | 45.7632 | | 57.6 | <0.001 |
| Diabetes mellitus | | 701 | 43.64 | | 37.4537 | | 48.9 | <0.001 |
| Coronary revascularisation | | 659 | 36.25 | | 28.5434 | | 39.5 | <0.001 |
| Coronary artery bypass surgery | | 279 | 18.21 | | 11.6228 | | 20.8 | <0.001 |
| TAVI | | 53 | 3.58 | | 1.8 45 | | 4.1 | 0.031 |
| Mitral clip | | 60 | 3.95 | | 1.1 55 | | 5 | 0.002 |
| Cardiac surgery for valves | | 157 | 10.21 | | 7.1126 | | 11.5 | 0.013 |
| ICD | | 456 | 29.00 | | 22.8356 | | 32.4 | <0.001 |
| CRTd | | 240 | 15.38 | | 8.7202 | | 18.4 | <0.001 |
| ACE inhibitors or ARBs | | 1269 | 83.67 | | 88.4882 | | 80.3 | <0.001 |
| ARN inhibitors | | 91 | 5.96 | | 3.7 75 | | 6.8 | 0.024 |
| 13 blockers | | 1411 | 93.92 | | 89.5019 | | 92.8 | 0.042 |
| Aldosterone antagonists | | 845 | 52.70 | | 61.6575 | | 52.4 | 0.001 |
| Loop diuretics | | 1436 | 93.80 | | 86.8056 | | 96.2 | <0.001 |
| Vitamin K antagonists | | 536 | 34.91 | | 20.8445 | | 40.5 | <0.001 |
| Antiplatelet therapy | | 233 | 15.04 | | 14.6169 | | 15.4 | 0.760 |
| NOACs | | 413 | 26.97 | | 24.4306 | | 27.9 | 0.191 |
| Calcium antagonists | | 350 | 22.88 | | 22.4252 | | 23 | 0.860 |
| Digitalis glycosides | | 252 | 16.34 | | 7.8218 | | 19.9 | <0.001 |
| Antiarrhythmic drugs | | 197 | 12.83 | | 12.1144 | | 13.1 | 0.651 |
| | | | Median (IQR) | | | | | |
| MR-proADM [mmol/L] | | 1.1(0.8-1.46) | | 0.69(0.6-0.84) | | 1.2(0.97-1.7) | | <0.001 |
| NT-proBNP [pg/ml] | | 1436 (605-3097) | | 359 (200-983) | | 1980 (1107-3927) | | <0.001 |

SD, standard deviation; *p-value RPM versus SOC; LVEF, left ventricular ejection fraction

TABLE 17

Median and interquartile range (IQR) of LVEF across biomarker quintiles in the TIM-HF2 population. NT-proBNP concentration was correlated with LVEF (Spearman ρ = −0.30, ρ < 0.001), while MR-proADM was not (Spearman ρ = −0.01, ρ = 0.70).

| Biomarker | Quintile * | LVEF median (IQR) |
|---|---|---|
| NT-proBNP [pg/ml] | 0-488 | 45 (40-55) |
| | 488-1099 | 45 (35-55) |
| | 1099-1880 | 40 (30-50) |
| | 1880-3701 | 40 (30-50) |
| | 3701-35000 | 32 (25-42) |
| MR-proADM [nmol/L] | 0-0.75 | 40 (30-48) |
| | 0.75-0.95 | 44 (32-54) |
| | 0.98-1.20 | 40 (30-51) |
| | 1.20-1.58 | 40 (30-52) |
| | 1.58-7.82 | 40 (30-50) |

* upper limits are included in respective quintiles, lower limits not

TABLE 18

Biomarker-based recommendation scenarios with different safety levels (Table part 1: "Selection scenarios of patients recommended for RPM") and evaluation of the RPM intervention effect (Table part 2: "Evaluation of RPM intervention effect: RPM vs. SOC for subset of patients recommended for RPM") for more strict binary event definitions of the primary endpoint % days lost due to unplanned cardiovascular hospital admission or all-cause death used to derive cutoffs for biomarker based selection of patients with RPM recommendation 15 lost days/year, 1 lost days/year); analogous to Table 15 (see above, 30 lost days/year).

| | | Endpoint for selection: Targeted sensitivity: | ≥15 lost days/year | | | ≥1 lost days/year | | |
|---|---|---|---|---|---|---|---|---|
| | Endpoint | | 100% | 98% | 95% | 100% | 98% | 95% |
| Part 1: Selection scenarios of | Cutoff NT-proBNP [nmol/L] | | 0.58 | 0.63 | 0.70 | 0.48 | 0.58 | 0.66 |

TABLE 18-continued

Biomarker-based recommendation scenarios with different safety levels (Table part 1: "Selection scenarios of patients recommended for RPM") and evaluation of the RPM intervention effect (Table part 2: "Evaluation of RPM intervention effect: RPM vs. SOC for subset of patients recommended for RPM") for more strict binary event definitions of the primary endpoint % days lost due to unplanned cardiovascular hospital admission or all-cause death used to derive cutoffs for biomarker based selection of patients with RPM recommendation 15 lost days/year, 1 lost days/year); analogous to Table 15 (see above, 30 lost days/year).

| | | Endpoint for selection: Targeted | ≥15 lost days/year | | | ≥1 lost days/year | | |
|---|---|---|---|---|---|---|---|---|
| | Endpoint | sensitivity: | 100% | 98% | 95% | 100% | 98% | 95% |
| patients recommended for RPM | | Cutoff MR-proADM [pg/ml] | 125.1 | 145.4 | 383.3 | 52.7 | 112.4 | 214.2 |
| | | Sensitivity (%) | 100 | 98.8 | 94.7 | 100 | 97.9 | 94.5 |
| | | Specificity (%) | 10.3 | 14.4 | 27.8 | 2.7 | 10.8 | 20.3 |
| | | Excluded (%) | 8.0 | 11.5 | 22.9 | 1.7 | 7.5 | 14.8 |
| | | NPV (%) | 100 | 97.8 | 94.9 | 100 | 89.7 | 86.0 |
| | | PPV (%) | 23.8 | 24.5 | 26.9 | 38.1 | 39.6 | 41.4 |
| Part 2: Evaluation of RPM intervention effect: RPM vs. SOC for subset of patients recommended for RPM | Days lost due to unplanned cardiovascular hospital admissions or all-cause death | Average SOC (%) | 7.21 | 7.43 | 8.28 | 6.76 | 7.17 | 7.66 |
| | | Average RPM (%) | 5.30 | 5.51 | 6.19 | 5.01 | 5.23 | 5.79 |
| | | Ratio | 0.79 | 0.80 | 0.80 | 0.80 | 0.78 | 0.82 |
| | | p-value | 0.042 | 0.068 | 0.098 | 0.044 | 0.033 | 0.099 |
| | All-cause death (time to event) | Hazard ratio | 0.69 (0.50-0.96) | 0.70 (0.50-0.97) | 0.70 (0.50-0.98) | 0.70 (0.51-0.97) | 0.69 (0.49-0.95) | 0.72 (0.52-1.00) |
| | | p-value | 0.027 | 0.032 | 0.035 | 0.032 | 0.024 | 0.050 |
| | Cardiovascular death (time to event) | Hazard ratio (95%-CI) | 0.66 (0.44-0.99) | 0.67 (0.44-1.01) | 0.67 (0.45-1.02) | 0.68 (0.45-1.01) | 0.66 (0.44-0.99) | 0.68 (0.46-1.03) |
| | | p-value | 0.045 | 0.054 | 0.059 | 0.056 | 0.041 | 0.066 |
| | Days lost due to unplanned cardiovascular hospital admissions | Average SOC (%) | 2.36 | 2.44 | 2.68 | 2.23 | 2.35 | 2.50 |
| | | Average RPM (%) | 1.80 | 1.89 | 2.12 | 1.70 | 1.77 | 1.97 |
| | | Ratio | 0.88 | 0.90 | 0.91 | 0.88 | 0.87 | 0.91 |
| | | p-value | 0.20 | 0.28 | 0.38 | 0.20 | 0.16 | 0.35 |
| | Days lost due to unplanned hospital admissions due to worsening heart failure | Average SOC (%) | 1.59 | 1.65 | 1.84 | 1.49 | 1.58 | 1.70 |
| | | Average RPM (%) | 1.11 | 1.17 | 1.31 | 1.03 | 1.09 | 1.23 |
| | | Ratio | 0.80 | 0.80 | 0.80 | 0.79 | 0.79 | 0.80 |
| | | p-value | 0.007 | 0.016 | 0.034 | 0.003 | 0.006 | 0.016 |

REFERENCES

Abraham W T, Adamson P B, Bourge R C, Aaron M F, Costanzo M R, Stevenson L W, Strickland W, Neelagaru S, Raval N, Krueger S, Weiner S, Shavelle D, Jeffries B, Yadav J S, CHAMPION Trial Study Group. Wireless pulmonary artery haemodynamic monitoring in chronic heart failure: a randomised controlled trial. Lancet 2011; 377:658-666.

Adamson P B, Ginn G, Anker S D, Bourge R C, Abraham W T. Remote haemodynamic-guided care for patients with chronic heart failure: a meta-analysis of completed trials. Eur J Heart Fail 2017; 19:426-443.

Albrich W C, Ruegger K, Dusemund F, et al. (2013) Biomarker-enhanced triage in respiratory infections: a proof-of-concept feasibility trial. Eur Respir J; 42(4): 1064-1075.

Allen, M., Poggiali, D., Whitaker, K., Marshall, T. R., & Kievit, R. A. (2019). Raincloud plots: a multiplatform tool for robust data visualization. Wellcome Open Research, 4 (https://doi.org/10.12688/wellcomeopenres.15191.1).

Anker S, Koehler F, Abraham W. Telemedicine and remote management of patients with heart failure. Lancet 2011; 378:731-739.

Andrès E., Talha S., Zulfiqar A A, Hajjam M, Ervé S, Hajjam J, Gény B, Hajjam E, Hassani A. (2018) Current Research and New Perspectives of Telemedicine in Chronic Heart Failure: Narrative Review and Points of Interest for the Clinician. J Clin Med. Dec. 13, 2018; 7 (12).

Böhm M, Drexler H, Oswald H, Rybak K, Bosch R, Butter C, Klein G, Gerritse B, Monteiro J, Israel C, Bimmel D, Kääb S, Huegl B, Brachmann J; OptiLink H F Study Investigators. Fluid status telemedicine alerts for heart failure: a randomized controlled trial. Eur Heart J 2016; 37:3154-3163.

Chioncel O, Lainscak M, Seferovic P M, et al. Epidemiology and one-year outcomes in patients with chronic heart failure and preserved, mid-range and reduced ejection fraction: an analysis of the ESC Heart Failure Long-Term Registry. Eur J Heart Fail 2017; 19: 1574-85.

Christopher Adlbrecht, Martin Hülsmann, Guido Strunk, Rudolf Berger, Deddo Mörtl, Joachim Struck, Nils G. Morgenthaler, Andreas Bergmann, Johannes Jakowitsch, Gerald Maurer, Irene M. Lang, and Richard Pacher (2009) European Journal of Heart Failure (2009) 11, 361-366

Cockcroft, D. W., & Gault, M. H. (1976). Prediction of creatinine clearance from serum creatinine. Nephron, 16, 31-41.

Cowie M R, Anker S D, Cleland J G F, et al. Improving care for patients with acute heart failure: before, during and after hospitalization. ESC Heart Fail 2014; 1: 110-45.

Cowie M R, Bax J, Bruning N, et al. e-Health: a position statement of the European Society of Cardiology. Eur Heart J 2016; 37: 63-66.

Francis G S, Felker G M, Tang W H. (2016) A test in context: critical evaluation of natriuretic peptide testing in heart failure. J Am Coll Cardiol; 67:331-7.

Gheorghiade M, Zannad F, Sopko G, Klein L, Piña I L, Konstam M A, Massie B M, Roland E, Targum S, Collins S P, Filippatos G, Tavazzi L; International Working Group on Acute Heart Failure Syndromes. International working group on acute heart failure syndromes. Acute heart failure syndromes: current state and framework for future research. Circulation. 2005; 112(25):3958-68.

Gowda S., Prakash B. Desai, Shruthi S. Kulkarni, Vinayak V. Hull, Avinash A. K. Math, and Sonal N. Vernekar Markers of renal function tests, N Am J Med Sci. 2010 April; 2(4): 170-173.

Hartmann O, Schuetz P, Albrich W C, Anker S D, Mueller B, Schmidt T (2012). Time-dependent Cox regression: serial measurement of the cardiovascular biomarker proadrenomedullin improves survival prediction in patients with lower respiratory tract infection. Int J Cardiol; 1 61 (3):166-173.

Hindricks G, Taborsky M, Glikson M, Heinrich U, Schumacher B, Katz A, Brachmann J, Lewalter T, Goette A, Block M, Kautzner J, Sack S, Husser D, Piorkowski C, Sogaard P; IN-TIME Study Group. Implant-based multiparameter telemonitoring of patients with heart failure (IN-TIME): a randomised controlled trial. Lancet 2014; 384:583-590.

Hofmann R, Voeller H, Nagels K, Bindl D, Vettorazzi E, Dittmar R, Wohlgemuth W, Neumann T, Stork S, Bruder O, Wegscheider K, Nagel E, Fleck E. First outline and baseline data of a randomized, controlled multicenter trial to evaluate the health economic impact of home telemonitoring in chronic heart failure—CardioBBEAT. Trials 2015; 16:343.

Hunt S A, Abraham W T, Chin M H, Feldman A M, Francis G S, Ganiats T G, et al. 2009 focused update incorporated into the ACC/AHA 2005 Guidelines for the Diagnosis and Management of Heart Failure in Adults: a report of the American College of Cardiology Foundation/American Heart Association Task Force on Practice Guidelines: developed in collaboration with the International Society for Heart and Lung Transplantation. Circulation. 2009; 119 (14).

Jougasaki M, Burnett Jr J C (2000). Adrenomedullin: potential in physiology and pathophysiology. Life Sci; 66:855-72.

Koehler F, Koehler K, Deckwart O, Prescher S, Wegscheider K, Winkler S, Vettorazzi E, Polze A, Stangl K, Hartmann O, Marx A, Neuhaus P, Scherf M, Kirwan B A, Anker S D. Telemedical Interventional Management in Heart Failure II (TIM-HF2), a randomised, controlled trial investigating the impact of telemedicine on unplanned cardiovascular hospitalisations and mortality in heart failure patients: study design and description of the intervention. Eur J Heart Fail. 2018 October; 20(10):1485-1493. doi: 10.1002/ejhf.1300. Epub Sep. 19, 2018b.

Koehler F, Winkler S, Schieber M, Sechtem U, Stangl K, Böhm M, de Brouwer S, Perrin E, Baumann G, Gelbrich G, Boll H, Honold M, Koehler K, Kirwan B A, Anker S D. Telemedicine in heart failure: pre-specified and exploratory subgroup analyses from the TIM-HF trial. Int J Cardiol 2012a; 161:143-150.

Koehler F, Winkler S, Schieber M, Sechtem U, Stangl K, Böhm M, Brouwer S, Perrin E, Baumann G, Goetz G, Boll H, Honold M, Koehler K, Kirwan B A, Anker S, "Telemedicine in heart failure: Pre-specified and exploratory subgroup analyses from the TIM-HF trial", Int J Cardiology 2012b, 161, 3 143-150.

Koehler F, Winkler S, Schieber M, Sechtem U, Stangl K, Böhm M, Boll H, Baumann G, Honold M, Koehler K, Gelbrich G, Kirwan B A, Anker S D; Telemedical Interventional Monitoring in Heart Failure Investigators. Impact of remote telemedical management on mortality and hospitalisations in ambulatory patients with chronic heart failure: the Telemedical Interventional Monitoring in Heart Failure study. Circulation 2011; 123:1873-1880.

Koehler, Friedrich & Koehler, Kerstin & Deckwart, Oliver & Prescher, Sandra & Wegscheider, Karl & Kirwan, Bridget-Anne & Winkler, Sebastian & Vettorazzi, Eik & Bruch, Leonhard & Oeff, Michael & Zugck, Christian & Doerr, Gesine & Naegele, Herbert & Störk, Stefan & Butter, Christian & Sechtem, Udo & Angermann, Christiane & Gola, Guntram & Prondzinsky, Roland & Stangl, Karl (2018a). Efficacy of telemedical interventional management in patients with heart failure (TIM-HF2): a randomised, controlled, parallel-group, unmasked trial. The Lancet. Volume 392, ISSUE 10152, P1047-1057, Sep. 22, 2018a.

Koehler F., Koehler K., Deckwart O., Prescher S., Wegscheider K., Winkler S., Vettorazzi E., Polze A., Stangl K., Hartmann O., Marx A., Neuhaus P., Scherf M., Kirwan B A, Anker S D (2018b) Telemedical Interventional Management in Heart Failure II (TIM-HF2), a randomised, controlled trial investigating the impact of telemedicine on unplanned cardiovascular hospitalisations and mortality in heart failure patients: study design and description of the intervention. Eur J Heart Fail. 2018 October; 20(10):1485-1493

Kojima H, Tsujimoto T, Uemura M, et al. (1998) Significance of increased plasma adrenomedullin concentration in patients with cirrhosis. J Hepatol; 28:840-6.

Krstic, Danijela & Tomić, Nenad & Radosavljević, Branimir & Avramović, Nataša & Dragutinovic, Vesna & Radojević Škodrić, Sanja & Colović, Mirjana. (2016). Biochemical Markers of Renal Function. Current medicinal chemistry. 23: 2018-2040.

Levey A. S., Inker L. A. Assessment of Glomerular Filtration Rate in Health and Disease: A State of the Art Review, Clin Pharmacol Ther. 2017 September; 102(3):405-419.

Levey, A. S., et al. (2009). A new equation to estimate glomerular filtration rate. Annals of internal medicine, 150(9), 604-612.

Marco Metra, M D John R Teerlink, M D The LANCET: Volume 390, ISSUE 10106, P1981-1995 (2017).

McMurray J J, Adamopoulos S, Anker S D, Auricchio A, Böhm M, Dickstein K, Falk V, Filippatos G, Fonseca C, Gomez-Sanchez M A, Jaarsma T, Køber L, Lip G Y, Maggioni A P, Parkhomenko A, Pieske B M, Popescu B A, Rønnevik P K, Rutten F H, Schwitter J, Seferovic P, Stepinska J, Trindade P T, Voors A A, Zannad F, Zeiher A; Task Force for the Diagnosis and Treatment of Acute and Chronic Heart Failure 2012 of the European Society of Cardiology, Bax J J, Baumgartner H, Ceconi C, Dean V, Deaton C, Fagard R, Funck-Brentano C, Hasdai D, Hoes A, Kirchhof P, Knuuti J, Kolh P, McDonagh T, Moulin C, Popescu B A, Reiner Z, Sechtem U, Sirnes P A, Tendera M, Torbicki A, Vahanian A, Windecker S, McDonagh T, Sechtem U, Bonet L A, Avraamides P, Ben Lamin H A, Brignole M, Coca A, Cowburn P, Dargie H, Elliott P, Flachskampf F A, Guida G F, Hardman S, lung B, Merkely B, Mueller C, Nanas J N, Nielsen.

Melillo P and Pecchia L. "A Preliminary Model to Choose the Most Appropriate Target Population for Home Monitoring Telemedicine Interventions Basing on the Best Available Evidence", COMPUTER OF IMAGES AND PATTERNS (CAIP) 2014; 406-408.

Morgan J M, Kitt S, Gill J, McComb J M, Ng G A, Raftery J, Roderick P, Seed A, Williams S G, Witte K K, Wright D J, Harris S, Cowie M R. Remote management of heart failure using implantable electronic devices. Eur Heart J 2017; 38:2352-2360.

Mukoyama et al, (1991) Brain natriuretic peptide as a novel cardiac hormone in humans. Evidence for an exquisite dual natriuretic peptide system, atrial natriuretic peptide and brain natriuretic peptide. J Clin Invest; 87: 1402-12

Ong M K, Romano P S, Edgington S, Aronow H U, Auerbach A D, Black J T, De Marco T, Escarce J J, Evangelista L S, Hanna B, Ganiats T G, Greenberg B H, Greenfield S, Kaplan S H, Kimchi A, Liu H, Lombardo D, Mangione C M, Sadeghi B, Sadeghi B, Sarrafzadeh M, Tong K, Fonarow G C; Better Effectiveness After Transition-Heart Failure (BEAT-HF) Research Group. Effectiveness of remote patient monitoring after discharge of hospitalised patients with heart failure: The Better Effectiveness After Transition-Heart Failure (BEAT-HF) randomized clinical trial. JAMA Intern Med 2016; 176:310-318.

O W, Orn S, Parissis J T, Ponikowski P; ESC Committee for Practice Guidelines. ESC guidelines for the diagnosis and treatment of acute and chronic heart failure 2012: The Task Force for the Diagnosis and Treatment of Acute and Chronic Heart Failure 2012 of the European Society of Cardiology. Developed in collaboration with the Heart Failure Association (HFA) of the ESC. Eur J Heart Fail. 2012; 14(8):803-69. Erratum in: Eur J Heart Fail. 2013; 15(3):361-2. e391-479.

Pocock S J, Ariti C A, McMurray J J, Maggioni A, Køber L, Squire I B, Swedberg K, Dobson J, Poppe K K, Whalley G A, Doughty R N; Meta-Analysis Global Group in Chronic Heart Failure: Predicting survival in heart failure: a risk score based on 39 372 patients from 30 studies. Eur Heart J. 2013 May; 34(19):1404-13.

Ponikowski P, Voors A A, Anker S D, Bueno H, Cleland J G, Coats A J, Falk V, Gonzalez-Juanatey J R, Harjola V P, Jankowska E A, Jessup M, Linde C, Nihoyannopoulos P, Parissis J T, Pieske B, Riley J P, Rosano G M, Ruilope L M, Ruschitzka F, Rutten F H, van der Meer P. ESC Guidelines for the diagnosis and treatment of acute and chronic heart failure: The Task Force for the diagnosis and treatment of acute and chronic heart failure of the European Society of Cardiology (ESC). Developed with the special contribution of the Heart Failure Association (HFA) of the ESC. Eur J Heart Fail 2016; 18:891-975.

Ponikowski P, Voors A A, Anker S D, Bueno H, Cleland J G, Coats A J, Falk V, Gonzalez-Juanatey J R, Harjola V P, Jankowska E A, Jessup M, Linde C, Nihoyannopoulos P, Parissis J T, Pieske B, Riley J P, Rosano G M, Ruilope L M, Ruschitzka F, Rutten F H, van der Meer P. ESC Guidelines for the diagnosis and treatment of acute and chronic heart failure: The Task Force for the diagnosis and treatment of acute and chronic heart failure of the European Society of Cardiology (ESC). Developed with the special contribution of the Heart Failure Association (HFA) of the ESC. Eur J Heart Fail 2016; 37(27):2129-2200.

Pousset F, Masson F, Chavirovskaia O, et al. (2000) Plasma adrenomedullin, a new independent predictor of prognosis in patients with chronic heart failure. Eur Heart J; 21:1009-14.

Spethmann S., Prescher S., Dreger H., Nettlau H., Baumann G., Knebel F., Koehler F. Electrocardiographic monitoring during marathon running: a proof of feasibility for a new telemedical approach. Eur J Prev Cardiol. 2014 November; 21 (2 Suppl):32-7. doi: 10.1177/2047487314553736.

Sudoh, T., Kangawa K., Minamino N. and Matsuo H. (1988) A new natriuretic peptide in porcine brain, Nature; 332: 78-81.

R Core Team (2018). R: A language and environment for statistical computing. R Foundation for Statistical Computing, Vienna, Austria. URL www.R-project.org/.

T. Sudoh BBRC 1989; 159: 1427-34.

Terry M. Therneau, Patricia M. Grambsch (2000). Modeling Survival Data: Extending the Cox Model. Springer, New York. ISBN 0-387-98784-3

Tzikas S, Keller T, Ojeda F M, et al. (2013) M R-proANP and M R-proADM for risk stratification of patients with acute chest pain. Heart; 99:388-95.

van Riet E E, Hoes A W, Wagenaar K P, Limburg A, Landman M A, Rutten F H. Epidemiology of heart failure: the prevalence of heart failure and ventricular dysfunction in older adults over time. A systematic review. Eur J Heart Fail 2016; 18: 242-52.

Van Spall H G C, Rahman T, Mytton O, Ramasundarahettige C, Ibrahim Q, Kabali C, Coppens M, Brian Haynes R, Connolly S. Comparative effectiveness of transitional care services in patients discharged from the hospital with heart failure: a systematic review and network meta-analysis. Eur J Heart Fail 2017; 19:1427-1443.

Vuolteenaho O., Ala-Kopsala M, Ruskoaho H. (2005) BNP as a biomarker in heart disease. Adv Clin Chem; 40:1-36.

Wild P S, Schnabel R B, Lubos E, et al. (2011) Midregional proadrenomedullin for prediction of cardiovascular events in coronary artery disease: results from the AtheroGene study. Clin Chem; 58:226-36.

Xiang R, Li L, Liu S "Meta-analysis and meta-regression of telehealth programmes for patients with chronic heart failure" J Telemedicine and Telecare 2013; vol. 19, 5 249-259.

Yancy C W, Jessup M, Bozkurt B, Butler J, Casey D E Jr, Drazner M H, Fonarow G C, Geraci S A, Horwich T, Januzzi J L, Johnson M R, Kasper E K, Levy W C, Masoudi F A, McBride P E, McMurray J J V, Mitchell J E, Peterson P N, Riegel B, Sam F, Stevenson L W, Tang W H W, Tsai E J, Wilkoff B L. 2013 ACCF/AHA guideline for the management of heart failure: a report of the American College of Cardiology Foundation/American Heart Association Task Force on Practice Guidelines. J Am Coll Cardiol 2013; 62:e147-239.

The invention claimed is:

1. A method for administering a remote patient management for a patient diagnosed with a cardiovascular disease, the method comprising:
   providing at least one sample of said patient,
   determining a level of at least one biomarker selected from the group consisting of pro adrenomedullin (proADM), pro brain natriuretic peptide (proBNP) and/or pro atrial natriuretic peptide (proANP) or fragment(s) thereof to be a high benefit level in said at least one sample, wherein the high benefit level is above one or more reference values, and
   administering the remote patient management for said patient.

2. The method of claim 1, wherein the remote patient management is administered for a time period of at least 10 days.

3. The method of claim 1, wherein the high benefit level of proADM or fragment(s) thereof is above a reference value ±20% or more, wherein the reference value is selected from a range of values from 0.75 nmol/L to 1.07 nmol/L.

4. The method of claim 1, wherein the high benefit level of proBNP or fragment(s) thereof is above a reference value ±20% or more, wherein the reference value is selected from a range of values from 237.6 pg/ml to 1595.8 pg/ml.

5. The method of claim 1, wherein the high benefit level of proANP or fragment(s) thereof is above a reference value ±20% or more, wherein the reference value is selected from a range of values from 106.9 pmol/L to 248.3 pmol/L.

6. The method of claim 1, wherein the cardiovascular disease is a heart failure.

7. The method of claim 1, wherein the cardiovascular disease is a heart failure and the patient has been hospitalized within the last 12 months as a result of a heart failure.

8. The method of claim 1, wherein the cardiovascular disease is a heart failure with an elevated risk of an adverse outcome.

9. The method of claim 1, wherein determining a level of proADM or fragment(s) thereof comprises determining a level of mid-regional pro-ADM (MR-proADM), wherein determining a level of proBNP or fragment(s) thereof comprises determining a level of N-terminal pro-B-type natriuretic peptide (NT-proBNP) in the sample, and/or wherein determining a level of proANP or fragment(s) thereof comprises determining a level of mid-regional proANP (MR-proANP).

10. The method according to claim 1, the method additionally comprising:
determining at least one clinical parameter, wherein the at least one clinical parameter is selected from the group consisting of age, weight, body mass index, gender, ethnic background, blood creatinine, left ventricular ejection fraction (LVEF), right ventricular ejection fraction (LVEF), New York Heart Association (NYHA) class, state of medical treatment, blood pressure (systolic/diastolic), heart rate, heart rhythm by electrocardiogram (ECG), peripheral oxygen rate (SpO2), self-rated health status (scale) and a parameter indicating renal function.

11. The method according to claim 10, wherein the at least one clinical parameter is a parameter indicating renal function.

12. The method of claim 1, wherein the sample is selected from the group consisting of a blood sample, a saliva sample and/or a urine sample.

13. A kit for carrying out the method of claim 1, comprising:
detection reagents for determining of at least one biomarker selected from the group-consisting of proADM, proBNP and proANP or fragment(s) thereof in a sample from a patient, and
reference data comprising one or more reference values for determining whether a level of the at least one biomarker is indicative of administering a remote patient management, wherein a low benefit level of the at least one biomarker is lower than the one or more reference values and is indicative of not administering a remote patient management and a high benefit level of the at least one biomarker is higher than the one or more reference values and is indicative of administering a remote patient management, wherein said reference data is stored on a computer readable medium and/or employed in the form of computer executable code configured for comparing a determined at least one biomarker value with the reference values.

14. The kit according to claim 13, additionally comprising: detection reagents for determining the level of at least one additional biomarker or fragment(s) thereof, in a sample from a patient and/or means for determining at least one clinical parameter selected from the group consisting of age, weight, body mass index, gender, ethnic background, blood creatinine, left ventricular ejection fraction (LVEF), right ventricular ejection fraction (LVEF), NYHA class, state of medical treatment, blood pressure (systolic/diastolic), heart rate, heart rhythm by electrocardiogram (ECG), peripheral oxygen rate (SpO2), self-rated health status, and a parameter indicating renal function and reference data for determining whether a level of the at least one additional biomarker or fragment(s) thereof and/or the at least one clinical parameter is indicative of prescribing or not prescribing a remote patient management, wherein said reference data is stored on a computer readable medium and/or is in the form of computer executable code configured for comparing the determined levels of said at least one biomarker or fragment(s) thereof and/or said at least one clinical parameter with the reference data.

15. The method according to claim 8, wherein the adverse outcome is acute decompensation and/or death.

16. The method according to claim 11, wherein the parameter indicating renal function is a creatinine clearance rate and/or a GFR.

17. The method of claim 1, wherein administering the remote patient management comprises initiation of hospitalization, initiation of an increased patient care or administering a medication in regards to treating a cardiovascular disease.

18. The method of claim 17, wherein administering the medication comprises treating the patient by administering a medication selected from the group consisting of angiotensin-converting enzyme (ACE) inhibitors, Angiotensin-II-receptor blocker (ARB), aldosterone antagonists, beta blockers, diuretics, and calcium antagonists.

19. The method of claim 1, wherein the remote patient management comprises a telemonitoring on the health status of said patient in regard to the status or progression of the cardiovascular disease.

20. The method of claim 19, wherein the telemonitoring on the health status includes repeated data collection on the health status of the patient at the site of the patient and its remote transmission to a monitoring system or device allowing for review by medical personnel or an automated medical system, wherein the data on the health status includes blood pressure, an electrocardiogram (ECG), peripheral oxygen saturation (SpO2) or body weight.

* * * * *

SEQUENCE LISTING

<160> NUMBER OF SEQ ID NOS: 15

<210> SEQ ID NO 1
<211> LENGTH: 185
<212> TYPE: PRT
<213> ORGANISM: Homo sapiens

<400> SEQUENCE: 1

Met Lys Leu Val Ser Val Ala Leu Met Tyr Leu Gly Ser Leu Ala Phe
1               5                   10                  15

Leu Gly Ala Asp Thr Ala Arg Leu Asp Val Ala Ser Glu Phe Arg Lys
            20                  25                  30

Lys Trp Asn Lys Trp Ala Leu Ser Arg Gly Lys Arg Glu Leu Arg Met
        35                  40                  45

Ser Ser Ser Tyr Pro Thr Gly Leu Ala Asp Val Lys Ala Gly Pro Ala
50                  55                  60

Gln Thr Leu Ile Arg Pro Gln Asp Met Lys Gly Ala Ser Arg Ser Pro
65                  70                  75                  80

Glu Asp Ser Ser Pro Asp Ala Ala Arg Ile Arg Val Lys Arg Tyr Arg
                85                  90                  95

Gln Ser Met Asn Asn Phe Gln Gly Leu Arg Ser Phe Gly Cys Arg Phe
            100                 105                 110

Gly Thr Cys Thr Val Gln Lys Leu Ala His Gln Ile Tyr Gln Phe Thr
        115                 120                 125

Asp Lys Asp Lys Asp Asn Val Ala Pro Arg Ser Lys Ile Ser Pro Gln
130                 135                 140

Gly Tyr Gly Arg Arg Arg Arg Ser Leu Pro Glu Ala Gly Pro Gly Arg
145                 150                 155                 160

Arg Thr Leu Val Ser Ser Lys Pro Gln Ala His Gly Ala Pro Ala Pro
                165                 170                 175

Pro Ser Gly Ser Ala Pro His Phe Leu
            180                 185

<210> SEQ ID NO 2
<211> LENGTH: 164
<212> TYPE: PRT
<213> ORGANISM: Homo sapiens

<400> SEQUENCE: 2

Ala Arg Leu Asp Val Ala Ser Glu Phe Arg Lys Lys Trp Asn Lys Trp
1               5                   10                  15

Ala Leu Ser Arg Gly Lys Arg Glu Leu Arg Met Ser Ser Ser Tyr Pro
            20                  25                  30

Thr Gly Leu Ala Asp Val Lys Ala Gly Pro Ala Gln Thr Leu Ile Arg
        35                  40                  45

Pro Gln Asp Met Lys Gly Ala Ser Arg Ser Pro Glu Asp Ser Ser Pro
    50                  55                  60

Asp Ala Ala Arg Ile Arg Val Lys Arg Tyr Arg Gln Ser Met Asn Asn
65                  70                  75                  80

Phe Gln Gly Leu Arg Ser Phe Gly Cys Arg Phe Gly Thr Cys Thr Val
                85                  90                  95

Gln Lys Leu Ala His Gln Ile Tyr Gln Phe Thr Asp Lys Asp Lys Asp
            100                 105                 110

Asn Val Ala Pro Arg Ser Lys Ile Ser Pro Gln Gly Tyr Gly Arg Arg
        115                 120                 125

Arg Arg Arg Ser Leu Pro Glu Ala Gly Pro Gly Arg Thr Leu Val Ser

```
                130             135             140
Ser Lys Pro Gln Ala His Gly Ala Pro Ala Pro Ser Gly Ser Ala
145                 150             155             160

Pro His Phe Leu

<210> SEQ ID NO 3
<211> LENGTH: 20
<212> TYPE: PRT
<213> ORGANISM: Homo sapiens

<400> SEQUENCE: 3

Ala Arg Leu Asp Val Ala Ser Glu Phe Arg Lys Lys Trp Asn Lys Trp
1               5                   10                  15

Ala Leu Ser Arg
            20

<210> SEQ ID NO 4
<211> LENGTH: 48
<212> TYPE: PRT
<213> ORGANISM: Homo sapiens

<400> SEQUENCE: 4

Glu Leu Arg Met Ser Ser Ser Tyr Pro Thr Gly Leu Ala Asp Val Lys
1               5                   10                  15

Ala Gly Pro Ala Gln Thr Leu Ile Arg Pro Gln Asp Met Lys Gly Ala
            20                  25                  30

Ser Arg Ser Pro Glu Asp Ser Ser Pro Asp Ala Ala Arg Ile Arg Val
        35                  40                  45

<210> SEQ ID NO 5
<211> LENGTH: 52
<212> TYPE: PRT
<213> ORGANISM: Homo sapiens

<400> SEQUENCE: 5

Tyr Arg Gln Ser Met Asn Asn Phe Gln Gly Leu Arg Ser Phe Gly Cys
1               5                   10                  15

Arg Phe Gly Thr Cys Thr Val Gln Lys Leu Ala His Gln Ile Tyr Gln
            20                  25                  30

Phe Thr Asp Lys Asp Lys Asp Asn Val Ala Pro Arg Ser Lys Ile Ser
        35                  40                  45

Pro Gln Gly Tyr
        50

<210> SEQ ID NO 6
<211> LENGTH: 38
<212> TYPE: PRT
<213> ORGANISM: Homo sapiens

<400> SEQUENCE: 6

Arg Arg Arg Arg Arg Ser Leu Pro Glu Ala Gly Pro Gly Arg Thr Leu
1               5                   10                  15

Val Ser Ser Lys Pro Gln Ala His Gly Ala Pro Ala Pro Ser Gly
            20                  25                  30

Ser Ala Pro His Phe Leu
            35

<210> SEQ ID NO 7
<211> LENGTH: 134
<212> TYPE: PRT
```

<213> ORGANISM: Homo sapiens

<400> SEQUENCE: 7

Met Asp Pro Gln Thr Ala Pro Ser Arg Ala Leu Leu Leu Leu Phe
1               5                   10                  15

Leu His Leu Ala Phe Leu Gly Gly Arg Ser His Pro Leu Gly Ser Pro
            20                  25                  30

Gly Ser Ala Ser Asp Leu Glu Thr Ser Gly Leu Gln Glu Gln Arg Asn
        35                  40                  45

His Leu Gln Gly Lys Leu Ser Glu Leu Gln Val Glu Gln Thr Ser Leu
    50                  55                  60

Glu Pro Leu Gln Glu Ser Pro Arg Pro Thr Gly Val Trp Lys Ser Arg
65                  70                  75                  80

Glu Val Ala Thr Glu Gly Ile Arg Gly His Arg Lys Met Val Leu Tyr
                85                  90                  95

Thr Leu Arg Ala Pro Arg Ser Pro Lys Met Val Gln Gly Ser Gly Cys
            100                 105                 110

Phe Gly Arg Lys Met Asp Arg Ile Ser Ser Ser Gly Leu Gly Cys
        115                 120                 125

Lys Val Leu Arg Arg His
    130

<210> SEQ ID NO 8
<211> LENGTH: 108
<212> TYPE: PRT
<213> ORGANISM: Homo sapiens

<400> SEQUENCE: 8

His Pro Leu Gly Ser Pro Gly Ser Ala Ser Asp Leu Glu Thr Ser Gly
1               5                   10                  15

Leu Gln Glu Gln Arg Asn His Leu Gln Gly Lys Leu Ser Glu Leu Gln
            20                  25                  30

Val Glu Gln Thr Ser Leu Glu Pro Leu Gln Glu Ser Pro Arg Pro Thr
        35                  40                  45

Gly Val Trp Lys Ser Arg Glu Val Ala Thr Glu Gly Ile Arg Gly His
    50                  55                  60

Arg Lys Met Val Leu Tyr Thr Leu Arg Ala Pro Arg Ser Pro Lys Met
65                  70                  75                  80

Val Gln Gly Ser Gly Cys Phe Gly Arg Lys Met Asp Arg Ile Ser Ser
                85                  90                  95

Ser Ser Gly Leu Gly Cys Lys Val Leu Arg Arg His
            100                 105

<210> SEQ ID NO 9
<211> LENGTH: 76
<212> TYPE: PRT
<213> ORGANISM: Homo sapiens

<400> SEQUENCE: 9

His Pro Leu Gly Ser Pro Gly Ser Ala Ser Asp Leu Glu Thr Ser Gly
1               5                   10                  15

Leu Gln Glu Gln Arg Asn His Leu Gln Gly Lys Leu Ser Glu Leu Gln
            20                  25                  30

Val Glu Gln Thr Ser Leu Glu Pro Leu Gln Glu Ser Pro Arg Pro Thr
        35                  40                  45

Gly Val Trp Lys Ser Arg Glu Val Ala Thr Glu Gly Ile Arg Gly His
    50                  55                  60

```
Arg Lys Met Val Leu Tyr Thr Leu Arg Ala Pro Arg
 65                  70                  75
```

```
<210> SEQ ID NO 10
<211> LENGTH: 32
<212> TYPE: PRT
<213> ORGANISM: Homo sapiens

<400> SEQUENCE: 10

Ser Pro Lys Met Val Gln Gly Ser Gly Cys Phe Gly Arg Lys Met Asp
 1               5                  10                  15

Arg Ile Ser Ser Ser Ser Gly Leu Gly Cys Lys Val Leu Arg Arg His
                20                  25                  30
```

```
<210> SEQ ID NO 11
<211> LENGTH: 153
<212> TYPE: PRT
<213> ORGANISM: Homo sapiens

<400> SEQUENCE: 11

Met Ser Ser Phe Ser Thr Thr Val Ser Phe Leu Leu Leu Leu Leu Ala
 1               5                  10                  15

Phe Gln Leu Leu Gly Gln Thr Arg Ala Asn Pro Met Tyr Asn Ala Val
                20                  25                  30

Ser Asn Ala Asp Leu Met Asp Phe Lys Asn Leu Leu Asp His Leu Glu
                35                  40                  45

Glu Lys Met Pro Leu Glu Asp Glu Val Val Pro Pro Gln Val Leu Ser
     50                  55                  60

Glu Pro Asn Glu Glu Ala Gly Ala Ala Leu Ser Pro Leu Pro Glu Val
 65                  70                  75                  80

Pro Pro Trp Thr Gly Glu Val Ser Pro Ala Gln Arg Asp Gly Gly Ala
                85                  90                  95

Leu Gly Arg Gly Pro Trp Asp Ser Ser Asp Arg Ser Ala Leu Leu Lys
                100                 105                 110

Ser Lys Leu Arg Ala Leu Leu Thr Ala Pro Arg Ser Leu Arg Arg Ser
            115                 120                 125

Ser Cys Phe Gly Gly Arg Met Asp Arg Ile Gly Ala Gln Ser Gly Leu
        130                 135                 140

Gly Cys Asn Ser Phe Arg Tyr Arg Arg
145                 150
```

```
<210> SEQ ID NO 12
<211> LENGTH: 126
<212> TYPE: PRT
<213> ORGANISM: Homo sapiens

<400> SEQUENCE: 12

Asn Pro Met Tyr Asn Ala Val Ser Asn Ala Asp Leu Met Asp Phe Lys
 1               5                  10                  15

Asn Leu Leu Asp His Leu Glu Glu Lys Met Pro Leu Glu Asp Glu Val
                20                  25                  30

Val Pro Pro Gln Val Leu Ser Glu Pro Asn Glu Glu Ala Gly Ala Ala
                35                  40                  45

Leu Ser Pro Leu Pro Glu Val Pro Pro Trp Thr Gly Glu Val Ser Pro
     50                  55                  60

Ala Gln Arg Asp Gly Gly Ala Leu Gly Arg Gly Pro Trp Asp Ser Ser
 65                  70                  75                  80
```

```
Asp Arg Ser Ala Leu Leu Lys Ser Lys Leu Arg Ala Leu Leu Thr Ala
                85                  90                  95

Pro Arg Ser Leu Arg Arg Ser Ser Cys Phe Gly Gly Arg Met Asp Arg
            100                 105                 110

Ile Gly Ala Gln Ser Gly Leu Gly Cys Asn Ser Phe Arg Tyr
        115                 120                 125

<210> SEQ ID NO 13
<211> LENGTH: 28
<212> TYPE: PRT
<213> ORGANISM: Homo sapiens

<400> SEQUENCE: 13

Ser Leu Arg Arg Ser Ser Cys Phe Gly Gly Arg Met Asp Arg Ile Gly
1               5                   10                  15

Ala Gln Ser Gly Leu Gly Cys Asn Ser Phe Arg Tyr
            20                  25

<210> SEQ ID NO 14
<211> LENGTH: 98
<212> TYPE: PRT
<213> ORGANISM: Homo sapiens

<400> SEQUENCE: 14

Asn Pro Met Tyr Asn Ala Val Ser Asn Ala Asp Leu Met Asp Phe Lys
1               5                   10                  15

Asn Leu Leu Asp His Leu Glu Glu Lys Met Pro Leu Glu Asp Glu Val
            20                  25                  30

Val Pro Pro Gln Val Leu Ser Glu Pro Asn Glu Glu Ala Gly Ala Ala
        35                  40                  45

Leu Ser Pro Leu Pro Glu Val Pro Pro Trp Thr Gly Glu Val Ser Pro
    50                  55                  60

Ala Gln Arg Asp Gly Gly Ala Leu Gly Arg Gly Pro Trp Asp Ser Ser
65              70                  75                  80

Asp Arg Ser Ala Leu Leu Lys Ser Lys Leu Arg Ala Leu Leu Thr Ala
                85                  90                  95

Pro Arg

<210> SEQ ID NO 15
<211> LENGTH: 38
<212> TYPE: PRT
<213> ORGANISM: Homo sapiens

<400> SEQUENCE: 15

Pro Glu Val Pro Pro Trp Thr Gly Glu Val Ser Pro Ala Gln Arg Asp
1               5                   10                  15

Gly Gly Ala Leu Gly Arg Gly Pro Trp Asp Ser Ser Asp Arg Ser Ala
            20                  25                  30

Leu Leu Lys Ser Lys Leu
            35
```